United States Patent
Shin et al.

(10) Patent No.: US 12,039,334 B2
(45) Date of Patent: Jul. 16, 2024

(54) PROCESSOR AND METHOD FOR ASSIGNING CONFIG ID FOR CORE INCLUDED IN THE SAME

(71) Applicant: Rebellions Inc., Seongnam-si (KR)

(72) Inventors: Wongyu Shin, Seongnam-si (KR); Juyeong Yoon, Seongnam-si (KR); Sangeun Je, Seongnam-si (KR)

(73) Assignee: Rebellions Inc., Seongnam-si (KR)

( * ) Notice: Subject to any disclaimer, the term of this patent is extended or adjusted under 35 U.S.C. 154(b) by 0 days.

(21) Appl. No.: 18/495,645

(22) Filed: Oct. 26, 2023

(65) Prior Publication Data
US 2024/0201995 A1  Jun. 20, 2024

(30) Foreign Application Priority Data
Dec. 14, 2022 (KR) .......................... 10-2022-0174946

(51) Int. Cl.
  *G06F 9/30* (2018.01)
  *G06F 9/52* (2006.01)
(52) U.S. Cl.
  CPC ............ *G06F 9/30123* (2013.01); *G06F 9/52* (2013.01)
(58) Field of Classification Search
  None
  See application file for complete search history.

(56) References Cited

U.S. PATENT DOCUMENTS

| | | | | |
|---|---|---|---|---|
| 4,782,486 A | * | 11/1988 | Lipcon | G11C 29/28 714/722 |
| 11,126,474 B1 | * | 9/2021 | Zidenberg | G06F 9/5016 |
| 2014/0325175 A1 | * | 10/2014 | Vorbach | G06F 9/3001 711/164 |
| 2016/0146888 A1 | * | 5/2016 | Vooka | G06F 11/27 714/734 |
| 2022/0027152 A1 | * | 1/2022 | Ware | G06F 9/3001 |
| 2022/0334776 A1 | * | 10/2022 | Lew | G06N 3/063 |
| 2022/0413721 A1 | * | 12/2022 | Gunter | G06F 15/7878 |

FOREIGN PATENT DOCUMENTS

KR  10-2258566 B1  6/2021

OTHER PUBLICATIONS

Zapata, M. et al., Efficient Configuration for a Scalable Spiking Neural Network Platform by means of a Synchronous Address Event Representation bus, 2018, IEEE, 8 pages. (Year: 2018).*

* cited by examiner

*Primary Examiner* — Eric Coleman
(74) *Attorney, Agent, or Firm* — BROADVIEW IP LAW, PC

(57) ABSTRACT

A neural processor and method for assigning config ID for neural core included in the same are provided. The neural processor includes a core array comprising a first neural core, a second neural core, a first data line connecting the first neural core and the second neural core in series, and a config line connecting the first neural core and the second neural core in series, an ID config manager configured to assign a first config ID to the first neural core and a second config ID to the second neural core via the config line, and a memory configured to input and output data to and from the core array via the first data line.

19 Claims, 39 Drawing Sheets

PROCESSOR AND METHOD FOR ASSIGNING CONFIG ID FOR CORE INCLUDED IN THE SAME

CROSS-REFERENCE TO RELATED APPLICATION

This application claims priority under 35 U.S.C. § 119 to Korean Patent Application No. 10-2022-0174946 filed on Dec. 14, 2022, in the Korean Intellectual Property Office, the entire contents of which is hereby incorporated by reference.

TECHNICAL FIELD

The disclosure relates to a processor and a method for assigning configuration identifications (config IDs) to cores included therein. More particularly, the disclosure relates to a processor with reduced design complexity and having scalability by assigning a config ID to each of a plurality of cores connected in series via a config line by using the config line.

BACKGROUND

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly.

For the last few years, artificial intelligence technology has been the core technology of the Fourth Industrial Revolution and the subject of discussion as the most promising technology worldwide. The biggest problem with artificial intelligence technology is computing performance. For artificial intelligence technology to realize a level of human learning ability, reasoning ability, perceptual ability, natural language implementation ability, etc., it is of the utmost importance to process a large amount of data quickly. Such a neural processing unit has a plurality of computation devices therein, and each computation device operates in parallel and thus can enhance computation efficiency.

Recently, in order to maximize computation efficiency, the trend is to gradually increase the number of cores within a computation device. However, if the number of cores increases, data paths must be newly assigned by the increased number of cores. This affects very disadvantageously in terms of scalability, and thus, there exist drawbacks of not only being hard to miniaturize chips but also increasing the complexity of the design.

In addition, if the number of cores is increased, the IDs for those cores must be implemented as separate ports. For example, if a computation device includes N cores, N ports for indicating the core IDs are required to represent each core. Therefore, since the design complexity increases as the number of cores increases, there is a problem that scalability for increasing the number of cores is relatively low.

The description set forth in the background section should not be assumed to be prior art merely because it is set forth in the background section. The background section may describe aspects or embodiments.

SUMMARY

Aspects of the disclosure provide a neural processor and a method for assigning config IDs, which assign config IDs to neural cores via a config line.

Aspects of the disclosure provide a neural processor capable of reconfiguring data paths.

Aspects of the disclosure provide a neural processor that has relatively high scalability.

Aspects of the disclosure provide a neural processor that has relatively low power consumption.

According to some aspects of the disclosure, a neural processor includes a core array including a first neural core, a second neural core, a first data line connecting the first neural core and the second neural core in series, and a config line connecting the first neural core and the second neural core in series, an ID config manager configured to assign a first config ID to the first neural core and a second config ID to the second neural core via the config line and a memory configured to input and output data to and from the core array via the first data line.

According to some aspects, the first neural core includes a first config register configured to store the first config ID, and the second neural core includes a second config register configured to store the second config ID.

According to some aspects, the first config register further stores first config lock information for the first config ID, and the second config register further stores second config lock information for the second config ID.

According to some aspects, the first neural core determines a neural core to which a config ID is to be assigned according to the first config lock information.

According to some aspects, the ID config manager provides the core array with a first config ID assignment signal for assigning a config ID to a neural core.

According to some aspects, the ID config manager provides the first config ID assignment signal to the core array, and then further provides the core array with a first config lock signal for fixing the first config ID.

According to some aspects, the ID config manager provides the first config ID assignment signal to the first neural core, and the first neural core determines a neural core to use the first config ID assignment signal based on first config lock information for the first config ID.

According to some aspects, if the first config lock information for the first config ID means an unlocked state, the first neural core activates an ID configuration for the first neural core by using an activation signal included in the first config ID assignment signal, and the first neural core determines a config ID included in the first config ID assignment signal as the first config ID, and if the first config lock information means a locked state, the first neural core provides the first config ID assignment signal to the second neural core.

According to some aspects, the core array further includes a second data line that connects the first neural core and the second neural core in series and is capable of transmitting data in a direction opposite to a data transmission direction of the first data line.

According to some aspects, the core array further includes a task manager that configures a data path of the core array by using the first data line and the second data line; and a controllable port capable of on/off control by the task manager.

According to some aspects, the task manager configures the data path of the core array by controlling the controllable port.

According to some aspects, the task manager configures the data path of the core array by using the first config ID and the second config ID assigned via the config line.

According to some aspects, the first data line includes a plurality of data lines, and the task manager turns off some of the plurality of data lines according to bandwidths of the first neural core and the second neural core.

According to some aspects, the core array includes a first core array including the first neural core and the second neural core; and a second core array including a third neural core that is different from the first neural core and the second neural core, and the neural processor further includes a local interconnection connecting the first core array, the second core array, and the memory.

According to some aspects of the disclosure, a neural processor includes a core array including a first neural core, a second neural core, a first data line connecting the first neural core and the second neural core in series, and a config line connecting the first neural core and the second neural core in series, an ID config manager configured to assign a first config ID to the first neural core and a second config ID to the second neural core via the config line and a task manager that configures a data path of the core array via the first config ID, the second config ID, and the first data line.

According to some aspects, the ID config manager provides the core array with a first config ID assignment signal for assigning a config ID to a neural core.

According to some aspects, the ID config manager provides the first config ID assignment signal to the core array, and then further provides the core array with a first config lock signal for fixing the first config ID.

According to some aspects, if the first config lock information for the first config ID means an unlocked state, the first neural core activates an ID configuration of the first neural core by using an activation signal included in the first config ID assignment signal, and the first neural core determines a config ID included in the first config ID assignment signal as the first config ID, and if the first config lock information means a locked state, the first neural core provides the first config ID assignment signal to the second neural core.

According to some aspects of the disclosure, a method for assigning config IDs to a first neural core and a second neural core, performed by an ID config manager, the method includes providing a first config ID assignment signal to the first neural core via a config line connected to the first neural core and the second neural core, providing a first config lock signal to the first neural core via the config line, providing a second config ID assignment signal to the first neural core via the config line, providing a second config lock signal to the first neural core via the config line, receiving one of a config completion signal and a config failure signal from the first neural core via the config line and determining whether assignments of config IDs to the first neural core and the second neural core have been completed based on a signal provided from the first neural core.

According to some aspects, the determining whether the assignments of config IDs to the first neural core and the second neural core have been completed based on the signal provided from the first neural core includes if the config completion signal is received from the first neural core, determining that the assignments of config IDs to the first neural core and the second neural core have been completed and if the config failure signal is received from the first neural core or the config completion signal is not received within a predetermined time, determining that the assignments of config IDs to the first neural core and the second neural core have failed.

Aspects of the disclosure are not limited to those mentioned above and other aspects and advantages of the disclosure that have not been mentioned can be understood by the following description and will be more clearly understood according to embodiments of the disclosure. In addition, it will be readily understood that the aspects and advantages of the disclosure can be realized by the means and combinations thereof set forth in the claims.

Even if the number of neural cores is changed, the neural processor of the disclosure is relatively simple in design change resulting therefrom and thus has relatively high scalability.

The neural processor of the disclosure can reconfigure data paths relatively easily, and can increase computation efficiency by appropriately changing the data paths as needed.

The neural processor of the disclosure can minimize power consumption by turning off unused neural cores or turning off some of the data lines that are not used.

In addition to the foregoing, the specific effects of the disclosure will be described together while elucidating the specific details for carrying out the embodiments below.

DETAILED DESCRIPTION

Figure 1:
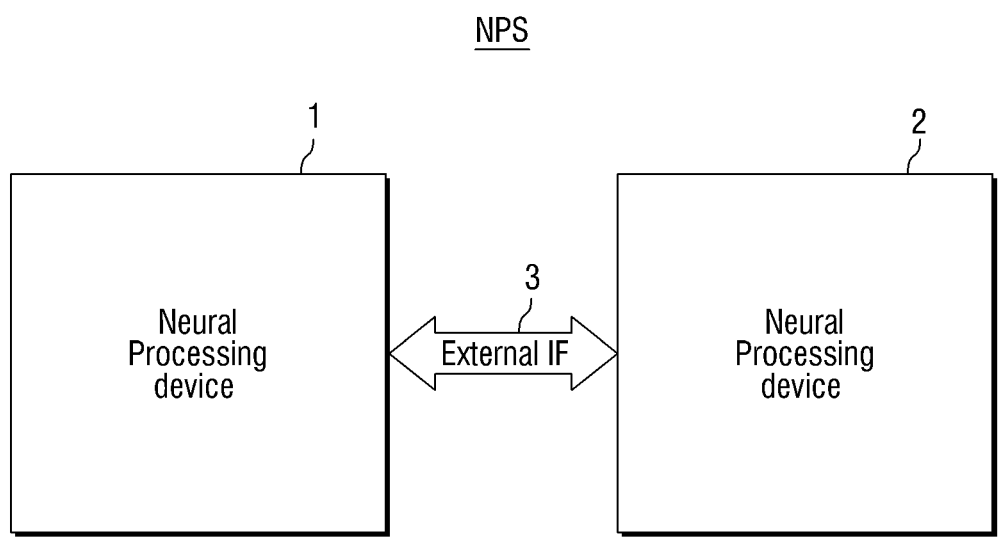
FIG. 1 is a block diagram showing a neural processing system in accordance with some embodiments of the disclosure.

The terms or words used in the disclosure and the claims should not be construed as limited to their ordinary or lexical meanings. They should be construed as the meaning and concept in line with the technical idea of the disclosure based on the principle that the inventor can define the concept of terms or words in order to describe his/her own embodiments in the best possible way. Further, since the embodiment described herein and the configurations illustrated in the drawings are merely one embodiment in which the disclosure is realized and do not represent all the technical ideas of the disclosure, it should be understood that there may be various equivalents, variations, and applicable examples that can replace them at the time of filing this application.

Although terms such as first, second, A, B, etc. used in the description and the claims may be used to describe various components, the components should not be limited by these terms. These terms are used only for the purpose of distinguishing one component from another. For example, a first component may be referred to as a second component, and similarly, a second component may be referred to as a first component, without departing from the scope of the disclosure. The term 'and/or' includes a combination of a plurality of related listed items or any item of the plurality of related listed items.

The terms used in the description and the claims are merely used to describe particular embodiments and are not intended to limit the disclosure. Singular expressions include plural expressions unless the context explicitly indicates otherwise. In the application, terms such as "comprise," "have," "include", "contain," etc. should be understood as not precluding the possibility of existence or addition of features, numbers, steps, operations, components, parts, or combinations thereof described herein. Terms such as a "circuit" or "circuitry", refers to a circuit in hardware but may also refer to a circuit in software.

Unless otherwise defined, all terms used herein, including technical or scientific terms, have the same meaning as commonly understood by those of ordinary skill in the art to which the disclosure pertains.

The term "module" or "unit" as used herein may refer to, but is not limited to, software or hardware component(s) or combinations thereof. A "module" or "unit" performs certain operations. The "modules" or "units" may be configured to reside on an addressable storage medium and/or be configured to be executed or implemented on processing circuitry or via one or more processors. Furthermore, operations of the "modules" or "units" may be combined into fewer "modules" or "units," or further separated into more "modules" or "units."

Terms such as those defined in commonly used dictionaries should be construed as having a meaning consistent with the meaning in the context of the relevant art, and are not to be construed in an ideal or excessively formal sense unless explicitly defined in the disclosure.

In addition, each configuration, procedure, process, method, or the like included in each embodiment may be shared to the extent that they are not technically contradictory to each other.

Hereinafter, neural processing devices in accordance with some embodiments will be described.

FIG. 1 is a block diagram showing a neural processing system in accordance with some embodiments.

Referring to FIG. 1, a neural processing system NPS in accordance with some embodiments may include a first neural processing device 1, a second neural processing device 2, and an external interface 3.

The first neural processing device 1 may be a device that performs calculations using an artificial neural network. The first neural processing device 1 may be, for example, a device specialized in performing tasks of deep learning calculations. However, the embodiment is not limited thereto.

The second neural processing device 2 may be a device having the same or similar configuration as the first neural processing device 1. The first neural processing device 1 and the second neural processing device 2 may be connected to each other via the external interface 3 and share data and control signals.

Although FIG. 1 shows two neural processing devices, the neural processing system NPS in accordance with some embodiments is not limited thereto. In some embodiments, in a neural processing system NPS, three or more neural processing devices may be connected to each other via the external interface 3. Also, conversely, a neural processing system NPS in accordance with some embodiments may include only one neural processing device.

In some embodiments, each of the first neural processing device 1 and the second neural processing device 2 may be a processing device other than a neural processing device. In some embodiments, each of the first neural processing device 1 and the second neural processing device 2 may be a graphics processing unit (GPU), a central processing unit (CPU), or a processing unit of another type. Hereinafter, for the sake of convenience, each of the first neural processing device 1 and the second neural processing device 2 will be described as a neural processing device.

Figure 2:
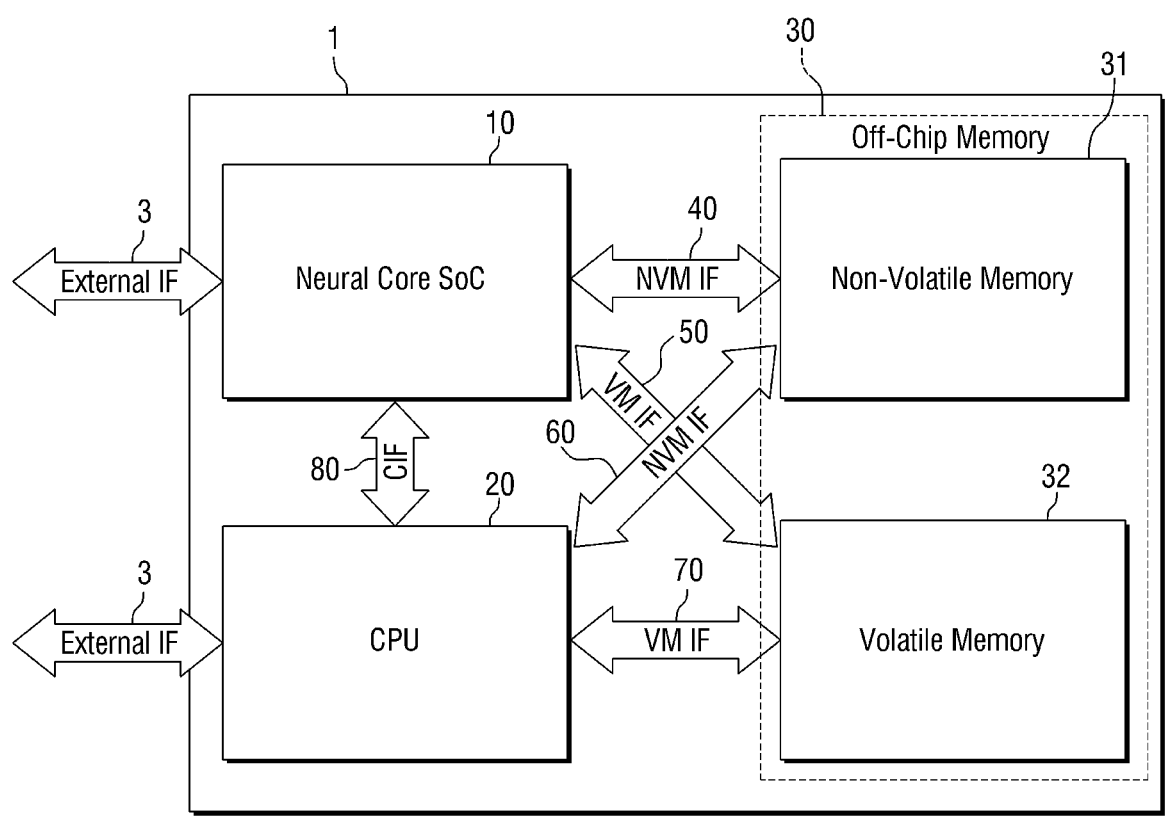
FIG. 2 is a block diagram showing the neural processing device of FIG. 1.

FIG. 2 is a block diagram specifically showing a neural processing device in accordance with FIG. 1.

Referring to FIG. 2, a first neural processing device 1 may include a neural core SoC 10, a CPU 20, an off-chip memory 30, a first non-volatile memory interface 40, a first volatile memory interface 50, a second non-volatile memory interface 60, and a second volatile memory interface 70.

The neural core SoC 10 may be a system on a chip device. The neural core SoC 10 can be an artificial intelligence calculation device and may be an accelerator. The neural core SoC 10 may be, for example, any one of a graphics processing unit (GPU), a field-programmable gate array (FPGA), or an application-specific integrated circuit (ASIC). However, the embodiment is not limited thereto.

The neural core SoC 10 may exchange data with other external calculation devices via the external interface 3. Further, the neural core SoC 10 may be connected to the non-volatile memory 31 and the volatile memory 32 via the first non-volatile memory interface 40 and the first volatile memory interface 50, respectively.

The CPU 20 may be a control device that controls the system of the first neural processing device 1 and executes program calculations. The CPU 20 is a general-purpose calculation device and may have low efficiency in performing simple parallel calculations that are frequently used in deep learning. Accordingly, there can be high efficiency by performing calculations in deep learning inference and training tasks by the neural core SoC 10.

The CPU 20 may exchange data with other external calculation units via the external interface 3. Further, the CPU 20 may be connected to the non-volatile memory 31 and the volatile memory 32 via the second non-volatile memory interface 60 and the second volatile memory interface 70, respectively. The neural core SoC 10 may perform different calculation tasks from the CPU 20.

The CPU 20 may also communicate tasks to the neural core SoC 10 via commands. In some embodiments, the CPU 20 may be a kind of host that gives instructions to the neural core SoC 10. In some embodiments, the neural core SoC 10 can efficiently perform parallel computation jobs such as deep learning jobs according to the instructions of the CPU 20.

The off-chip memory 30 may be a memory disposed outside the chip of the neural core SoC 10. The off-chip memory 30 may include a non-volatile memory 31 and a volatile memory 32.

The non-volatile memory 31 may be a memory that continuously retains stored information even if electric power is not supplied. The non-volatile memory 31 may include, for example, at least one of Read-Only Memory (ROM), Programmable Read-Only Memory (PROM), Erasable Alterable ROM (EAROM), Erasable Programmable Read-Only Memory (EPROM), Electrically Erasable Programmable Read-Only Memory (EEPROM) (e.g., NAND Flash memory, NOR Flash memory), Ultra-Violet Erasable Programmable Read-Only Memory (UVEPROM), Ferroelectric Random-Access Memory (FeRAM), Magnetoresistive Random-Access Memory (MRAM), Phase-change Random-Access Memory (PRAM), silicon-oxide-nitride-oxide-silicon (SONOS), Resistive Random-Access Memory (RRAM), Nanotube Random-Access Memory (NRAM), magnetic computer storage devices (e.g., hard disks, diskette drives, magnetic tapes), optical disc drives, or 3D XPoint memory. However, the embodiment is not limited thereto.

The volatile memory 32 may be a memory that continuously requires electric power to retain stored information, unlike the non-volatile memory 31. The volatile memory 32 may include, for example, at least one of Dynamic Random-Access Memory (DRAM), Static Random-Access Memory (SRAM), Synchronous Dynamic Random-Access Memory (SDRAM), or Double Data Rate SDRAM (DDR SDRAM). However, the embodiment is not limited thereto.

Each of the first non-volatile memory interface 40 and the second non-volatile memory interface 60 may include, for example, at least one of Parallel Advanced Technology Attachment (PATA), Small Computer System Interface (SCSI), Serial Attached SCSI (SAS), Serial Advanced Technology Attachment (SATA), or PCI Express (PCIe). However, the embodiment is not limited thereto.

Each of the first volatile memory interface 50 and the second volatile memory interface 70 may be, for example, at least one of SDR (Single Data Rate), DDR (Double Data Rate), QDR (Quad Data Rate), or XDR (eXtreme Data Rate, Octal Data Rate). However, the embodiment is not limited thereto.

The control interface (CIF) 80 may be an interface for communicating control signals between the CPU 20 and the neural core SoC 10. The control interface 80 may transmit the commands of the CPU 20 and transmit the responses thereto of the neural core SoC 10. The control interface 80 may be, for example, PCIe (PCI Express), but is not limited thereto.

Figure 3:
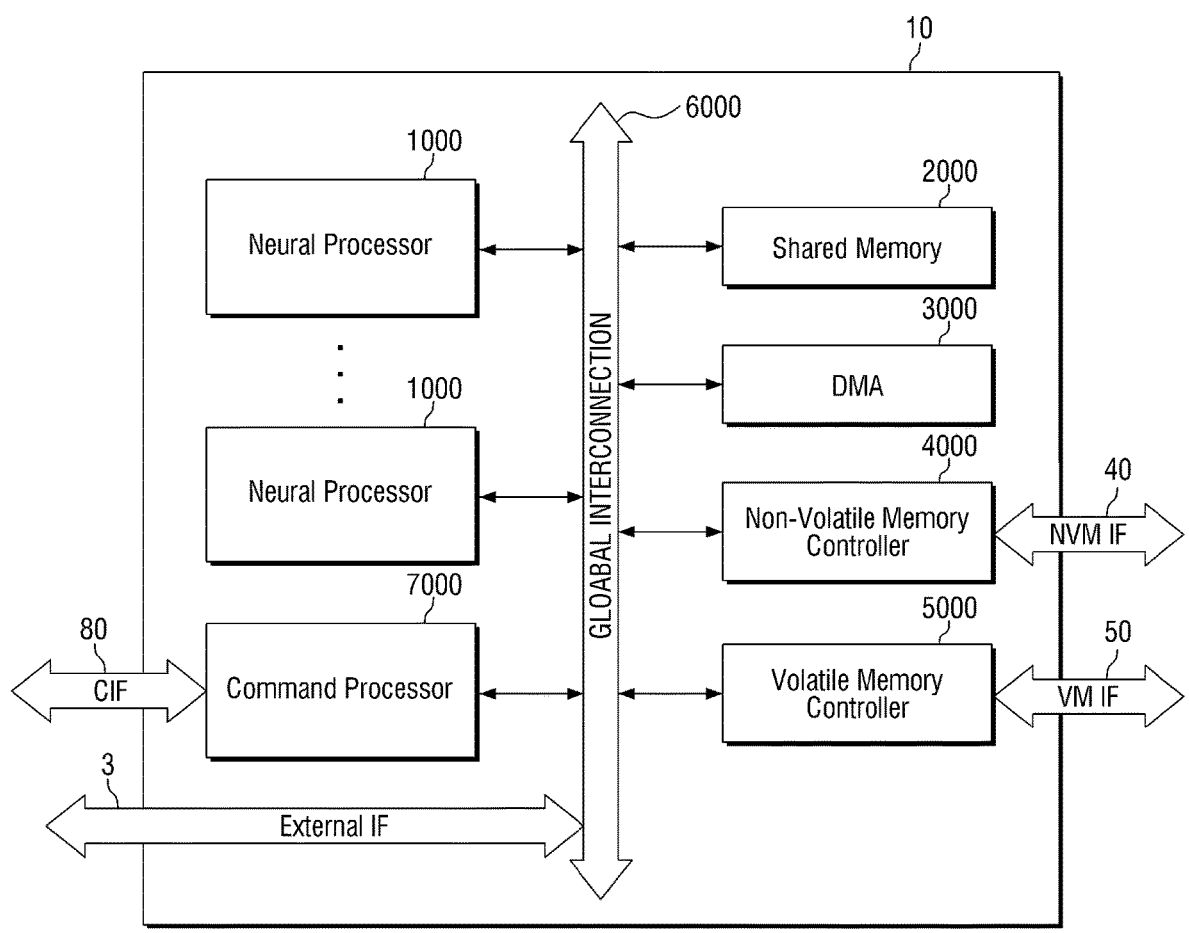
FIG. 3 is a block diagram showing the neural core SoC of FIG. 2.

FIG. 3 is a block diagram showing a neural core SoC in accordance with FIG. 2.

Referring to FIGS. 2 and 3, the neural core SoC 10 may include at least one neural processor 1000, a shared memory 2000, direct memory access (DMA) 3000, a non-volatile memory controller 4000, a volatile memory controller 5000, a command processor 7000 and a global interconnection 6000.

The neural processor 1000 may be a calculation device that directly performs calculation tasks. If there exist a plurality of neural processors 1000, calculation tasks may be assigned to respective neural processors 1000. The respective neural processors 1000 may be connected to each other via the global interconnection 6000.

The shared memory 2000 may be a memory shared by multiple neural processors 1000. The shared memory 2000 may store data of neural processors 1000. In some embodiments, the shared memory 2000 may receive data from the off-chip memory 30, store the data temporarily, and transfer the data to each neural processor 1000. The shared memory 2000 may also receive data from the neural processor 1000, store the data temporarily, and transfer the data to the off-chip memory 30 of FIG. 2.

The shared memory 2000 may be required to be a relatively high-speed memory. Accordingly, the shared memory 2000 may include, for example, an SRAM. However, the embodiment is not limited thereto. In some embodiments, the shared memory 2000 may include a DRAM as well.

The shared memory 2000 may be a memory corresponding to the SoC level, i.e., level 2 (L2). Accordingly, the shared memory 2000 may also be defined as an L2 shared memory.

The DMA 3000 may directly control the movement of data without the need for the neural processor 1000 to control the input/output of data. Accordingly, the DMA 3000 may control the data movement between memories, thereby minimizing the number of interrupts of the neural processor 1000.

The DMA 3000 may control the data movement between the shared memory 2000 and the off-chip memory 30. Via the authority of the DMA 3000, the non-volatile memory controller 4000 and the volatile memory controller 5000 may perform the movement of data.

The non-volatile memory controller 4000 may control the task of reading from or writing onto the non-volatile memory 31. The non-volatile memory controller 4000 may control the non-volatile memory 31 via the first non-volatile memory interface 40. In some embodiments, the non-volatile memory controller 4000 may be named a non-volatile memory controller 4000 circuit, but for the sake of convenience, the terms are unified as a non-volatile memory controller 4000. In some embodiments, the non-volatile memory controller 4000 may be implemented as a circuit or circuitry.

The volatile memory controller 5000 may control the task of reading from or writing onto the volatile memory 32. Further, the volatile memory controller 5000 may perform a refresh task of the volatile memory 32. The volatile memory controller 5000 may control the volatile memory 32 via the first volatile memory interface 50. Similarly, the volatile memory controller 5000 may be named a volatile memory controller 5000 circuit, but for the sake of convenience, the terms are unified as a volatile memory controller 5000. In some embodiments, the volatile memory controller 5000 may be implemented as a circuit or circuitry.

The command processor 7000 may be connected to the control interface 80. The command processor 7000 may receive control signals from the CPU 20 via the control interface 80. The command processor 7000 may generate tasks via the control signals received from the CPU 20 and transmit them to neural processors 1000. Further, the command processor 7000 may receive completion reports for the tasks from neural processors 1000.

The global interconnection 6000 may connect the at least one neural processor 1000, the shared memory 2000, the DMA 3000, the non-volatile memory controller 4000, and the volatile memory controller 5000 to one another. In some embodiments, the external interface 3 may also be connected to the global interconnection 6000. The global interconnection 6000 may be a path through which data travels between the at least one neural processor 1000, the shared memory 2000, the DMA 3000, the non-volatile memory controller 4000, the volatile memory controller 5000, the command processor 7000 and the external interface 3.

The global interconnection 6000 may transmit not only data but also control signals and may transmit a signal for synchronization. In some embodiments, each neural processor 1000 may directly transmit and receive a synchronization signal, instead of a separate control processor managing the synchronization signal. Accordingly, it is possible to preclude the latency of the synchronization signal generated by the command processor 7000.

In some embodiments, if there exist a plurality of neural processors 1000, there may be dependencies of individual tasks in which the task of one neural processor 1000 needs to be finished before the next neural processor 1000 can start a new task. The end and start of these individual jobs can be confirmed via synchronization signals, and the command processor 7000 or the host, i.e., the CPU 20, may be exclusively responsible for both receiving these synchronization signals and instructing the start of a new job.

However, as the number of neural processors 1000 increases and the dependencies of jobs are designed more complexly, the number of these synchronization signals increases exponentially, and thus the latencies resulting from each synchronization signal can greatly reduce job efficiency.

Therefore, each neural processor 1000 instead of the command processor 7000 can directly transmit some of the synchronization signals to other neural processors 1000 according to job dependencies. In some embodiments, several neural processors 1000 can perform the synchronization tasks in parallel as compared with the method managed by the command processor 7000, thereby minimizing the latency due to synchronization.

In some embodiments, the command processor 7000 needs to perform the task scheduling of the neural processors 1000 according to a task dependency, and the overhead of such scheduling may also increase significantly as the number of neural processors 1000 increases. Scheduling jobs may be also performed in part by individual neural processors 1000, and thus the scheduling may burden resulting therefrom can be reduced, thereby improving the performance of the device.

In some embodiments, the neural processing device can perform monitoring whether a task is completed, an event occurs, a task is delayed, or the like in the neural core of each neural processor 1000, and can minimize the intervention of the command processor 7000 and reduce the load on the command processor 7000, thereby improving the performance of the device.

Furthermore, the neural processing device can selectively generate a completion report by setting whether to monitor a task for each task, and can be configured to modify whether to generate a completion report if a report to the command processor 7000 is required. Accordingly, it may be possible to report tasks that require an alert without performing monitoring of all tasks, and stable monitoring of tasks may be possible while reducing the load on the command processor 7000.

Figure 4:
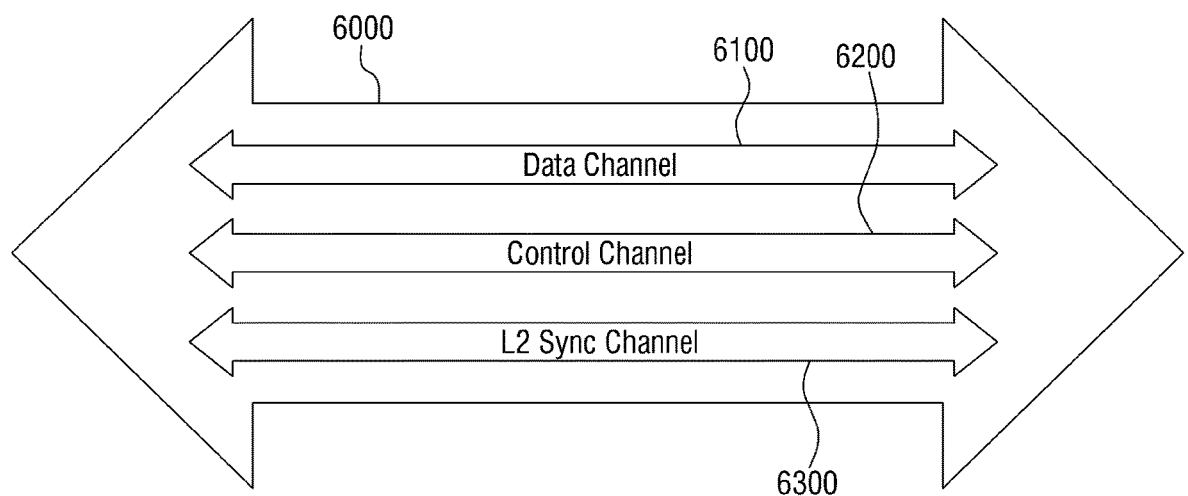
FIG. 4 is a structural diagram showing the global interconnection of FIG. 3.

FIG. 4 is a structural diagram showing a global interconnection in accordance with FIG. 3.

Referring to FIG. 4, the global interconnection 6000 may include a data channel 6100, a control channel 6200, and an L2 sync channel 6300.

The data channel 6100 may be a dedicated channel for transmitting data. Through the data channel 6100, the at least one neural processor 1000, the shared memory 2000, the DMA 3000, the non-volatile memory controller 4000, the volatile memory controller 5000, and the external interface 3 may exchange data with one another.

The control channel 6200 may be a dedicated channel for transmitting control signals. Through the control channel 6200, the at least one neural processor 1000, the shared memory 2000, the DMA 3000, the non-volatile memory controller 4000, the volatile memory controller 5000, the command processor 7000 and the external interface 3 may exchange control signals with one another. In particular, the command processor 7000 may transmit various control signals to neural processors 1000.

The L2 sync channel 6300 may be a dedicated channel for transmitting synchronization signals. Through the L2 sync channel 6300, the at least one neural processor 1000, the shared memory 2000, the DMA 3000, the non-volatile memory controller 4000, the volatile memory controller 5000, the command processor 7000 and the external interface 3 may exchange synchronization signals with one another.

The L2 sync channel 6300 may be set as a dedicated channel inside the global interconnection 6000, and thus, may not overlap with other channels and transmit synchronization signals quickly. Accordingly, the neural processing device does not require new wiring work and may smoothly perform the synchronization task by using the global interconnection 6000.

Figure 5:
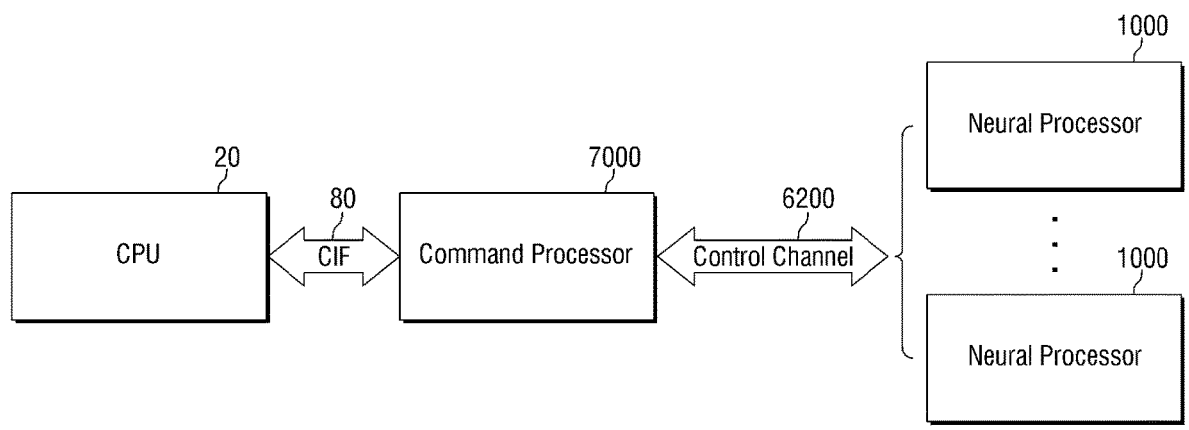
FIG. 5 is a block diagram showing the flow of control signals of the neural processing device of FIG. 1.

FIG. 5 is a block diagram showing the flow of control signals of the neural processing device in accordance with FIG. 1.

Referring to FIG. 5, the CPU 20 may communicate control signals to the command processor 7000 via the control interface 80. In some embodiments, the control signal may be a signal instructing the execution of each operation, such as a computation job or a data load/store job.

The command processor 7000 may receive the control signals and communicate the control signals to at least one neural processor 1000 via the control channel 6200. Each control signal may be stored in the neural processor 1000 as each task.

Figure 6:
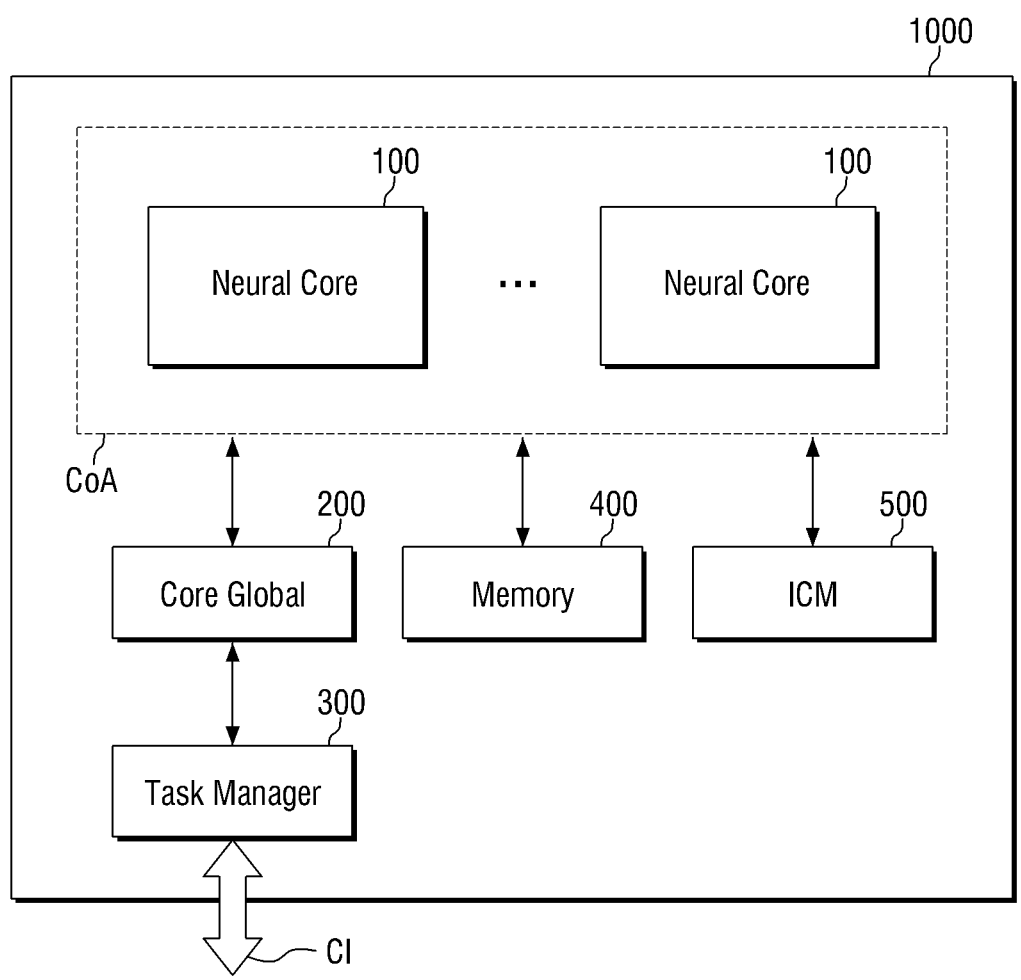
FIG. 6 is a block diagram for schematically describing the neural processor of FIG. 3.

FIG. 6 is a block diagram for schematically describing the neural processor of FIG. 3.

Referring to FIG. 6, the neural processor 1000 may include a core array CoA, a core global 200, a task manager 300, a memory 400, and an ID config manager 500.

The core array CoA may include a plurality of neural cores 100. In some embodiments, a particular array of the plurality of neural cores 100 is defined as a core array CoA. The plurality of neural cores 100 may divide and perform jobs of the neural processor 1000. The number of neural cores 100 may be, for example, 8. However, the present embodiment is not limited thereto.

The neural core 100 may receive task information from the core global 200 and perform a task according to the task information. In some embodiments, the task may be defined by a control signal, and the task may be any one of memory operations. The memory operation may be, for example, any one of micro-DMA (μDMA), LP micro-DMA (Low Priority μDMA), store μDMA (STμDMA), and a pre-processing job.

The memory 400 may be a memory shared by neural cores 100 in the neural processor 1000. The memory 400 may store data of neural cores 100. Further, the memory 400 may communicate data to neural cores 100. On the other hand, the memory 400 may be a memory shared by neural processors 1000 in the neural core SoC 10. In some embodiments, the memory 400 may store data of neural processors 1000 and may communicate the data to neural processors 1000.

In some embodiments, the memory 400 may be an on-chip memory included in the neural processor 1000 or an off-chip memory included outside the neural processor 1000. For example, the memory 400 may be an L1 shared memory included in the neural processor 1000, or the memory 400 may be the shared memory 2000 of FIG. 3. The shared memory 2000 of FIG. 3 may be expressed as an L2 shared memory in another term. The L1 shared memory may be a memory corresponding to the level of the neural processor, i.e., L1 (level 1). The L2 shared memory may be a memory corresponding to the neural processing device, i.e., L2 (level 2). In some embodiments, the L2 shared memory may be shared by the neural processor 1000, and the L1 shared memory 400 may be shared by the neural core 100.

The neural core 100 may receive task information from the core global 200 and perform a task according to the task information. In some embodiments, the task may be a computation job (calculation job) or a job related to a memory operation, and may include information about a data path. A task may be defined by a control signal. The task information is information about a task, and may be information about the type of a task, the form of a task, additional information about a task, and the like.

The neural core 100 may communicate a completion signal indicating the completion of execution of a task to the core global 200.

The task manager 300 may receive tasks from a control interconnection CI. In some embodiments, the control interconnection CI may be a generic term for transmission interfaces that communicate tasks from the command processor 7000. In some embodiments, the task manager 300 may be named a task manager 300 circuit, but for the sake of convenience, the terms are unified as a task manager 300. In some embodiments, the task manager 300 may be implemented as a circuit or circuitry.

The task manager 300 may receive tasks, generate task information, and transmit it to the core global 200. In some embodiments, the task information may include information about data paths. In some embodiments, the task manager 300 may receive completion signals via the core global 200, generate completion reports accordingly, and transmit them to the command processor 7000 via the control interconnection CI.

The core global 200 may be a wire structure connected in hardware within the neural core 100. Although not shown, the core global 200 may be a structure connecting all of the neural core 100, the memory 400, and the task manager 300.

The core global 200 may receive task information from the task manager 300 and communicate it to the neural core 100, and may receive a completion signal related thereto from the neural core 100. Subsequently, the core global 200 may communicate the completion signal to the task manager 300.

The ID config manager 500 may assign a config ID to each of the plurality of neural cores 100. Specifically, the ID config manager 500 may assign a config ID to each of the plurality of neural cores 100 according to control from the command processor 7000. A detailed description of the operation of the ID config manager 500 will be described later. In some embodiments, the ID config manager 500 may be named an ID config manager 500 circuit, but for the sake of convenience, the terms are unified as an ID config manager 500. In some embodiments, the ID config manager 500 may be implemented as a circuit or circuitry.

Figure 7:
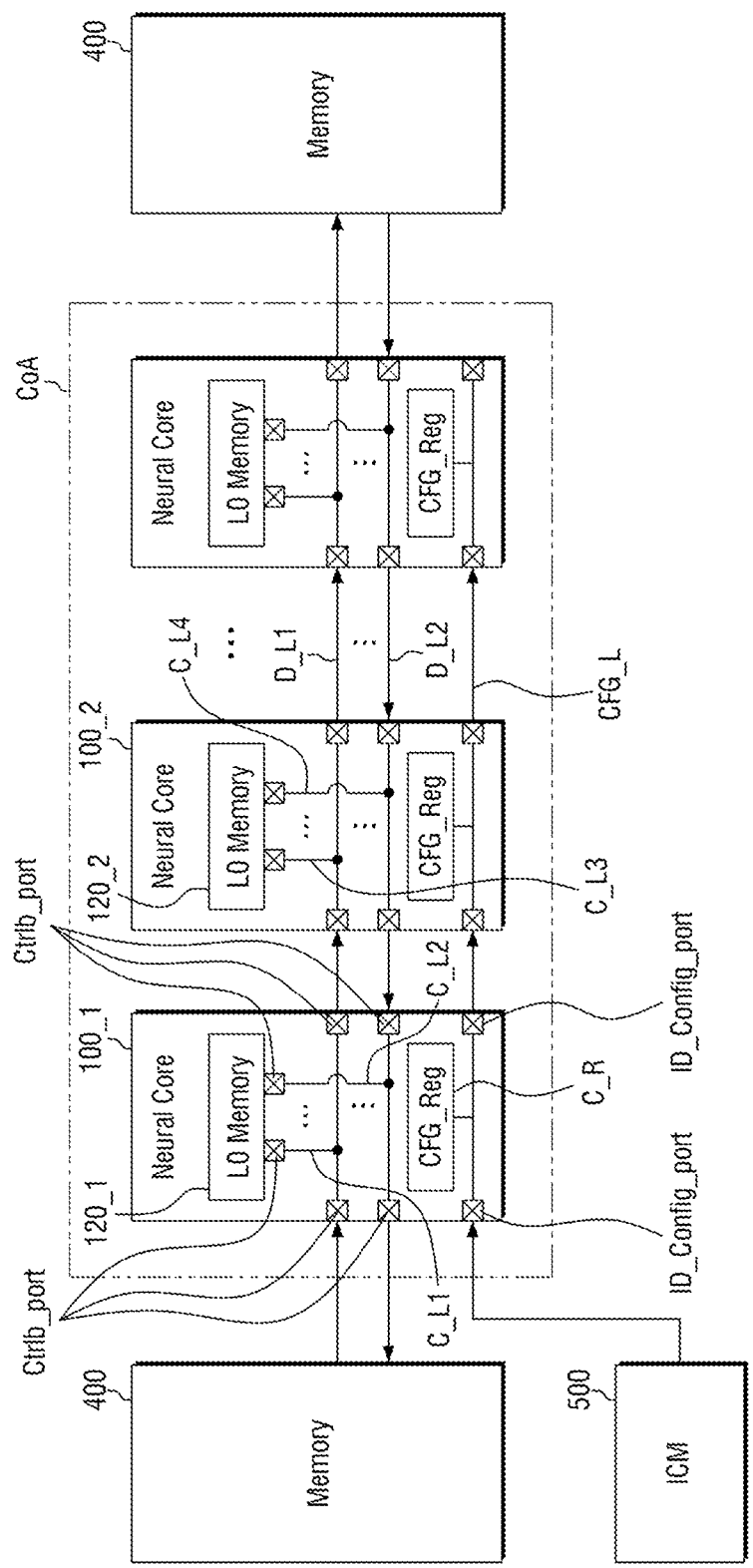
FIG. 7 is a diagram for schematically describing the structure of a core array included in a neural processor in accordance with some embodiments.

FIG. 7 is a diagram for schematically describing the structure of a core array included in a neural processor in accordance with some embodiments. The configuration of the neural core 100 shown in FIGS. 7 to 13 only shows some components for the convenience of description, and the embodiments are not limited thereto. The description of other components included in the neural core 100 will be described later with reference to FIG. 15.

Referring to FIGS. 6 and 7, the core array CoA may include a plurality of neural cores 100. Each of the plurality of neural cores 100 may include an L0 memory 120.

In some embodiments, the core array CoA may include a first data line D_L1 through which data is transmitted in a first direction, and a second data line D_L2 through which data is transmitted in a second direction opposite to the first direction. The first direction and the second direction may be referred to as a forward direction and a backward direction, respectively. In some embodiments, the core array CoA can transmit data in both directions.

The plurality of neural cores 100 may be connected in series with each other via the first data line D_L1. Also, the plurality of neural cores 100 may be connected in series with each other via the second data line D_L2. In some embodiments, the plurality of neural cores 100 may have a structure in which they are connected in series with each other by the first data line D_L1 and the second data line D_L2.

The first data line D_L1 may connect the memory 400 and the core array CoA. Also, the second data line D_L2 may connect the memory 400 and the core array CoA. The connection between the memory 400 and the core array CoA may be directly connected via the first data line D_L1 and the second data line D_L2, or indirectly connected via a local interconnector to be described later. For the convenience of description, the neural core 100 connected to the memory 400 is defined as a first neural core 100_1, and the neural core 100 connected in series with the first neural core 100_1 is defined as a second neural core 100_2. In some embodiments, the L0 memory 120 included in the first neural core 100_1 is defined as a first L0 memory 120_1, and the L0 memory 120 included in the second neural core 100_2 is defined as a second L0 memory 120_2. However, the choice of these terms is merely for the convenience of description, and the embodiments are not limited to these terms.

In some embodiments, the core array CoA may include a connection line connecting the first data line D_L1 and the L0 memory 120 and a connection line connecting the second data line D_L2 and the L0 memory 120. For example, the core array CoA may include a first connection line C_L1 connecting the first data line D_L1 and the first L0 memory 120_1, and a second connection line C_L2 connecting the second data line D_L2 and the first L0 memory 120_1. In some embodiments, the core array CoA may include a third connection line C_L3 connecting the first data line D_L1 and the second L0 memory 120_2, and a fourth connection line C_L4 connecting the second data line D_L2 and the second L0 memory 120_2.

In some embodiments, the first neural core 100_1 and the second neural core 100_2 may be connected in series with each other via the first data line D_L1 and the second data line D_L2. Further, the first L0 memory 120_1 included in the first neural core 100_1 may be connected to the first data line D_L1 via the first connection line C_L1. Also, the first L0 memory 120_1 included in the first neural core 100_1 may be connected to the second data line D_L2 via the second connection line C_L2. In some embodiments, the second L0 memory 120_2 included in the second neural core 100_2 may be connected to the first data line D_L1 via the third connection line C_L3. Moreover, the second L0 memory 120_2 included in the second neural core 100_2 may be connected to the second data line D_L2 via the fourth connection line C_L4.

According to some embodiments, the core array CoA may include a controllable port Ctrlb_port that can be controlled on/off by software or firmware. According to some embodiments, the controllable port Ctrlb_port may be implemented via software or firmware. The task manager 300 of the neural processor 1000 may control on/off of the controllable port Ctrlb_port included in each core array CoA via a descriptor. The controllable port Ctrlb_port may be installed in the first data line D_L1, the second data line (D_L2), and the connection line, and may set data movement paths. In some embodiments, the controllable port Ctrlb_port may be placed between the memory 400 and the neural core 100, between the plurality of neural cores 100, and between the connection line and the L0 memory 120, and the task manager 300 may appropriately control the controllable port Ctrlb_port to thereby configure data movement paths. In some embodiments, the task manager 300 may fix the configured data paths or may reconfigure the data paths in real time.

For example, the first data line D_L1 may include the controllable port Ctrlb_port between the memory 400 and the first neural core 100_1 and between the first neural core 100_1 and the second neural core 100_2. In some embodiments, the task manager 300 may control the controllable port Ctrlb_port between the memory 400 and the first neural core 100_1, and may thus configure a data movement path in a first direction between the memory 400 and the first neural core 100_1. Further, the task manager 300 may control the controllable port Ctrlb_port between the first neural core 100_1 and the second neural core 100_2, and may thus configure a data movement path in the first direction between the first neural core 100_1 and the second neural core 100_2.

In some embodiments, for example, the second data line D_L2 may include the controllable port Ctrlb_port between the memory 400 and the first neural core 100_1 and between the first neural core 100_1 and the second neural core 100_2. In some embodiments, the task manager 300 may control the controllable port Ctrlb_port between the memory 400 and the first neural core 100_1, and may thus configure a data movement path in a second direction between the memory 400 and the first neural core 100_1. Further, the task manager 300 may control the controllable port Ctrlb_port between the first neural core 100_1 and the second neural core 100_2, and may thus configure a data movement path in the second direction between the first neural core 100_1 and the second neural core 100_2.

Further, for example, the first connection line C_L1 may include the controllable port Ctrlb_port between the first data line D_L1 and the first L0 memory 120_1. In some embodiments, the task manager 300 may configure a data movement path in the first direction between the first data line D_L1 and the first L0 memory 120_1 by controlling the controllable port Ctrlb_port between the first data line D_L1 and the first L0 memory 120_1. Likewise, each of the second connection line C_L2, the third connection line C_L3, and the fourth connection line C_L4 may include the controllable port Ctrlb_port, and the task manager 300 may configure data movement paths in the first direction or the second direction by controlling the controllable port Ctrlb_port. The data movement to the L0 memory 120 may mean, but not limited to, that computation is performed in a processing unit (160 in FIG. 15) corresponding to the L0 memory 120 for the convenience of description. In some embodiments, there may also be cases in which even if data is provided to the L0 memory 120, it may be outputted without computation.

Hereinafter, embodiments will be described with i-th unit (i=1 . . . N). The 1st unit may be a memory 400, the i-th unit (i=2 . . . N−1) may be a (i−1)-th neural core, and the N-th unit may be the memory 400 or a memory different from the memory 400. The i-th unit (i=2 . . . N−1) may have a first port on the first data line D_L1 in the backward direction, a second port on the first data line D_L1 in the forward direction, a third port on the second data line D_L2 in the backward direction, a fourth port on the second data line D_L2 in the forward direction, a fifth port between an L0 memory of the i-th unit and the first data line D_L1, and a sixth port between the L0 memory of the i-th unit and the second data line D_L2. In some embodiments, a single port on the first data line D_L1 or the second data line D_L2 between the i-th unit and the (i+1) unit may function as a port installed in the i-th unit and a port installed in the (i+1) unit. In some embodiments, the single port may be installed in the i-th unit or the (i+1)-th unit, or be disposed between the i-th unit and the (i+1)-th unit. A port between the i-th unit and the (i+1)-th unit or a port in the forward direction of the i-th may be referred to as one or more ports between the i-th unit and the (i+1)-th unit regardless of where the one or more ports are installed. Similarly, a port between the (i−1)-th unit and the i-th unit or a port in the backward direction of the i-th may be referred to as one or more ports between the (i−1)-th unit and the i-th unit regardless of where the one or more ports are installed.

According to some embodiments, the first data line D_L1 may include one or more data lines, and the second data line D_L2 may also include one or more data lines. In some embodiments, each of the first data line D_L1 and the second data line D_L2 may consist of one data line or two or more data lines. In some embodiments, the core array CoA may include a connection line connecting the first data line D_L1 and the L0 memory 120 and a connection line connecting the second data line D_L2 and the L0 memory 120.

In some embodiments, if the first data line D_L1 and the second data line D_L2 consist of two or more data lines, the connection line connecting the first data line D_L1 and the L0 memory 120 may also be configured in two or more, and the connection line connecting the second data line D_L2 and the L0 memory 120 may also be configured in two or more.

According to some embodiments, the task manager 300 may turn on/off at least some of the two or more data lines included in the first data line D_L1 by controlling the controllable port Ctrlb_port. For example, the task manager 300 may turn off some of the two or more data lines included in the first data line D_L1 by controlling the controllable port Ctrlb_port. For another example, the task manager 300 may turn on all of the two or more data lines included in the first data line D_L1 by controlling the controllable port Ctrlb_port.

Likewise, the task manager 300 may turn on/off at least some of the two or more data lines included in the second data line D_L2 by controlling the controllable port Ctrlb_port. For example, the task manager 300 may turn off some of the two or more data lines included in the second data line D_L2 by controlling the controllable port Ctrlb_port. For another example, the task manager 300 may turn on all of the two or more data lines included in the second data line D_L2 by controlling the controllable port Ctrlb_port.

According to some embodiments, the task manager 300 can prevent unnecessary power consumption by controlling at least some of the two or more data lines included in the first data line D_L1 and the second data line D_L2 according to the bandwidth of the data. For example, if a relatively high bandwidth is required for data transmission, the task manager 300 may control the controllable port Ctrlb_port, and turn on all of the two or more data lines included in the first data line D_L1 and the second data line D_L2 and use them for data transmission. On the other hand, if a relatively low bandwidth is required for data transmission, the task manager 300 may control the controllable port Ctrlb_port, and turn on some of the two or more data lines included in the first data line D_L1 and the second data line D_L2 and turn off the rest of the data lines, thereby reducing unnecessary power consumption. In some embodiments, the task manager 300 can minimize waste of power consumption by turning off unnecessary data transmission lines according to the bandwidth required for data transmission.

According to some embodiments, each of the plurality of neural cores 100 may include a configuration (config) register C_R.

The config register C_R may store activation information, a config ID, and config lock information of the neural core 100. For convenience, a register storing activation information may be referred to as an activation information register, a register storing the config ID may be referred to as a config ID register, and a register storing config lock information may be referred to as a config lock information register. The config ID may be referred to as configuration information or configuration indication.

The activation information of the neural core 100 may represent whether the corresponding neural core 100 is activated or deactivated. In some embodiments, if the activation information represents that an associated neural core 100 is activated, it may also represent that the associated neural core 100 is used in a data path when the task manager 300 configures the data path. In some embodiments, if the activation information represents that an associated neural core 100 is deactivated, it may also represent that the associated neural core 100 is not used in a data path when the task manager 300 configures the data path.

In some embodiments, the config ID may refer to an identification number of the neural core 100 constituting the data path. The config ID may not be always fixed but may change when the task manager 300 changes data paths.

In some embodiments, the config ID for the current unit may include at least one of forward direction data path configuration information, backward direction data path configuration information, and other information. The forward direction data path configuration information may include at least one of a forward direction data use indicator indicating whether data from the previous unit in the forward direction is used in the current unit, a forward direction data pass indicator indicating whether data from the previous unit in the forward direction is passed to the next unit in the forward direction, and a forward direction data transfer indicator indicating whether data from the current unit is transferred to the next unit in the forward direction. The backward direction data path configuration information may include at least one of a backward direction data use indicator indicating whether data from the previous unit in the backward direction is used in the current unit, a backward direction data pass indicator indicating whether data from the previous unit in the backward direction is passed to the next unit in the backward direction, and a backward direction data transfer indicator indicating whether data from the current unit is transferred to the next unit in the backward direction. The other information may include at least one of a start unit indicator indicating whether the current unit is a start unit in the core array CoA, and an end unit indicator indicating whether the current unit is an end unit in the core array CoA. For example, the (i−1)-th unit, the i-th unit, and the (i+1)-th unit may be referred to as the previous unit in the forward direction, the current unit, and the next unit in the forward direction, respectively. The (i+1)-th unit, the i-th unit, and the (i−1)-th unit may be referred to as the previous unit in the backward direction, the current unit, and the next unit in the backward direction, respectively.

The config lock information may represent whether the config ID of the neural core 100 is in a locked or unlocked state. The locked state of the config ID of the neural core 100 means a state in which the config ID of the neural core 100 cannot be assigned, changed, or updated, whereas that the unlocked state of the config ID of the neural core 100 means a state in which the config ID of the neural core 100 can be assigned, changed, or updated. In some embodiments, if the config ID of the neural core 100 is in the locked state, it may mean that the neural core 100 has already been assigned a config ID and cannot be changed. If the config ID of the neural core 100 is in the unlocked state, it may mean that the neural core 100 can be assigned a new config ID.

In some embodiments, the core array CoA may include a config line CFG_L for assigning a config ID to each of the plurality of neural cores 100. The plurality of neural cores 100 may be connected in series with each other via the config line CFG_L. In some embodiments, each of the plurality of neural cores 100 may be assigned a config ID via one config line CFG_L.

As described above, each of the plurality of neural cores 100 may include a config register C_R. Each of the config registers C_R may be connected to a config line CFG_L. In some embodiments, the activation information, the config lock information, and the config ID of the neural core 100 communicated via the config line CFG_L may be stored in a config register C_R included in each of the plurality of neural cores 100.

Each of the plurality of neural cores 100 may include a config port ID_Config_port connected to the config line CFG_L. The config port ID_Config_port may be a passage through which each of the plurality of neural cores 100 and the config line CFG_L are connected.

According to some embodiments, the neural processor 1000 may include an ID config manager (ICM) 500 for activating the plurality of neural cores 100 included in the core array CoA and controlling the assignment of config IDs to each of the plurality of neural cores 100. The ID config manager 500 may be connected to the config line CFG_L. The ID config manager 500 may provide a config ID assignment signal and a config lock signal of the neural core 100 via the config line CFG_L.

According to some embodiments, the ID config manager 500 may be implemented as a separate module from the task manager 300. As described above, the ID config manager 500 may assign a config ID to each of the plurality of neural cores 100 under the control of the command processor 7000. However, embodiments are not limited thereto, and in some other embodiments, the task manager 300 may perform at least some functions of the ID config manager 500. In some embodiments, a person having ordinary skill in the art to which the present disclosure pertains can implement the task manager 300 and the ID config manager 500 as separate modules according to design, or can design such that the task manager 300 can perform all/some of the operations performed by the ID config manager 500.

In summary, the plurality of neural cores 100 included in the core array CoA in accordance with some embodiments may be connected in series with each other by the first data line D_L1 and the second data line D_L2. Further, each of the L0 memories 120 may be connected to the first data line D_L1 and the second data line D_L2 via the first data line D_L1 and the second data line D_L2. In some embodiments, the core array CoA may include the controllable port Ctrlb_port capable of controlling on/off. Therefore, the task manager 300 may configure a movement path for the data provided from the memory 400 to the plurality of neural cores 100 by controlling on/off of the controllable port Ctrlb_port.

The plurality of neural cores 100 included in the core array CoA in accordance with some embodiments may be connected in series with each other by the config line CFG_L. Further, each of the plurality of neural cores 100 may include the config register C_R connected to the config line CFG_L. The ID config manager 500 may assign a config ID to each of the plurality of neural cores 100 by providing the config ID assignment signal and the config lock signal of the neural core 100.

According to some embodiments, the config line CFG_L may be configured separately from the first data line D_L1 and the second data line D_L2. Therefore, it may not be necessary to consider the direction of the data path, the number of neural cores 100 required for the data path, or the like in order to assign config IDs to the plurality of neural cores 100. Therefore, the neural processor 1000 in accordance with some embodiments may not be limited by the direction or configuration of data paths in assigning a config ID to each of the plurality of neural cores 100. Similarly, since the plurality of neural cores 100 can be assigned config IDs via separate config lines CFG_L, it may not be necessary to consider whether config IDs are assigned to the plurality of neural cores 100 even when configuring data paths by using the plurality of neural cores 100. In some embodiments, since the first data line D_L1 and the second data line D_L2 through which data is transmitted and the config lines CFG_L through which the config IDs are assigned are configured separately, configuring the data paths and assigning the config IDs can be controlled independently.

Hereinafter, reference is further made to FIGS. 8A to 8H to describe a method for assigning a config ID to each of the plurality of neural cores 100.

FIGS. 8A to 8H are example diagrams showing a method for assigning a config ID to each of a plurality of neural cores. In some embodiments, it is assumed that the ID config manager 500 assigns config IDs to L neural cores 100.

Figure 8A:
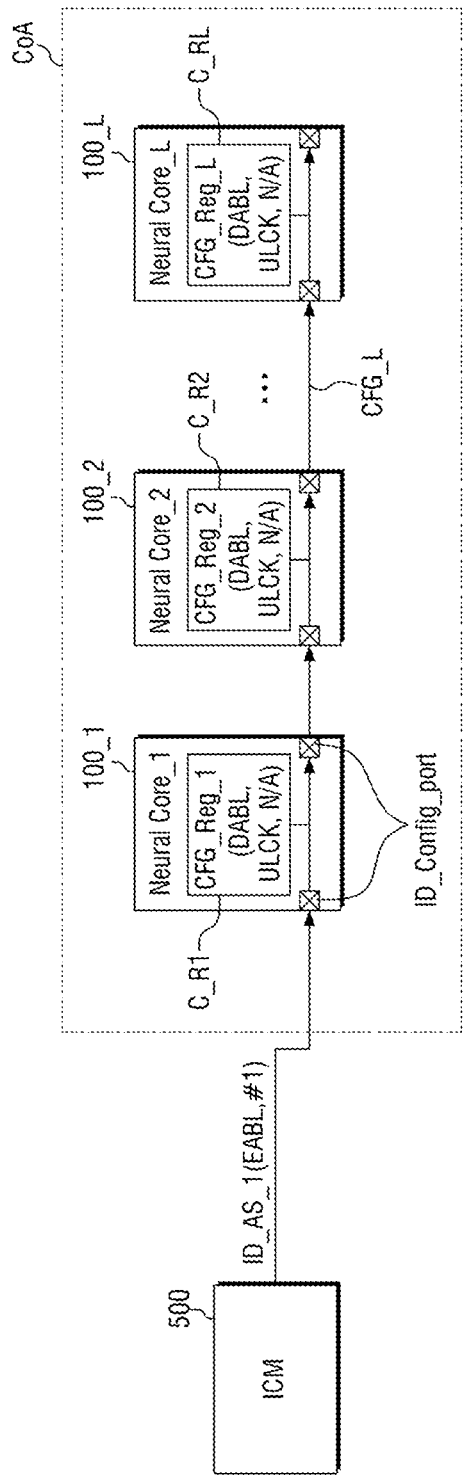
FIGS. 8A to 8H are example diagrams showing a method for assigning a config ID to each of a plurality of neural cores.

Referring to FIGS. 6, 7, and 8A, the core array CoA may include a first neural core 100_1, a second neural core 100_2, . . . , an L-th neural core 100_L, and a config line CFG_L connecting them. In some embodiments, the first neural core 100_1, the second neural core 100_2, . . . , and the L-th neural core 100_L included in the core array CoA may be connected in series with each other via the config line CFG_L.

The first neural core 100_1 may include a first config register C_R1. The second neural core 100_2 may include a second config register C_R2. Similarly, the L-th neural core 100_L may include an L-th config register C_RL.

The first config register C_R1 may store activation information, config lock information, and a config ID for the first neural core 100_1. Similarly, the second config register C_R2 may store activation information, config lock information, and a config ID for the second neural core 100_2, and the L-th config register C_RL may store activation information, config lock information, and a config ID for the L-th neural core 100_L.

First of all, for the ID config manager 500 to assign config IDs to the neural cores 100_1 . . . 100_L, the ID config manager 500 may provide a configuration reset signal to the neural cores 100_1 . . . 100_L. In some embodiments, the ID config manager 500 may provide the configuration reset signal to the neural cores 100_1. The i-th neural cores 100_i may reset the i-th config register C_Ri and pass the configuration reset signal to the (i+1)-th neural core (i=1 . . . L). In some embodiments, when the i-th config register C_Ri is reset, the activation information in the i-th config register C_Ri may be reset to disable (DABL), the config lock information in the i-th config register C_Ri may be reset to unlocked (ULCK), and the config ID in the i-th config register C_Ri may be reset to not applicable (N/A). Since the L-th neural core 100_L is the last neural core, the L-th neural core 100_L may provide a reset done signal to the (L−1)-th neural core, when the L-th neural core 100_L finishes resetting the L-th config register C_RL Likewise, the i-th neural core may provide a reset done signal to the (i−1)-th neural core, when the i-th neural core finishes resetting the i-th config register C_Ri (i=L−1 . . . 2). The 1st neural core 100_1 may provide a reset done signal to the ID config manager 500, when the 1st neural core 100_1 finishes resetting the 1st config register C_R1.

The ID config manager 500 may be connected to the config line CFG_L and assign a config ID to each of the first neural core 100_1 to the L-th neural core 100_L. First, the ID config manager 500 may provide a first config ID assignment signal ID_AS_1 to the first neural core 100_1 via the config line CFG_L. The first config ID assignment signal ID_AS_1 may include or carry an activation signal EABL and a first config ID #1 for the first neural core 100_1. The activation signal EABL for the first neural core 100_1 may be a signal for requesting the first neural core 100_1 to be activated.

The first neural core 100_1 may check the config lock information stored in the first config register C_R1. According to FIG. 8A, the config lock information stored in the first config register C_R1 may represent that the first neural core 100_1 is in an unlocked state ULCK. Since the config lock information stored in the first config register C_R1 represent that the first neural core 100_1 is in the unlocked state ULCK, the first neural core 100_1 may activate the ID configuration of the first neural core 100_1 according to the activation signal EABL included in the first config ID assignment signal ID_AS_1. In some embodiments, activating the ID configuration of the first neural core 100_1 may mean a state in which the config ID of the first neural core 100_1 can be set. Subsequently, the first neural core 100_1 may store the first config ID #1 included in the first config ID assignment signal ID_AS_1 as the config ID of the first neural core 100_1 into the first config register C_R1 and change the configuration lock status of the first neural core 100_1 from the unlocked status to the locked status by changing the value of the config lock information from a value representing that the first neural core 100_1 is in the unlocked status to a value representing that the first config register C_R1 is in the locked status.

Figure 8B:
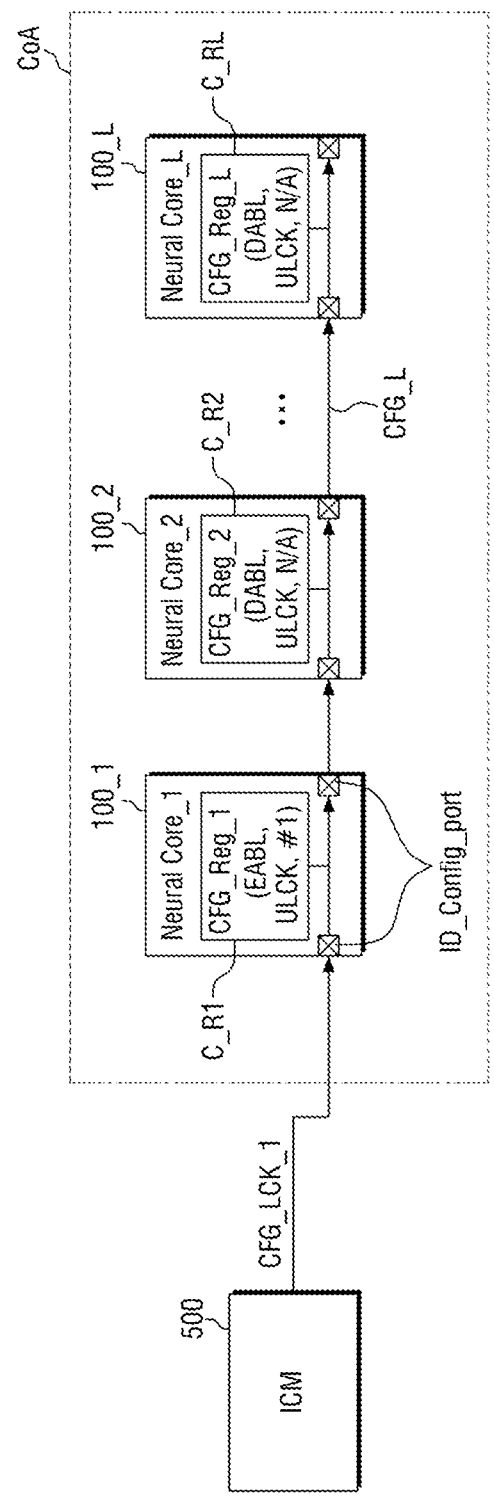

With further reference to FIG. 8B, the ID config manager 500 may provide the first config ID assignment signal ID_AS_1 to the first neural core 100_1 and then provide a first config lock signal CFG_LCK_1 to the first neural core 100_1.

In some embodiments, after the first neural core 100_1 may store the received config ID into the first config register C_R1, the first neural core 100_1 may change the configuration lock status of the first neural core 100_1 from the unlocked status to the locked status only after the first neural core 100_1 receives the config lock signal. Since the config lock information stored in the first config register C_R1 is in the unlocked state ULCK, the first neural core 100_1 may change the config ID of the first neural core 100_1 to a locked state by using the first config lock signal CFG_LCK_1 provided from the ID config manager 500.

In some embodiments, after the first neural core 100_1 may store the received config ID into the first config register C_R1, the first neural core 100_1 may change the configuration lock status of the first neural core 100_1 from the unlocked status to the locked status regardless of whether the first neural core 100_1 receives the config lock signal. The ID config manager 500 may provide the config lock signal to definitely change the configuration lock status of the first neural core 100_1 from the unlocked status to the locked status.

In some embodiments, after the first neural core 100_1 may store the received config ID into the first config register C_R1, the first neural core 100_1 may change the configuration lock status of the first neural core 100_1 from the unlocked status to the locked status and the ID config manager 500 may not provide the config lock signal.

Figure 8C:
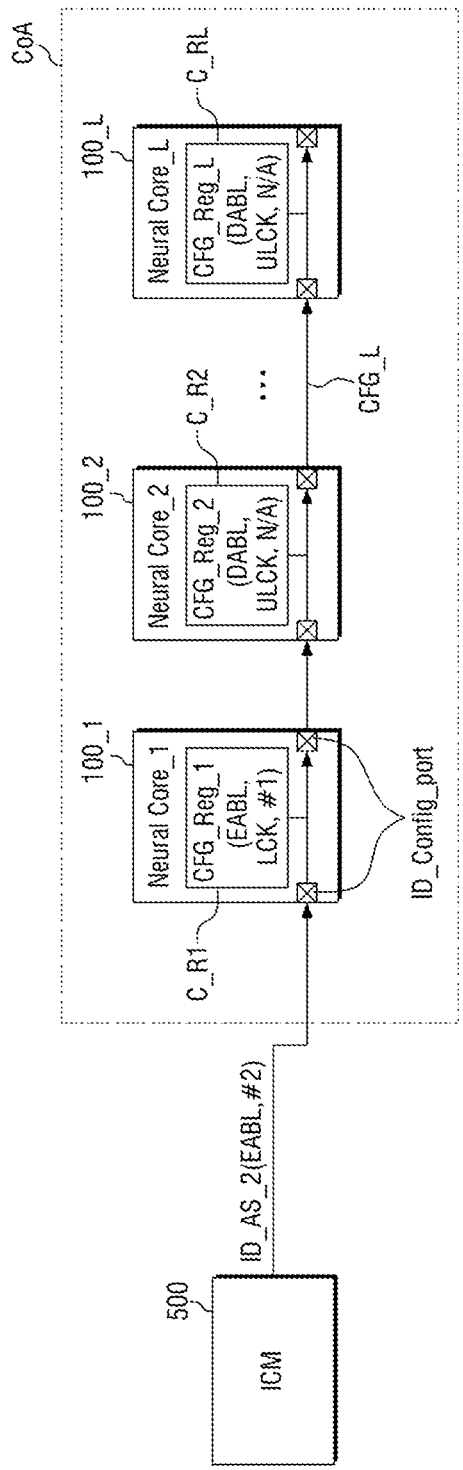

With further reference to FIG. 8C, the ID config manager 500 may provide the first config lock signal CFG_LCK_1 to the first neural core 100_1 and then provide a second config ID assignment signal ID_AS_2 to the first neural core 100_1.

The first neural core 100_1 may check the config lock information stored in the first config register C_R1. In some embodiments, since the config lock information stored in the first config register C_R1 means the locked state LCK, the first neural core 100_1 may provide the second config ID assignment signal ID_AS_2 provided from the ID config manager 500 to the second neural core 100_2. In some embodiments, if the config lock information stored in the first config register C_R1 is in the locked state LCK, the ID config manager 500 may provide the second config ID assignment signal ID_AS_2 to the second neural core 100_2 by way of the first neural core 100_1.

The second neural core 100_2 may check the config lock information stored in the second config register C_R2. In some embodiments, the config lock information stored in the second config register C_R2 may be in the unlocked state ULCK. Since the config lock information stored in the second config register C_R2 is in the unlocked state ULCK, the second neural core 100_2 may activate the ID configuration of the second neural core 100_2 by using an activation signal EABL included in the second config ID assignment signal ID_AS_2. Subsequently, the second neural core 100_2 may store a second config ID #2 included in the second config ID assignment signal ID_AS_2 as the config ID of the second neural core 100_2 into the second config register C_R2 and change the configuration lock status of the second neural core 100_2 from the unlocked status to the locked status by changing the value of the config lock information from a value representing that the second neural core 100_2 is in the unlocked status to a value representing that the second config register C_R2 is in the locked status.

Figure 8D:
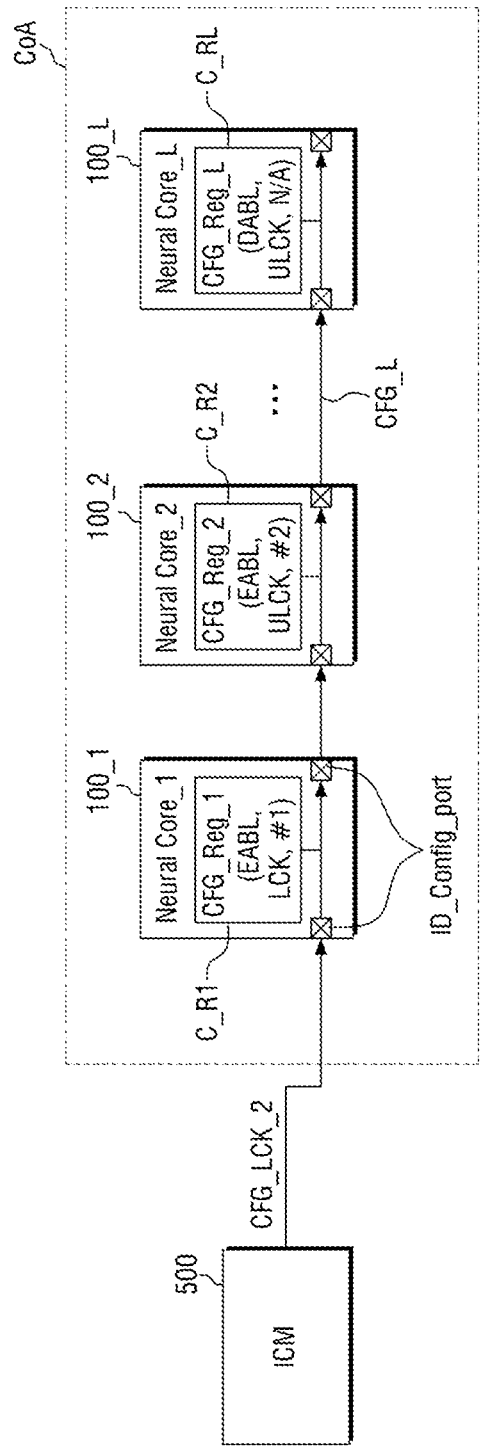

With further reference to FIG. 8D, the ID config manager 500 may provide the second config ID assignment signal ID_AS_2 to the second neural core 100_2 and then provide a second config lock signal CFG_LCK_2 to the first neural core 100_1.

The first neural core 100_1 may check the config lock information stored in the first config register C_R1. Since the config lock information stored in the first config register C_R1 is in the locked state LCK, the first neural core 100_1 may provide the second config lock signal CFG_LCK_2 to the second neural core 100_2. In some embodiments, if the config lock information stored in the first config register C_R1 is in the locked state LCK, the ID config manager 500 may provide the second config lock signal CFG_LCK_2 to the second neural core 100_2 by way of the first neural core 100_1.

Since the config lock information stored in the second config register C_R2 is in the unlocked state ULCK, the second neural core 100_2 may change the config ID of the second neural core 100_2 to the locked state by using the second config lock signal CFG_LCK_2. The process of FIGS. 8A and 8B or FIGS. 8C and 8D may be repeated a plurality of times.

Figure 8E:
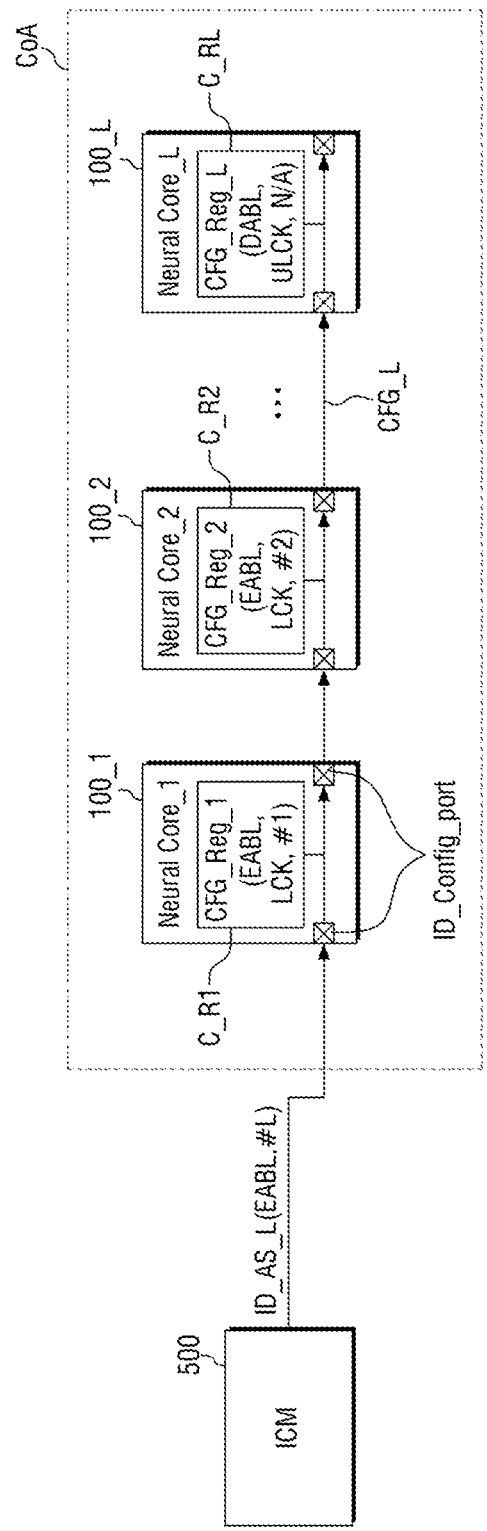

With further reference to FIG. 8E, the ID config manager 500 may provide an L-th config ID assignment signal ID_AS_L to the first neural core 100_1.

Since the config lock information stored in the first config register C_R1 and the second config register C_R2 is in the locked state LCK, the first neural core 100_1 may provide the L-th config ID assignment signal ID_AS_L to the second neural core 100_2, and the second neural core 100_2 may provide the L-th config ID assignment signal ID_AS_L to the next neural core. Such a process is repeated, so that the L-th config ID assignment signal ID_AS_L may eventually be provided to the L-th neural core 100_L.

The L-th neural core 100_L may check the config lock information stored in the L-th config register C_RL. Since the config lock information stored in the L-th config register C_RL is in the unlocked state ULCK, the L-th neural core 100_L may activate the ID configuration of the L-th neural core 100_L by using an activation signal EABL included in the L-th config ID assignment signal ID_AS_L. Subsequently, the L-th neural core 100_L may store an L-th config ID #L included in the L-th config ID assignment signal ID_AS_L as the config ID of the L-th neural core 100_L into the L-th config register C_RL and change the configuration lock status of the L-th neural core 100_L from the unlocked status to the locked status by changing the value of the config lock information from a value representing that the L-th neural core 100_L is in the unlocked status to a value representing that the L-th config register C_RL is in the locked status.

Figure 8F:
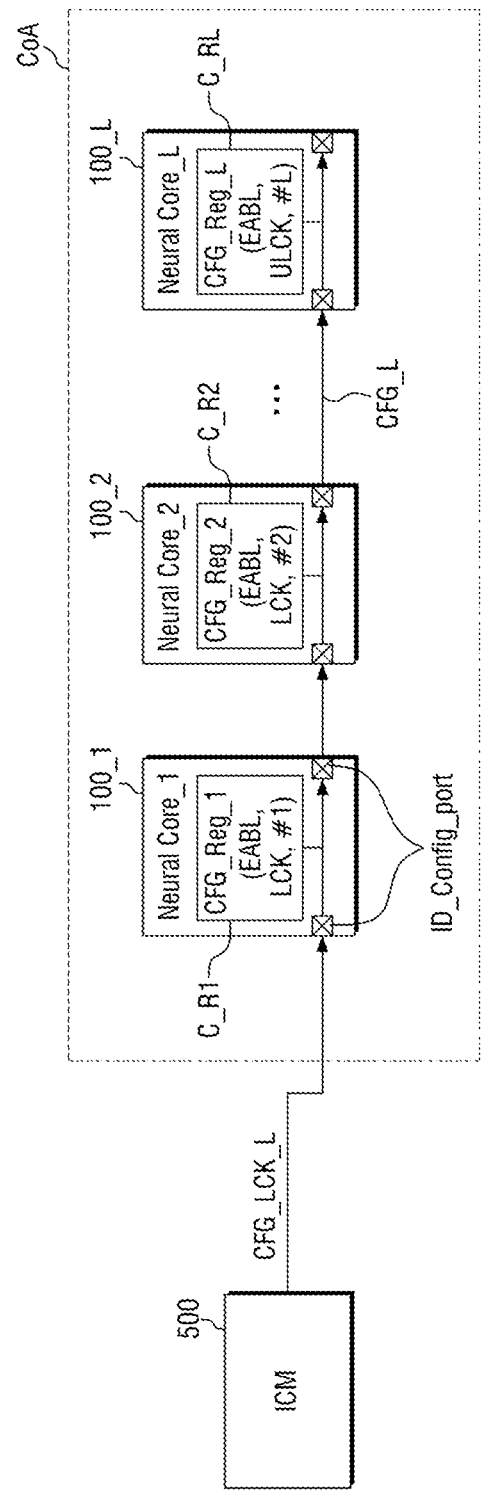

With further reference to FIG. 8F, the ID config manager 500 may provide the L-th config ID assignment signal ID_AS_L to the L-th neural core 100_L and then provide an L-th config lock signal CFG_LCK_L to the first neural core 100_1.

The L-th config lock signal CFG_LCK_L provided to the first neural core 100_1 may be provided to the L-th neural core 100_L by way of the first neural core 100_1 and the second neural core 100_2.

Since the config lock information stored in the L-th config register C_RL is in the unlocked state ULCK, the L-th neural core 100_L may change the config ID of the L-th neural core 100_L to a locked state by using the L-th config lock signal CFG_LCK_L.

Figure 8G:
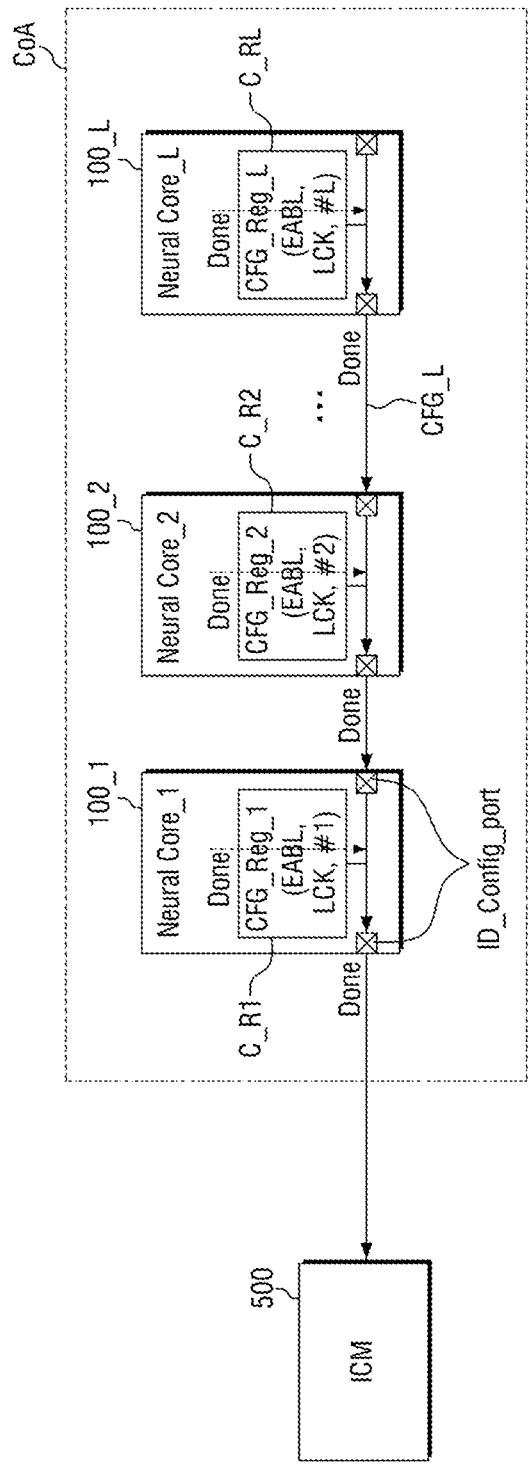

With further reference to FIG. 8G, if the config ID assignment signal and the config lock signal are no longer provided from the ID config manager 500, the L-th neural core 100_L may refer to the L-th config register C_RL, and generate an ID config completion signal Done according to the ID configuration status. The ID config completion signal Done generated at the L-th neural core 100_L may be provided to the previous neural core (e.g., an (L−1)th neural core) of the L-th neural core 100_L. When the (L−1)th neural core receives the config completion signal Done from the L-th neural core 100_L, it may check the ID configuration status by referring to the (L−1)th config register of the (L−1)th neural core, and generate a config completion signal Done. If both the generated signal and the signal provided from the L-th neural core 100_L are config completion signals Done, the (L−1)th neural core may provide a config completion signal Done to the previous neural core (e.g., an (L−2)th neural core) of the (L−1)th neural core. This process is repeated, so that the second neural core 100_2 to which the config completion signal Done has been provided may generate a config completion signal Done according to the ID configuration status by referring to the second config register C_R2, and provide it to the first neural core 100_1. Likewise, the first neural core 100_1 may generate a config completion signal Done according to the ID configuration status by referring to the first config register C_R1, and provide it to the ID config manager 500.

When the ID config manager 500 receives the ID config completion signal Done from the first neural core 100_1, it can confirm or determine that all ID configurations have been completed successfully. On the other hand, if even a single ID configuration fails in the neural core 100, the ID config manager 500 may be provided with an ID config failure signal fail. For example, refer further to FIG. 8H.

Figure 8H:
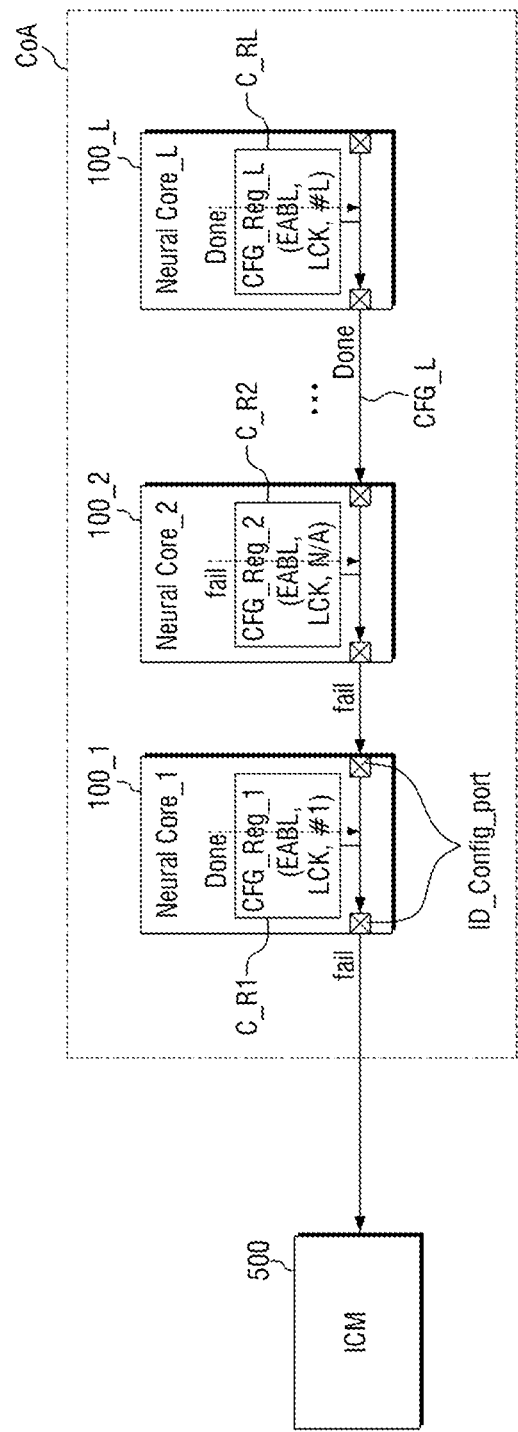

FIG. 8H illustrates an assumed case in which the ID configuration of the second neural core 100_2 has failed. Referring further to FIG. 8H, the second neural core 100_2 may be provided with a config completion signal Done from the next neural core (e.g., a third neural core) of the second neural core 100_2. The second neural core 100_2 may check that the ID configuration has failed by referring to the second config register C_R2. In some embodiments, the second neural core 100_2 may generate an ID config failure signal fail. If there is an ID config failure signal fail in any one of the generated signal and the signal provided from the third neural core, the second neural core 100_2 may provide an ID config failure signal fail to the first neural core 100_1. In some embodiments, since the second neural core 100_2 has generated the ID config failure signal fail, it can provide the ID config failure signal fail to the first neural core 100_1.

The first neural core 100_1 may be provided with the ID config failure signal fail. The first neural core 100_1 may generate an ID config complete signal Done by referring to the first config register C_R1. Even if the first neural core 100_1 has generated the ID config completion signal Done, it can provide the ID config failure signal fail to the ID config manager 500 because it has been provided with the ID config failure signal fail from the second neural core 100_2.

If the ID config manager 500 has received the ID config failure signal fail, it can detect that the ID configuration process has failed. In some embodiments, the ID config manager 500 may perform the ID configuration process again through processes 8A to 8F, or may perform a new ID configuration by changing the ID configuration plan.

According to some embodiments, the ID config manager 500 may determine that the ID configuration has failed when it has not received the ID config completion signal Done for a predetermined time as well.

In the disclosure, the ID config completion signal Done and the ID config failure signal fail may be referred to as a feedback signal or an ID config feedback signal. The feedback signal may indicate that the config IDs have been successfully assigned to all neural cores or that config IDs have failed to be assigned to any neural core.

In summary, the plurality of neural cores 100 can determine whether to provide the config ID assignment signal and the config lock signal to the next neural core 100 or to use them in the corresponding neural core 100 according to the config lock information stored in the config register C_R. For example, if the config lock information is in the unlocked state, the neural core 100 may assign a config ID to the corresponding neural core 100 by using the config ID assignment signal provided from the ID config manager 500, and change the config ID for the corresponding neural core 100 the locked state by using the config lock signal.

On the other hand, if the config lock information is in the locked state, the neural core 100 may provide the config ID assignment signal and the config lock signal to the next neural core 100 connected in series via the config line CFG_L. In some embodiments, signals provided from the ID config manager 500 may be used in the corresponding neural core 100 or provided to the next neural core 100 according to the config lock information stored in the config register C_R.

According to some embodiments, since the plurality of neural cores 100 is connected in series via the config line CFG_L, and the ID config manager 500 sequentially assigns config IDs to each of the plurality of neural cores 100 via the config line CFG_L, no separate design change is required even when adding neural cores 100 to the core array CoA. In addition, since the config line CFG_L can be extended to the new neural cores 100 and config IDs can be assigned using the ID config manager 500, it can have a very favorable advantage in terms of design scalability. Moreover, even if the number of neural cores increases, even without using many data lines and even without assigning unique identifiers to the neural cores, various data paths can be configured with a limited number of data lines by using a signal without an identifier of an associated neural core, thereby reducing the hardware complexity and power consumption.

Figure 9:
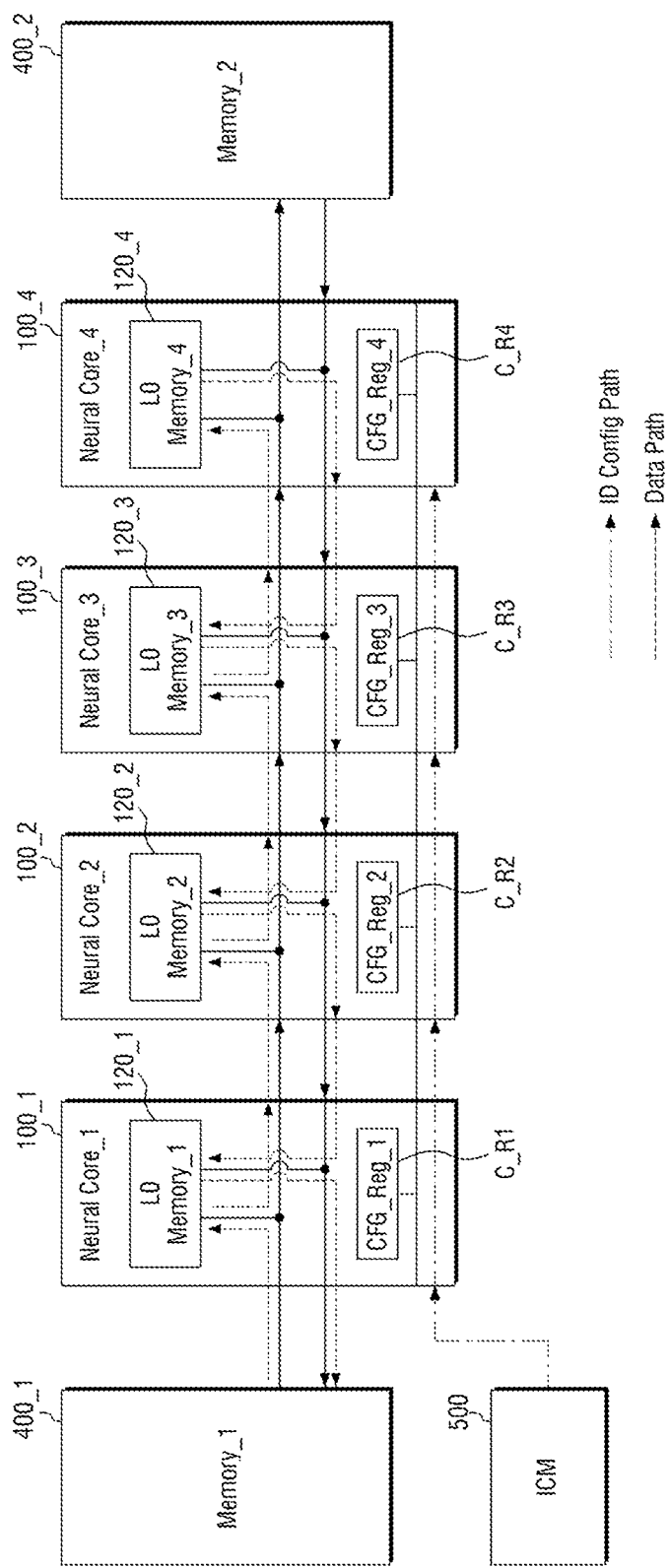
FIG. 9 is an example diagram showing a sequence of assigning config IDs and the configuration of a first data path in accordance with some embodiments.

FIG. 9 is an example diagram showing a sequence of assigning config IDs and the configuration of a first data path in accordance with some embodiments. For convenience of description, the description is given assuming that the neural processor 1000 includes four neural cores 100, and it is apparent that embodiments are not limited to the number of neural cores 100. Further, in the following, descriptions that are identical to or similar to those described above will be omitted or described briefly for the convenience of description.

Referring to FIGS. 6, 7, and 9, the neural processor 1000 may include a first memory 400_1, a second memory 400_2, and a core array CoA. The core array CoA may include a first neural core 100_1, a second neural core 100_2, a third neural core 100_3, and a fourth neural core 100_4. The second memory 400_2 may be the same as or different from the first memory 400_1. In this specification, the term 'data path' is defined to refer to a path through which the data outputted from the memory 400 is inputted to the memory 400. In some embodiments, the 'data path' refers to a path through which data moves from the memory 400 to the core array CoA and from the core array CoA to the memory 400. However, the definition of such a term is for convenience of description, and the present embodiments are not limited to such a term.

The first neural core 100_1 may include a first L0 memory 120_1 and a first config register C_R1. The second neural core 100_2 may include a second L0 memory 120_2 and a second config register C_R2. The third neural core 100_3 may include a third L0 memory 120_3 and a third config register C_R3. The fourth neural core 100_4 may include a fourth L0 memory 120_4 and a fourth config register C_R4.

According to some embodiments, the ID config manager 500 may sequentially assign config IDs to the first neural core 100_1 through the fourth neural core 100_4. For example, the ID config manager 500 may provide a first config ID assignment signal to the first neural core 100_1. The first neural core 100_1 may check the config lock information stored in the first config register C_R1. If the config lock information stored in the first config register C_R1 is in the unlocked state, the first neural core 100_1 may activate the ID configuration of the first neural core 100_1 by using an activation signal included in the first config ID assignment signal, and assign a first config ID to the first neural core 100_1. Subsequently, the ID config manager 500 may provide a first config lock signal to the first neural core 100_1. The first neural core 100_1 may change the config lock information stored in the first config register C_R1 from an unlocked state to a locked state by using the first config lock signal. Subsequently, the ID config manager 500 may provide a second config ID assignment signal to the first neural core 100_1. Since the config lock information stored in the first config register C_R1 is in the locked state, the first neural core 100_1 may provide the second config ID assignment signal to the second neural core 100_2 connected to the first neural core 100_1. Since the config lock information stored in the second config register C_R2 is in the unlocked state, the second neural core 100_2 may activate the ID configuration of the second neural core 100_2 by using an activation signal included in the second config ID assignment signal, and assign a second config ID to the second neural core 100_2. Subsequently, the ID config manager 500 may provide a second config lock signal to the first neural core 100_1. Since the config lock information stored in the first config register C_R1 is in the locked state, the second config lock signal may be provided to the second neural core 100_2 connected to the first neural core 100_1. The second neural core 100_2 may change the config lock information included in the second config register C_R2 from the unlocked state to the locked state by using the second config lock signal. In a similar sequence, a third config ID assignment signal and a third config lock signal provided from the ID config manager 500 may be provided to the third neural core 100_3 by way of the first neural core 100_1 and the second neural core 100_2. Likewise, a fourth config ID assignment signal and a fourth config lock signal provided from the ID config manager 500 may be provided to the fourth neural core 100_4 by way of the first neural core 100_1, the second neural core 100_2, and the third neural core 100_3. In some embodiments, the ID config manager 500 may assign config IDs in sequence to the first neural core 100_1, the second neural core 100_2, the third neural core 100_3, and the fourth neural core 100_4.

When the config IDs for the first neural core 100_1 through the fourth neural core 100_4 are assigned, a first data path may be configured according to the config IDs assigned to the first neural core 100_1 through the fourth neural core 100_4 and the controllable port Ctrlb_port.

Referring to FIG. 9, for neural cores 101_1, 100_2, and 100_3, the forward direction data use indicator indicates that data from the previous unit in the forward direction is used in the current unit, the forward direction data pass indicator indicates that data from the previous unit in the forward direction is not passed to the next unit in the forward direction, the forward direction data transfer indicator indicates that data from the current unit is transferred to the next unit in the forward direction, the backward direction data use indicator indicates that data from the previous unit in the backward direction is used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. For neural core 101_4, the forward direction data use indicator indicates that data from the previous unit in the forward direction is used in the current unit, the forward direction data pass indicator indicates that data from the previous unit in the forward direction is not passed to the next unit in the forward direction, the forward direction data transfer indicator indicates that data from the current unit is not transferred to the next unit in the forward direction, the backward direction data use indicator indicates that data from the previous unit in the backward direction is not used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. Therefore, the first data path may include a data movement path in the forward direction in which data is provided from the first memory 400_1 to the first L0 memory 120_1, from the first L0 memory 120_1 to the second L0 memory 120_2, from the second L0 memory 120_2 to the third L0 memory 120_3, and from the third L0 memory 120_3 to the fourth L0 memory 120_4, and a data movement path in the backward direction in which data is provided from the fourth L0 memory 120_4 to the third L0 memory 120_3, from the third L0 memory 120_3 to the second L0 memory 120_2, from the second L0 memory 120_2 to the first L0 memory 120_1, and from the first L0 memory 120_1 to the first memory 400_1.

In some embodiments, the task manager 300 may determine the start neural core 100 and the end neural core 100 of the data movement path by using the config IDs assigned to the first neural core 100_1 through the fourth neural core 100_4. In some embodiments, the task manager 300 may configure the first data path by controlling the controllable port Ctrlb_port, so that data is computed by way of the first neural core 100_1 through the fourth neural core 100_4, and is computed again by way of the third neural core 100_3, the second neural core 100_2, and the first neural core 100_1. In some embodiments, it is assumed that the data provided to each L0 memory 120 is computed by a processing unit included in each neural core 100.

Described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may control to provide the third data to the third L0 memory 120_3. The third neural core 100_3 may generate fourth data by computing the third data. The task manager 300 may control to provide the fourth data to the fourth L0 memory 120_4. The fourth neural core 100_4 may generate fifth data by computing the fourth data. The task manager 300 may control to provide the fifth data to the third L0 memory 120_3. The third neural core 100_3 may generate sixth data by computing the fifth data. The task manager 300 may control to provide the sixth data to the second L0 memory 120_2. The second neural core 100_2 may generate seventh data by computing the sixth data. The task manager 300 may control to provide the seventh data to the first L0 memory 120_1. The first neural core 100_1 may generate eighth data by computing the seventh data. The task manager 300 may provide the eighth data to the first memory 400_1 and control the first memory 400_1 to store the eighth data.

Figure 10:
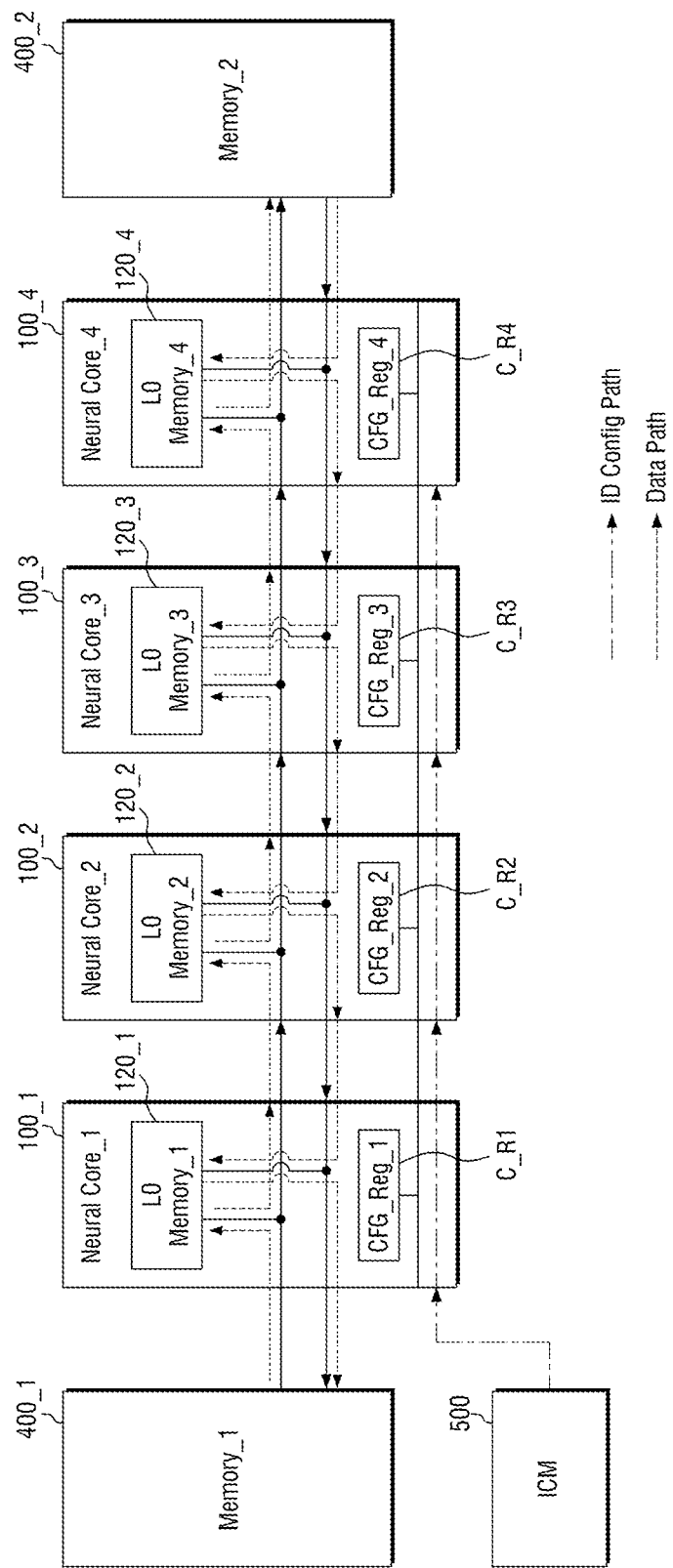
FIG. 10 is a diagram showing a sequence of assigning config IDs and the configurations of a second data path and a third data path in accordance with some embodiments.

FIG. 10 is a diagram showing a sequence of assigning config IDs and the configurations of a second data path and a third data path in accordance with some embodiments.

Referring to FIGS. 6, 7, and 10, the first neural core 100_1 may include a first L0 memory 120_1 and a first config register C_R1. The second neural core 100_2 may include a second L0 memory 120_2 and a second config register C_R2. The third neural core 100_3 may include a third L0 memory 120_3 and a third config register C_R3. The fourth neural core 100_4 may include a fourth L0 memory 120_4 and a fourth config register C_R4.

According to some embodiments, the ID config manager 500 may provide a first config ID assignment signal and a first config lock signal to the first neural core 100_1. The first neural core 100_1 may activate the ID configuration of the first neural core 100_1 by using the first config ID assignment signal, and assign a first config ID to the first neural core 100_1. The first neural core 100_1 may change the first config ID assigned to the first neural core 100_1 to a locked state by using the first config lock signal. In some embodiments, the ID config manager 500 may provide a second config ID assignment signal and a second config lock signal to the second neural core 100_2 by way of the first neural core 100_1. The second neural core 100_2 may activate the ID configuration of the second neural core 100_2 by using the second config ID assignment signal and assign a second config ID to the second neural core 100_2. Further, the second neural core 100_2 may change the second config ID assigned to the second neural core 100_2 to a locked state by using the second config lock signal. In some embodiments, the ID config manager 500 may provide a third config ID assignment signal and a third config lock signal to the third neural core 100_3 by way of the first neural core 100_1 and the second neural core 100_2. The third neural core 100_3 may activate the ID configuration of the third neural core 100_3 by using the third config ID assignment signal and assign a third config ID to the third neural core 100_3. Further, the third neural core 100_3 may change the third config ID assigned to the third neural core 100_3 to a locked state by using the third config lock signal. In some embodiments, the ID config manager 500 may provide a fourth config ID assignment signal and a fourth config lock signal to the fourth neural core 100_4 by way of the first neural core 100_1, the second neural core 100_2, and the third neural core 100_3. The fourth neural core 100_4 may activate the ID configuration of the fourth neural core 100_4 by using the fourth config ID assignment signal, and assign a fourth config ID to the fourth neural core 100_4. Further, the fourth neural core 100_4 may change the fourth config ID assigned to the fourth neural core 100_4 to a locked state by using the fourth config lock signal.

Once the config IDs for each of the first neural core 100_1 through the fourth neural core 100_4 are assigned, a second data path in the forward direction may be configured according to the config IDs assigned to each of the first neural core 100_1 through the fourth neural core 100_4 and the controllable port Ctrlb_port. For neural cores 101_1, 100_2, 100_3, and 100_4, the forward direction data use indicator indicates that data from the previous unit in the forward direction is used in the current unit, the forward direction data pass indicator indicates that data from the previous unit in the forward direction is not passed to the next unit in the forward direction, and the forward direction data transfer indicator indicates that data from the current unit is transferred to the next unit in the forward direction. Therefore, data is provided from the first memory 400_1 to the first L0 memory 120_1, from the first L0 memory 120_1 to the second L0 memory 120_2, from the second L0 memory 120_2 to the third L0 memory 120_3, from the third L0 memory 120_3 to the fourth L0 memory 120_4, and from the fourth L0 memory 120_4 to the second memory 400_2.

In some embodiments, the task manager 300 may determine the start neural core 100 and the end neural core 100 of the data movement path by using the config IDs assigned to the first neural core 100_1 through the fourth neural core 100_4. In some embodiments, the task manager 300 may provide data in the first direction from the first memory 400_1 toward the second memory 400_2 by controlling the controllable port Ctrlb_port, so that data is computed by way of the first neural core 100_1 through the fourth neural core 100_4. For example, it is assumed that the data provided to each L0 memory 120 is computed by a processing unit included in each neural core 100.

Described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may control to provide the third data to the third L0 memory 120_3. The third neural core 100_3 may generate fourth data by computing the third data. The task manager 300 may control to provide the fourth data to the fourth L0 memory 120_4. The fourth neural core 100_4 may generate fifth data by computing the fourth data. The task manager 300 may provide the fifth data to the second memory 400_2 and control the second memory 400_2 to store the fifth data.

In some embodiments, the task manager 300 may configure a third data path in the backward direction by controlling the controllable port Ctrlb_port. For neural cores 101_1, 100_2, 100_3, and 100_4, the backward direction data use indicator indicates that data from the previous unit in the backward direction is used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. Therefore, data is provided from the second memory 400_2 to the fourth L0 memory 120_4, from the fourth L0 memory 120_4 to the third L0 memory 120_3, from the third L0 memory 120_3 to the second L0 memory 120_2, from the second L0 memory 120_2 to the first L0 memory 120_1, and from the first L0 memory 120_1 to the first memory 400_1.

In some embodiments, the task manager 300 may provide data in the second direction from the second memory 400_2 toward the first memory 400_1 by controlling the controllable port Ctrlb_port, so that data is computed by way of the fourth neural core 100_4 through the first neural core 100_1.

Described in terms of data computation, the task manager 300 may control to provide sixth data outputted from the second memory 400_2 to the fourth L0 memory 120_4. The first neural core 100_1 may generate seventh data by computing the sixth data. The task manager 300 may control to provide the seventh data to the third L0 memory 120_3. The third neural core 100_3 may generate eighth data by computing the seventh data. The task manager 300 may control to provide the eighth data to the second L0 memory 120_2. The second neural core 100_2 may generate ninth data by computing the eighth data. The task manager 300 may control to provide the ninth data to the first L0 memory 120_1. The first neural core 100_1 may generate tenth data by computing the ninth data. The task manager 300 may provide the tenth data to the first memory 400_1 and control the first memory 400_1 to store the tenth data.

In summary, the task manager 300 may configure the second data path and the third data path by controlling the controllable port Ctrlb_port included in the core array CoA. The second data path may refer to a path through which data moves in the first direction from the first memory 400_1 to the second memory 400_2 by way of the first L0 memory 120_1, the second L0 memory 120_2, the third L0 memory 120_3, and the fourth L0 memory 120_4. Further, the third data path may refer to a path through which data moves in the second direction from the second memory 400_2 to the first memory 400_1 by way of the fourth L0 memory 120_4, the third L0 memory 120_3, the second L0 memory 120_2, and the first L0 memory 120_1.

Figure 11:
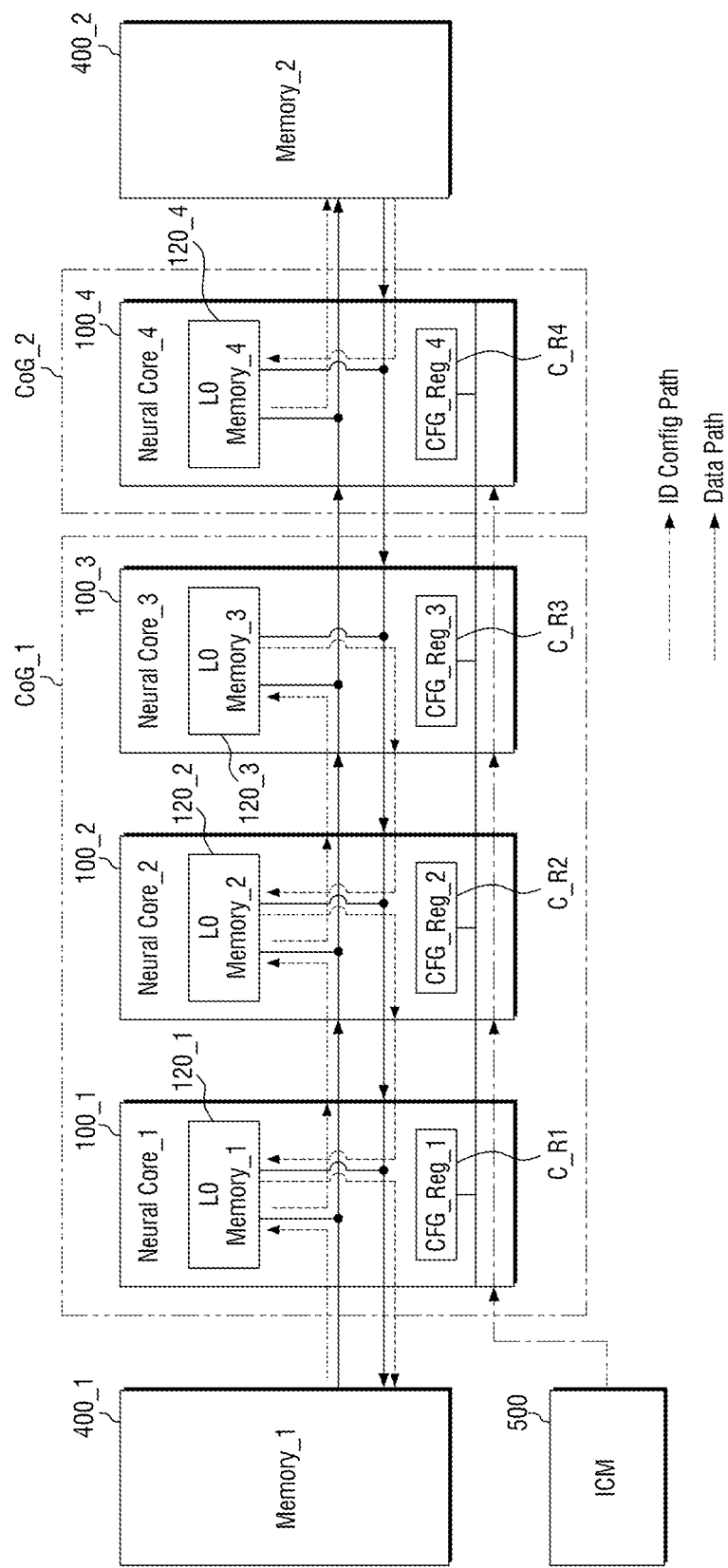
FIG. 11 is a diagram showing a sequence of assigning config IDs and the configuration of a fourth data path and a fifth data path in accordance with some embodiments.

FIG. 11 is a diagram showing a sequence of assigning config IDs and the configuration of a fourth data path and a fifth data path in accordance with some embodiments.

Referring to FIGS. 6, 7, and 11, the first neural core 100_1 may include a first L0 memory 120_1 and a first config register C_R1. The second neural core 100_2 may include a second L0 memory 120_2 and a second config register C_R2. The third neural core 100_3 may include a third L0 memory 120_3 and a third config register C_R3. The fourth neural core 100_4 may include a fourth L0 memory 120_4 and a fourth config register C_R4.

According to some embodiments, the ID config manager 500 may provide a first config ID assignment signal and a first config lock signal to the first neural core 100_1. The first neural core 100_1 may activate the ID configuration of the first neural core 100_1 by using the first config ID assignment signal, and assign a first config ID to the first neural core 100_1. The first neural core 100_1 may change the first config ID assigned to the first neural core 100_1 to a locked state by using the first config lock signal. In some embodiments, the ID config manager 500 may provide a second config ID assignment signal and a second config lock signal to the second neural core 100_2 by way of the first neural core 100_1. The second neural core 100_2 may activate the ID configuration of the second neural core 100_2 by using the second config ID assignment signal and assign a second config ID to the second neural core 100_2. Further, the second neural core 100_2 may change the second config ID assigned to the second neural core 100_2 to a locked state by using the second config lock signal. In some embodiments, the ID config manager 500 may provide a third config ID assignment signal and a third config lock signal to the third neural core 100_3 by way of the first neural core 100_1 and the second neural core 100_2. The third neural core 100_3 may activate the ID configuration of the third neural core 100_3 by using the third config ID assignment signal and assign a third config ID to the third neural core 100_3. Further, the third neural core 100_3 may change the third config ID assigned to the third neural core 100_3 to a locked state by using the third config lock signal. In some embodiments, the ID config manager 500 may provide a fourth config ID assignment signal and a fourth config lock signal to the fourth neural core 100_4 by way of the first neural core 100_1, the second neural core 100_2, and the third neural core 100_3. The fourth neural core 100_4 may activate the ID configuration of the fourth neural core 100_4 by using the fourth config ID assignment signal, and assign a fourth config ID to the fourth neural core 100_4. Further, the fourth neural core 100_4 may change the fourth config ID assigned to the fourth neural core 100_4 to a locked state by using the fourth config lock signal.

When the config IDs for each of the first neural core 100_1 through the fourth neural core 100_4 are assigned, a fourth data path may be configured according to the config IDs assigned to the first neural core 100_1 through the fourth neural core 100_4 and the controllable port Ctrlb_port.

Referring to FIG. 11, for neural cores 101_1 and 100_2, the forward direction data use indicator indicates that data from the previous unit in the forward direction is used in the current unit, the forward direction data pass indicator indicates that data from the previous unit in the forward direction is not passed to the next unit in the forward direction, the forward direction data transfer indicator indicates that data from the current unit is transferred to the next unit in the forward direction, the backward direction data use indicator indicates that data from the previous unit in the backward direction is used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. For neural core 101_3, the forward direction data use indicator indicates that data from the previous unit in the forward direction is used in the current unit, the forward direction data pass indicator indicates that data from the previous unit in the forward direction is not passed to the next unit in the forward direction, the forward direction data transfer indicator indicates that data from the current unit is not transferred to the next unit in the forward direction, the backward direction data use indicator indicates that data from the previous unit in the backward direction is not used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. For neural core 101_4, the forward direction data use indicator indicates that data from the previous unit in the forward direction is not used in the current unit, the forward direction data pass indicator indicates that data from the previous unit in the forward direction is not passed to the next unit in the forward direction, the forward direction data transfer indicator indicates that data from the current unit is transferred to the next unit in the forward direction, the backward direction data use indicator indicates that data from the previous unit in the backward direction is used in the current unit, the backward direction data pass indicator indicates that data from the previous unit in the backward direction is not passed to the next unit in the backward direction, and the backward direction data transfer indicator indicates that data from the current unit is not transferred to the next unit in the backward direction. The fourth data path may be a data path for a first computation group CoG_1. Therefore, for the fourth data path, a data movement path may be configured in the forward direction in which data is provided from the first memory 400_1 to the first L0 memory 120_1, from the first L0 memory 120_1 to the second L0 memory 120_2, and from the second L0 memory 120_2 to the third L0 memory 120_3, and a data movement path may be configured in the backward direction in which data is provided from the third L0 memory 120_3 to the second L0 memory 120_2, from the second L0 memory 120_2 to the first L0 memory 120_1, and from the first L0 memory 120_1 to the first memory 400_1.

In some embodiments, the task manager 300 may determine the start neural core 100 and the end neural core 100 of the data movement path by using the config IDs assigned to the first neural core 100_1 through the fourth neural core 100_4. In some embodiments, the task manager 300 may configure the fourth data path by controlling the controllable port Ctrlb_port, so that data is computed by way of the first neural core 100_1 through the third neural core 100_3, and the data computed at the third neural core 100_3 is computed again by way of the second neural core 100_2 and the first neural core 100_1 and is stored in the first memory 400_1. For example, it is assumed that the data provided to each L0 memory 120 is computed by a processing unit included in each neural core 100.

Described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may control to provide the third data to the third L0 memory 120_3. The third neural core 100_3 may generate fourth data by computing the third data. The task manager 300 may control to provide the fourth data to the second L0 memory 120_2. The second neural core 100_2 may generate fifth data by computing the fourth data. The task manager 300 may control to provide the fifth data to the first L0 memory 120_1. The first neural core 100_1 may generate sixth data by computing the fifth data. The task manager 300 may control to store the sixth data in the first memory 400_1.

In some embodiments, the task manager 300 may configure a fifth data path by controlling the controllable port Ctrlb_port. The fifth data path may be a data path for a second computation group CoG_2. The task manager 300 may configure the fifth data path by configuring a data movement path in the second direction in which data is provided from the second memory 400_2 to the fourth L0 memory 120_4, and a data movement path in the first direction in which data is provided from the fourth L0 memory 120_4 back to the second memory 400_2.

In some embodiments, the task manager 300 may configure the fifth data path by controlling the controllable port Ctrlb_port, so that the data provided from the second memory 400_2 is computed at the fourth neural core 100_4 and is stored again in the second memory 400_2. For example, it is assumed that the data provided to each L0 memory 120 is computed by a processing unit included in each neural core 100.

Described in terms of data computation, the task manager 300 may control to provide seventh data outputted from the second memory 400_2 to the fourth L0 memory 120_4. The fourth neural core 100_4 may generate eighth data by computing the seventh data. The task manager 300 may control to store the eighth data in the second memory 400_2.

In summary, the first computation group CoG_1 and the second computation group CoG_2 included in the core array CoA may have different data paths. In some embodiments, the task manager 300 may configure the fourth data path of the first computation group CoG_1 and the fifth data path of the second computation group CoG_2 by controlling the controllable port Ctrlb_port included in the core array CoA. The fourth data path may include a path through which data moves in the first direction from the first memory 400_1 to the first L0 memory 120_1, the second L0 memory 120_2, and the third L0 memory 120_3, and a path through which data moves in the second direction from the third L0 memory 120_3 to the second L0 memory 120_2, the first L0 memory 120_1, and the first memory 400_1. Further, the fifth data path may include a path through which data moves in the second direction from the second memory 400_2 to the fourth L0 memory 120_4, and a path through which data moves in the first direction from the fourth L0 memory 120_4 to the second memory 400_2.

Figure 12:
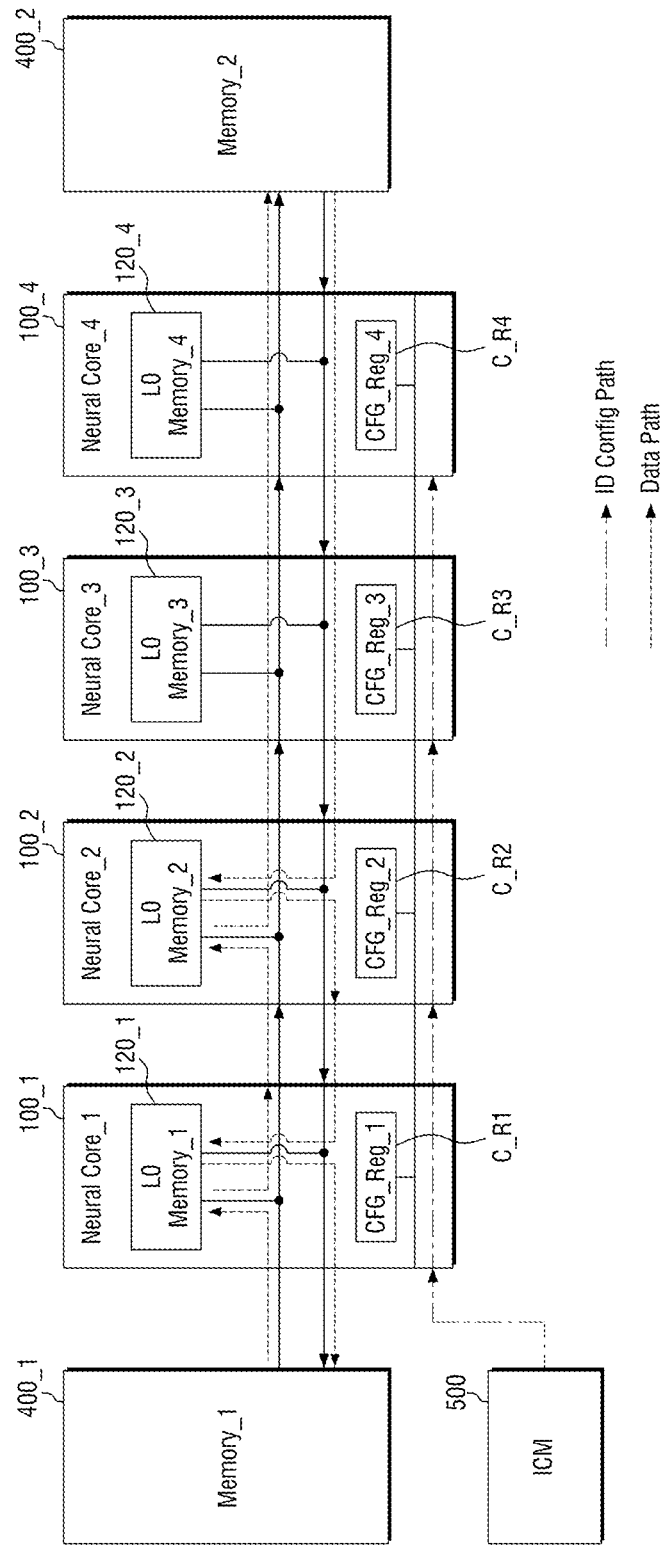
FIG. 12 is a diagram showing a sequence of assigning config IDs and the configuration of a sixth data path and a seventh data path in accordance with some embodiments.

FIG. 12 is a diagram showing a sequence of assigning config IDs and the configuration of a sixth data path and a seventh data path in accordance with some embodiments.

Referring to FIGS. 6, 7, and 12, the first neural core 100_1 may include a first L0 memory 120_1 and a first config register C_R1. The second neural core 100_2 may include a second L0 memory 120_2 and a second config register C_R2. The third neural core 100_3 may include a third L0 memory 120_3 and a third config register C_R3. The fourth neural core 100_4 may include a fourth L0 memory 120_4 and a fourth config register C_R4.

According to some embodiments, the ID config manager 500 may provide a first config ID assignment signal and a first config lock signal to the first neural core 100_1. The first neural core 100_1 may activate the ID configuration of the first neural core 100_1 by using the first config ID assignment signal, and assign a first config ID to the first neural core 100_1. The first neural core 100_1 may change the first config ID assigned to the first neural core 100_1 to a locked state by using the first config lock signal. In some embodiments, the ID config manager 500 may provide a second config ID assignment signal and a second config lock signal to the second neural core 100_2 by way of the first neural core 100_1. The second neural core 100_2 may activate the ID configuration of the second neural core 100_2 by using the second config ID assignment signal and assign a second config ID to the second neural core 100_2. Further, the second neural core 100_2 may change the second config ID assigned to the second neural core 100_2 to a locked state by using the second config lock signal. In some embodiments, the ID config manager 500 may provide a third config ID assignment signal and a third config lock signal to the third neural core 100_3 by way of the first neural core 100_1 and the second neural core 100_2. The third neural core 100_3 may activate the ID configuration of the third neural core 100_3 by using the third config ID assignment signal and assign a third config ID to the third neural core 100_3. Further, the third neural core 100_3 may change the third config ID assigned to the third neural core 100_3 to a locked state by using the third config lock signal. In some embodiments, the ID config manager 500 may provide a fourth config ID assignment signal and a fourth config lock signal to the fourth neural core 100_4 by way of the first neural core 100_1, the second neural core 100_2, and the third neural core 100_3. The fourth neural core 100_4 may activate the ID configuration of the fourth neural core 100_4 by using the fourth config ID assignment signal, and assign a fourth config ID to the fourth neural core 100_4. Further, the fourth neural core 100_4 may change the fourth config ID assigned to the fourth neural core 100_4 to a locked state by using the fourth config lock signal.

Once the config IDs for each of the first neural core 100_1 through the fourth neural core 100_4 are assigned, a sixth data path may be configured in the forward direction according to the config IDs assigned to the first neural core 100_1 through the fourth neural core 100_4 and the controllable port Ctrlb_port. Referring to FIG. 12, for neural cores 101_1 and 100_2, the forward direction data use indicator indicates that data from the previous unit in the forward direction is used in the current unit, the forward direction data pass indicator indicates that data from the previous unit in the forward direction is not passed to the next unit in the forward direction, and the forward direction data transfer indicator indicates that data from the current unit is transferred to the next unit in the forward direction. For neural cores 101_3 and 101_4, the forward direction data use indicator indicates that data from the previous unit in the forward direction is not used in the current unit, the forward direction data pass indicator indicates that data from the previous unit in the forward direction is passed to the next unit in the forward direction, and the forward direction data transfer indicator indicates that data from the current unit is not transferred to the next unit in the forward direction. Therefore, data may be provided from the first memory 400_1 to the first L0 memory 120_1, from the first L0 memory 120_1 to the second L0 memory 120_2, and from the second L0 memory 120_2 to the second memory 400_2.

In some embodiments, the task manager 300 may control that data is provided in the first direction from the first memory 400_1 toward the second memory 400_2 but the data is computed only in the first neural core 100_1 and the second neural core 100_2, by controlling the controllable port Ctrlb_port. For example, it is assumed that the data provided to each L0 memory 120 is computed by a processing unit included in each neural core 100.

Described in terms of data computation, the task manager 300 may control to provide first data outputted from the first memory 400_1 to the first L0 memory 120_1. The first neural core 100_1 may generate second data by computing the first data. The task manager 300 may control to provide the second data to the second L0 memory 120_2. The second neural core 100_2 may generate third data by computing the second data. The task manager 300 may provide the third data to the second memory 400_2 and control the second memory 400_2 to store the third data.

According to some embodiments, a first data line D_L1 passing through the first neural core 100_1 and the second neural core 100_2 may be used as a data computation path that allows the computation of data to be performed in the first neural core 100_1 and the second neural core 100_2, and the first data line D_L1 passing through the third neural core 100_3 and the fourth neural core 100_4 may be used as a data bus through which the data passes from the second L0 memory 120_2 to the second memory 400_2. In some embodiments, the task manager 300 configures the sixth data path and may use a part of the first data line D_L1 as the data computation path and the other part of the first data line D_L1 as the data bus. In some embodiments, the task manager 300 may also minimize the power consumption of the neural processor 1000 by adjusting the power so that the third neural core 100_3 and the fourth neural core 100_4, in which computation is not performed, are not driven.

In some embodiments, the task manager 300 may configure the seventh data path in the second direction by controlling the controllable port Ctrlb_port. Referring to FIG. 12, for neural cores 101_1 and 100_2, the backward direction data use indicator indicates that data from the previous unit in the backward direction is used in the current unit, the backward direction data pass indicator indicates that data from the previous unit in the backward direction is not passed to the next unit in the backward direction, and the backward direction data transfer indicator indicates that data from the current unit is transferred to the next unit in the backward direction. For neural cores 101_3 and 101_4, the backward direction data use indicator indicates that data from the previous unit in the backward direction is not used in the current unit, the backward direction data pass indicator indicates that data from the previous unit in the backward direction is passed to the next unit in the backward direction, and the backward direction data transfer indicator indicates that data from the current unit is not transferred to the next unit in the backward direction. Therefore, data may be provided from the second memory 400_2 to the second L0 memory 120_2, from the second L0 memory 120_2 to the first L0 memory 120_1, and from the first L0 memory 120_1 to the first memory 400_1.

In some embodiments, the task manager 300 may control that data is provided in the second direction from the second memory 400_2 toward the first memory 400_1 but the data is computed only in the second neural core 100_2 and the first neural core 100_1, by controlling the controllable port Ctrlb_port. For example, it is assumed that the data provided to each L0 memory 120 is computed by a processing unit included in each neural core 100.

Described in terms of data computation, the task manager 300 may control to provide fourth data outputted from the second memory 400_2 to the second L0 memory 120_2. The second neural core 100_2 may generate fifth data by computing the fourth data. The task manager 300 may control to provide the fifth data to the first L0 memory 120_1. The first neural core 100_1 may generate sixth data by computing the fifth data. The task manager 300 may provide the sixth data to the first memory 400_1 and control the first memory 400_1 to store the sixth data.

According to some embodiments, a second data line D_L2 passing through the fourth neural core 100_4 and the third neural core 100_3 may be used as a data bus through which data passes from the second memory 400_2 to the second L0 memory 120_2, and the second data line D_L2 passing through the second neural core 100_2 and the first neural core 100_1 may be used as a data computation path that allows the computation of data to be performed in the second neural core 100_2 and the first neural core 100_1. In some embodiments, the task manager 300 configures the seventh data path, and may use a part of the second data line D_L2 as the data computation path and the other part of the second data line D_L2 as the data bus. In some embodiments, the task manager 300 may also minimize the power consumption of the neural processor 1000 by adjusting the power so that the third neural core 100_3 and the fourth neural core 100_4, in which computation is not performed, are not driven.

According to some embodiments, the task manager 300 can enhance the security of the neural processor 1000 by using only part of the first data line D_L1 and the second data line D_L2 as the data computation path. Sensitive information such as personal information should be computed and handled only in particular neural cores 100. In some embodiments, the task manager 300 may control that data performs computation only in particular neural cores 100 included in the core array CoA, and that the rest of the neural cores 100 cannot check or access the corresponding data, by controlling the controllable port Ctrlb_port. For example, if particular data needs to be handled only by the first neural core 100_1 and the second neural core 100_2, the task manager 300 may control that the data is provided only to the first L0 memory 120_1 and the second L0 memory 120_2, and the third L0 memory 120_3 and the fourth L0 memory 120_4 cannot check the corresponding data, by controlling the controllable port Ctrlb_port.

In summary, the task manager 300 may configure the sixth data path and the seventh data path by controlling the controllable port Ctrlb_port included in the core array CoA. The sixth data path may refer to a path through which data moves in the first direction from the first memory 400_1 to the first L0 memory 120_1, the second L0 memory 120_2, and the second memory 400_2. Further, the seventh data path may refer to a path through which data moves in the second direction from the second memory 400_2 to the second L0 memory 120_2, the first L0 memory 120_1, and the first memory 400_1.

According to some embodiments, the neural cores 100 included in the core array CoA are connected in series by the first data line D_L1, the second data line D_L2, and the config line CFG_L. If it is necessary to add the number of neural cores 100 to the core array CoA, simple expansion is possible without the need for separate design changes or addition of lines because all of the neural cores 100 included in the core array CoA are connected in series. For example, since new neural cores 100 can be added to the core array CoA without separate design changes if the neural cores 100 to be newly added only need to be connected with the existing neural cores 100 in series via the first data line D_L1, the second data line D_L2, and the config line CFG_L, there is an advantage of being highly scalable.

Figure 13:
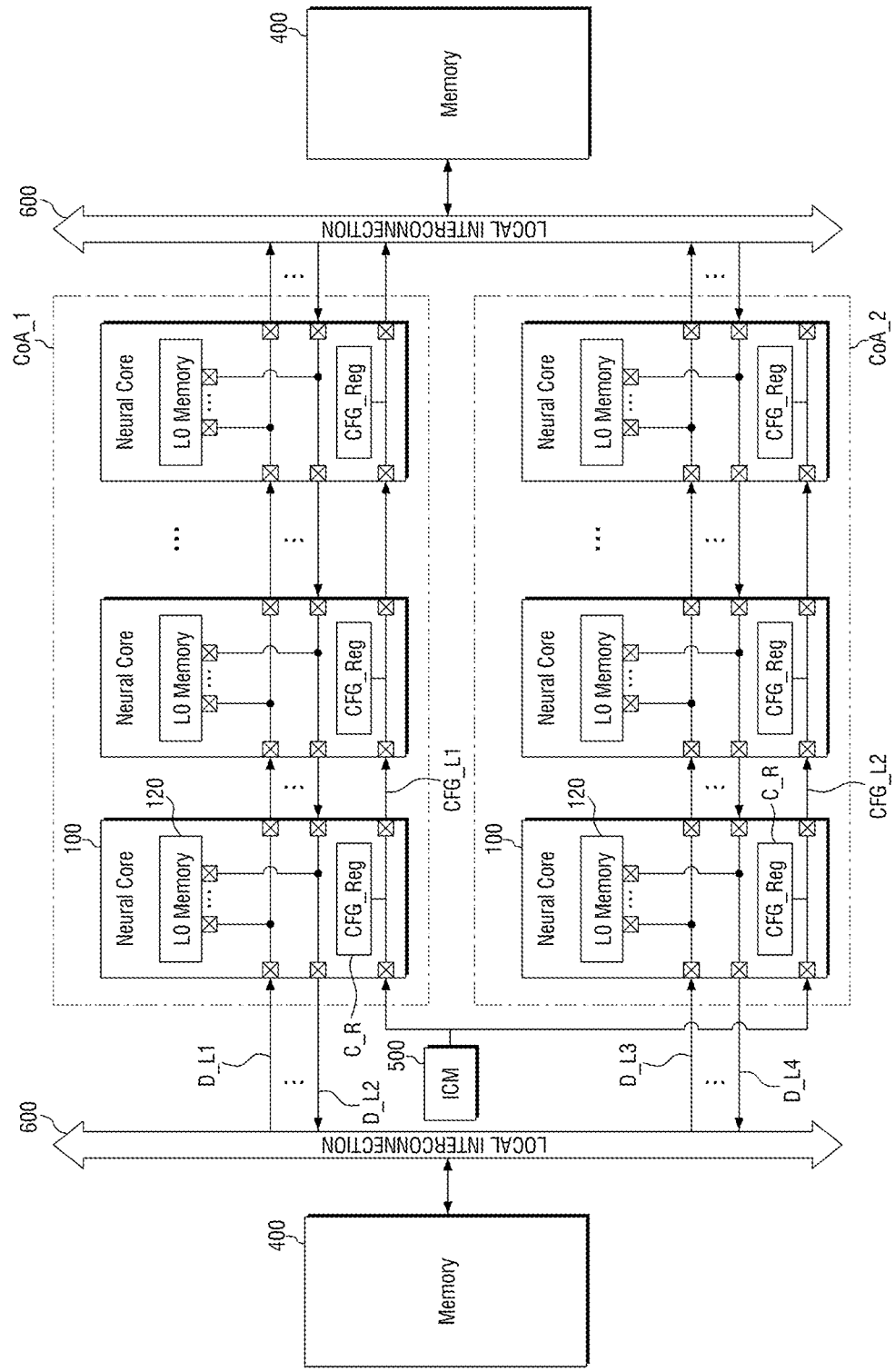
FIG. 13 is a diagram showing another configuration of a neural processor in accordance with some embodiments.

FIG. 13 is a diagram showing another configuration of a neural processor in accordance with some embodiments. For the convenience of description, descriptions that are identical to or similar to those described above will be omitted or described briefly.

Referring to FIGS. 6 and 13, the core array CoA may include a first core array CoA_1 and a second core array CoA_2. The first core array CoA_1 may include a first data line through which data is transmitted in a first direction and a second data line through which data is transmitted in a second direction. Further, the first core array CoA_1 may include a first config line CFG_L1 for assigning config IDs to the plurality of neural cores 100 included in the first core array CoA_1.

In some embodiments, the second core array CoA_2 may include a third data line through which data is transmitted in the first direction and a fourth data line through which data is transmitted in the second direction. Further, the second core array CoA_2 may include a second config line CFG_L2 for assigning config IDs to the plurality of neural cores 100 included in the second core array CoA_2.

According to some embodiments, the ID config manager 500 may perform ID configuration for the plurality of neural cores 100 included in the first core array CoA_1 via the first config line CFG_L1. Further, the ID config manager 500 may perform ID configuration for the plurality of neural cores 100 included in the second core array CoA_2 via the second config line CFG_L2.

The memory 400 may be connected to a local interconnection 600. In some embodiments, the first core array CoA_1 may be connected to the local interconnection 600. Moreover, the second core array CoA_2 may be connected to the local interconnection 600. In some embodiments, data outputted from the memory 400 may be provided to the first core array CoA_1 and/or the second core array CoA_2 via the local interconnection 600. Further, data outputted from the first core array CoA_1 may be provided to the memory 400 and/or the second core array CoA_2 via the local interconnection 600. Moreover, data outputted from the second core array CoA_2 may be provided to the memory 400 and/or the first core array CoA_1 via the local interconnection 600.

The local interconnection 600 may connect at least one core array CoA, the core global 200, and the task manager 300 to each other. The local interconnection 600 may be a path through which data moves between at least one core array CoA, the memory 400, the core global 200, and the task manager 300. The local interconnection 600 may be connected and transmit data to the global interconnection 6000 of FIG. 3.

In some embodiments, the neural processor 1000 may include the memory 400 and the plurality of core arrays CoA, and data movement may occur between the memory 400 and the core arrays CoA via the local interconnection 600. In some embodiments, data movement between the plurality of core arrays CoA may also be performed via the local interconnection 600.

According to some embodiments, each of the first data line D_L1 through the fourth data line D_L4 may include a plurality of data lines. For example, a description will be provided assuming a case in which the first data line D_L1 includes a first sub-line and a second sub-data line. According to some embodiments, the task manager 300 may control on/off of the first sub-line and the second sub-line according to bandwidths for transmitting data. If the bandwidth of the local interconnection 600 is greater than the bandwidth of the first sub-line, a latency may increase due to a bottleneck if data is provided from the local interconnection 600 to the first sub-line. In some embodiments, the task manager 300 may turn on both the first sub-line and the second sub-line by controlling the controllable port Ctrlb_port. If both the first sub-line and the second sub-line are turned on, the bottleneck occurring in the local interconnection 600 can be minimized, and latency can be reduced accordingly.

On the other hand, if the bandwidth of the local interconnection 600 is smaller than the bandwidth of the first sub-line, no bottleneck may occur even if data is provided from the local interconnection 600 to the first sub-line. In some embodiments, the task manager 300 may turn on the first sub-line and turn off the second sub-line by controlling the controllable port Ctrlb_port. Through this, power consumption by the neural processor 1000 can be minimized without affecting latency, and efficiency can thus be maximized.

In some embodiments, the task manager 300 may control at least some of the plurality of data lines included in the first data line D_L1 and the second data line D_L2 according to the bandwidth of the local interconnection 600. Through this, the efficiency of the neural processor 1000 in terms of power and latency can be maximized.

Figure 14:
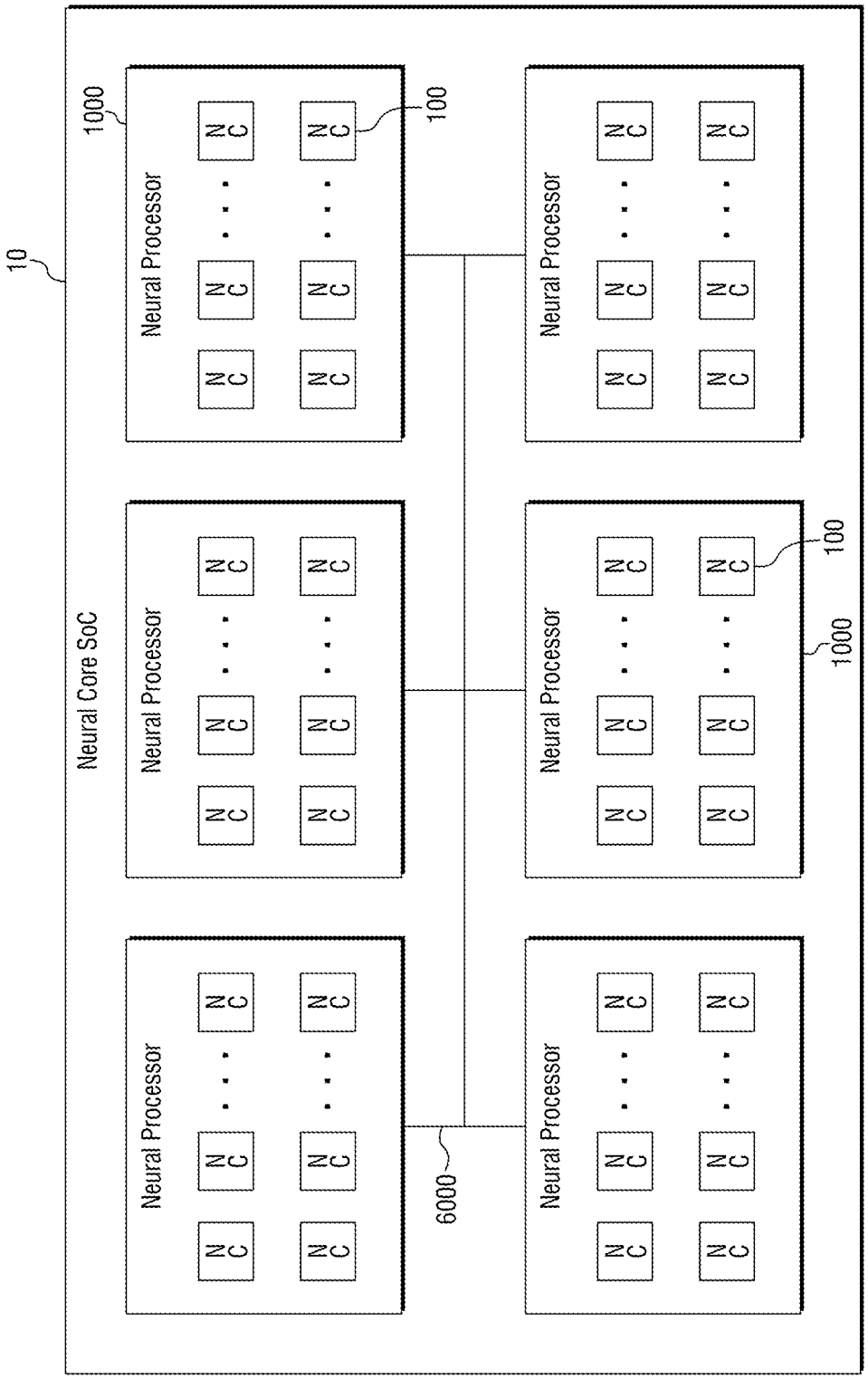
FIG. 14 is a diagram showing a hierarchical structure of a neural processing device in accordance with some embodiments.

FIG. 14 is a diagram showing a hierarchical structure of a neural processing device in accordance with some embodiments.

Referring to FIG. 14, the neural core SoC 10 may include at least one neural processor 1000. Each neural processor 1000 may transmit data to each other via the global interconnection 6000.

The neural processors 1000 may each include at least one neural core 100. The neural core 100 may be a processing unit optimized for deep learning calculation tasks. The neural core 100 may be a processing unit corresponding to one operation of a deep learning calculation task. In some embodiments, a deep learning calculation task can be represented by a sequential or parallel combination of multiple operations. The neural cores 100 may each be a processing unit capable of processing one operation, and may be a minimum calculation unit that can be considered for scheduling from the viewpoint of a compiler.

The neural processing device in accordance with the embodiment may configure the scales of the minimum calculation unit, considered from the viewpoint of compiler scheduling and the hardware processing unit to be the same, so that fast and efficient scheduling and calculation tasks can be performed.

In some embodiments, if the processing units into which hardware can be divided are too large compared to calculation tasks, inefficiency of the calculation tasks may occur in driving the processing units. Conversely, it is not appropriate to schedule a processing unit that is a unit smaller than an operation, which is the minimum scheduling unit of the compiler, every time since a scheduling inefficiency may occur and hardware design costs may increase.

Therefore, by adjusting the scales of the scheduling unit of the compiler and the hardware processing unit to be similar in the embodiment, it is possible to simultaneously satisfy the rapid scheduling and efficient execution of calculation tasks without wasting hardware resources.

Figure 15:
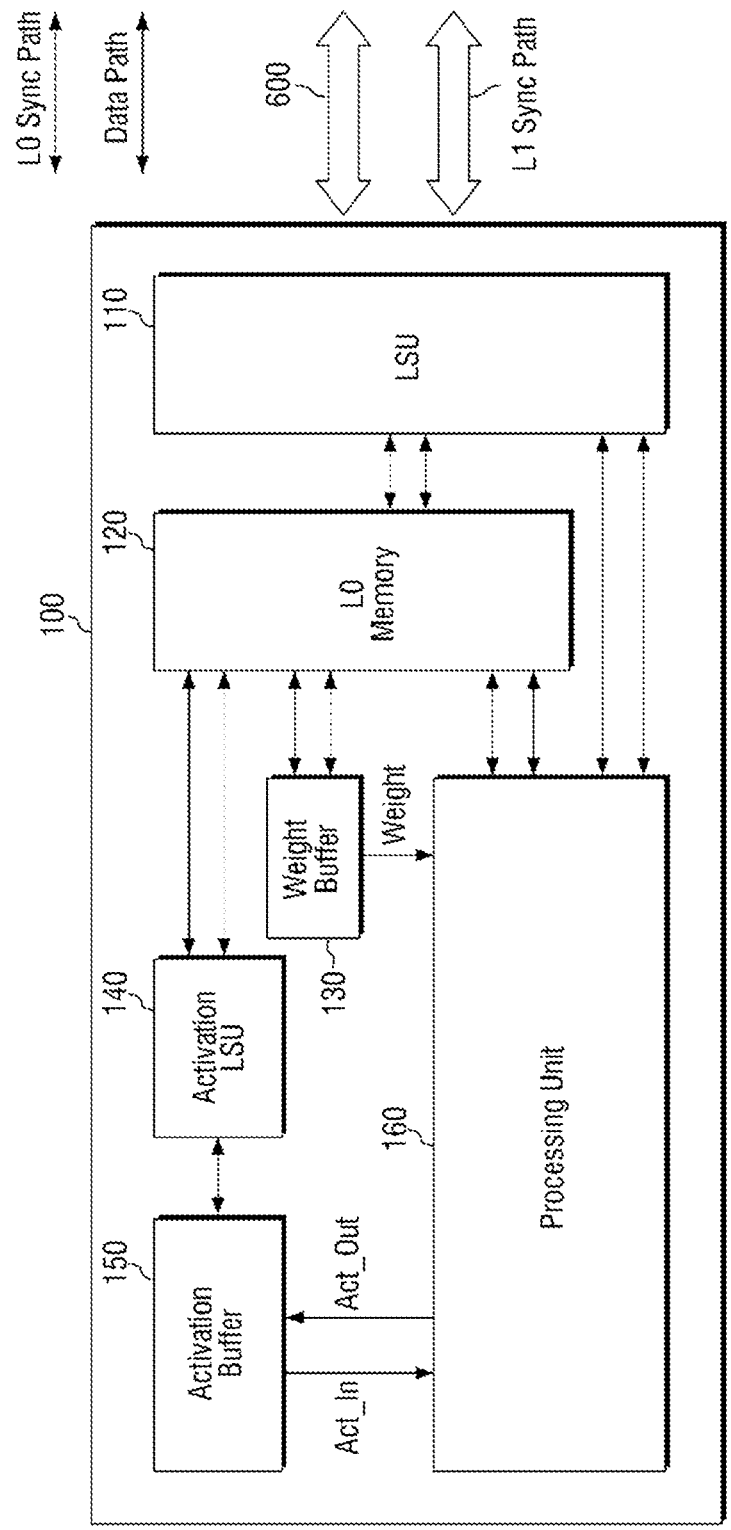
FIG. 15 is a block diagram showing the neural core of FIG. 6 in detail.

FIG. 15 is a block diagram showing a neural core in accordance with FIG. 6 in further detail.

Referring to FIG. 15, the neural core 100 may include a load/store unit (LSU) 110, an L0 memory 120, a weight buffer 130, an activation LSU 140, an activation buffer 150, and a processing unit 160.

The LSU 110 may receive at least one of data, a control signal, or a synchronization signal from the outside via the local interconnection 600 and the L1 sync path. The LSU 110 may transmit at least one of the data, the control signal, or the synchronization signal received to the L0 memory 120. Similarly, the LSU 110 may transfer at least one of the data, the control signal, or the synchronization signal to the outside via the local interconnection 600 and the L1 sync path. In some embodiments, the LSU 110 may be named a LSU 110 circuit, but for the sake of convenience, the terms are unified a LSU 110. In some embodiments, the LSU 110 may be implemented as a circuit or circuitry.

Specifically, the micro-DMA job may be a job in which the neural core 100 loads a program or data from the shared memory 2000 or the off-chip memory 30 to the L0 memory 120. The LP micro-DMA job may be a load job for a program or data to be used later rather than a current program or data, unlike a general micro-DMA job. As such a job has a low priority, it can be identified differently from the micro-DMA job. The ST micro-DMA job may be a store job that stores data from the L0 memory 120 of the neural core 100 to the shared memory 2000 or the off-chip memory 30. The pre-processing job may include a job that pre-loads data such as a large number of lookup tables in the CPU 20.

Figure 16:
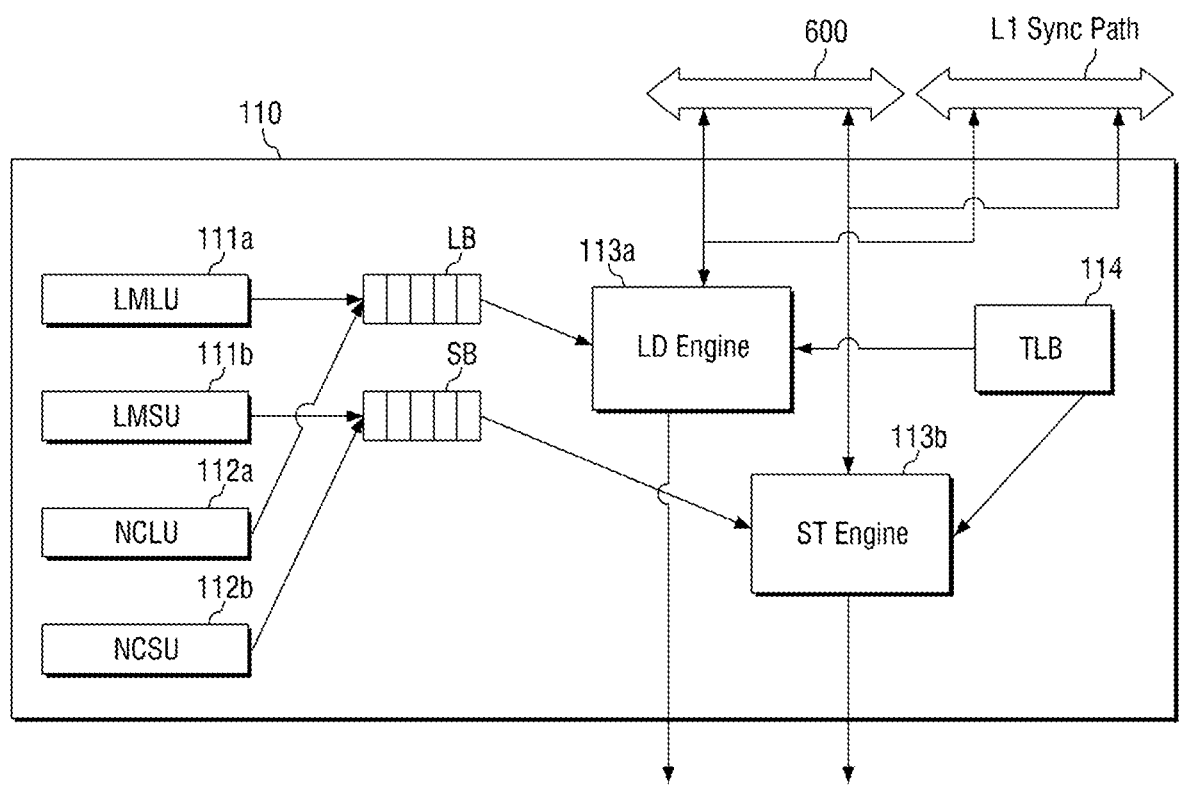
FIG. 16 is a block diagram showing the LSU of FIG. 15 in detail.

FIG. 16 is a block diagram showing the LSU of FIG. 15.

Referring to FIG. 16, the LSU 110 may include a local memory load unit (LMLU) 111a, a local memory store unit (LMSU) 111b, a neural core load unit (NCLU) 112a, a neural core store unit (NCSU) 112b, a load buffer LB, a store buffer SB, a load (LD) engine 113a, a store (ST) engine 113b, and a translation lookaside buffer (TLB) 114.

In some embodiments, the local memory load unit (LMLU) 111a, the local memory store unit (LMSU) 111b, the neural core load unit (NCLU) 112a, the neural core store unit (NCSU) 112b, the load (LD) engine 113a, and the store (ST) engine 113b may be named a local memory load unit (LMLU) 111a circuit, a local memory store unit (LMSU) 111b circuit, a neural core load unit (NCLU) 112a circuit, a neural core store unit (NCSU) 112b circuit, a load (LD) engine 113a circuit, a store (ST) engine 113b circuit, but for the sake of convenience, the terms are unified as a local memory load unit (LMLU) 111a, a local memory store unit (LMSU) 111b, a neural core load unit (NCLU) 112a, a neural core store unit (NCSU) 112b, a load (LD) engine 113a, a store (ST) engine 113b. In some embodiments, the local memory load unit (LMLU) 111a, the local memory store unit (LMSU) 111b, the neural core load unit (NCLU) 112a, the neural core store unit (NCSU) 112b, the load (LD) engine 113a, the store (ST) engine 113b may be implemented as a circuit or circuitry.

The local memory load unit 111a may fetch a load instruction for the L0 memory 120 and issue the load instruction. When the local memory load unit 111a provides the issued load instruction to the load buffer LB, the load buffer LB may sequentially transmit memory access requests to the load engine 113a according to the inputted order.

Further, the local memory store unit 111b may fetch a store instruction for the L0 memory 120 and issue the store instruction. When the local memory store unit 111b provides the issued store instruction to the store buffer SB, the store buffer SB may sequentially transmit memory access requests to the store engine 113b according to the inputted order.

The neural core load unit 112a may fetch a load instruction for the neural core 100 and issue the load instruction. When the neural core load unit 112a provides the issued load instruction to the load buffer LB, the load buffer LB may sequentially transmit memory access requests to the load engine 113a according to the inputted order.

In some embodiments, the neural core store unit 112b may fetch a store instruction for the neural core 100 and issue the store instruction. When the neural core store unit 112b provides the issued store instruction to the store buffer SB, the store buffer SB may sequentially transmit memory access requests to the store engine 113b according to the inputted order.

The load engine 113a may receive the memory access request and retrieve data via the local interconnection 200. In some embodiments, the load engine 113a may quickly find the data by using a translation table of a physical address and a virtual address that has been used recently in the translation lookaside buffer 114. If the virtual address of the load engine 113a is not in the translation lookaside buffer 114, the address translation information may be found in another memory.

The store engine 113b may receive the memory access request and retrieve data via the local interconnection 200. In some embodiments, the store engine 113b may quickly find the data by using a translation table of a physical address and a virtual address that has been used recently in the translation lookaside buffer 114. If the virtual address of the store engine 113b is not in the translation lookaside buffer 114, the address translation information may be found in another memory.

The load engine 113a and the store engine 113b may send synchronization signals to the L1 sync path. In some embodiments, the synchronization signal may indicate that the task has been completed.

Referring to FIG. 15 again, the L0 memory 120 is a memory located inside the neural core 100, and may receive all input data required for the tasks by the neural core 100 from the outside and store them temporarily. In some embodiments, the L0 memory 120 may temporarily store the output data calculated by the neural core 100 for transmission to the outside. The L0 memory 120 may serve as a cache memory of the neural core 100.

The L0 memory 120 may transmit an input activation Act_In to the activation buffer 150 and receive an output activation Act_Out via the activation LSU 140. The L0 memory 120 may directly transmit and receive data to and from the processing unit 160, in addition to the activation LSU 140. In some embodiments, the L0 memory 120 may exchange data with each of a PE array 163 and a vector unit 164. The L0 memory 120 may be a memory corresponding to the level of the neural core. In some embodiments, the L0 memory 120 may be a private memory of the neural core.

The L0 memory 120 may transmit data such as activations or weights via a data path. The L0 memory 120 may exchange synchronization signals via an L0 sync path, which is a separate dedicated path. The L0 memory 120 may exchange synchronization signals with, for example, the LSU 110, the weight buffer 130, the activation LSU 140, and the processing unit 160 via the L0 sync path.

The weight buffer 130 may receive a weight from the L0 memory 120. The weight buffer 130 may transfer the weight to the processing unit 160. The weight buffer 130 may temporarily store the weight before transferring it.

The input activation Act_In and the output activation Act_Out may refer to input values and output values of the layers of a neural network. In some embodiments, if there are a plurality of layers in the neural network, the output value of the previous layer becomes the input value of the next layer, and thus, the output activation Act_Out of the previous layer may be utilized as the input activation Act_In of the next layer.

The weight may refer to a parameter that is multiplied by the input activation Act_In inputted in each layer. The weight is adjusted and confirmed in the deep learning training phase, and may be used to derive the output activation Act_Out via a fixed value in the inference phase.

The activation LSU 140 may transfer the input activation Act_In from the L0 memory 120 to the activation buffer 150, and the output activation Act_Out from the activation buffer 150 to the on-chip buffer. In some embodiments, the activation LSU 140 may perform both a load task and a store task of the activation.

The activation buffer 150 may provide the input activation Act_In to the processing unit 160 and receive the output activation Act_Out from the processing unit 160. The activation buffer 150 may temporarily store the input activation Act_In and the output activation Act_Out.

The activation buffer 150 may quickly provide the activation to the processing unit 160, which has a large quantity of calculations, and may quickly receive the activation, thereby increasing the calculation speed of the neural core 100.

The processing unit 160 may be a module that performs calculations. The processing unit 160 may perform not only one-dimensional calculations but also two-dimensional matrix calculations, i.e., convolution operations. The processing unit 160 may receive an input activation Act_In, multiply it by a weight, and then add it to generate an output activation Act_Out.

Figure 17:
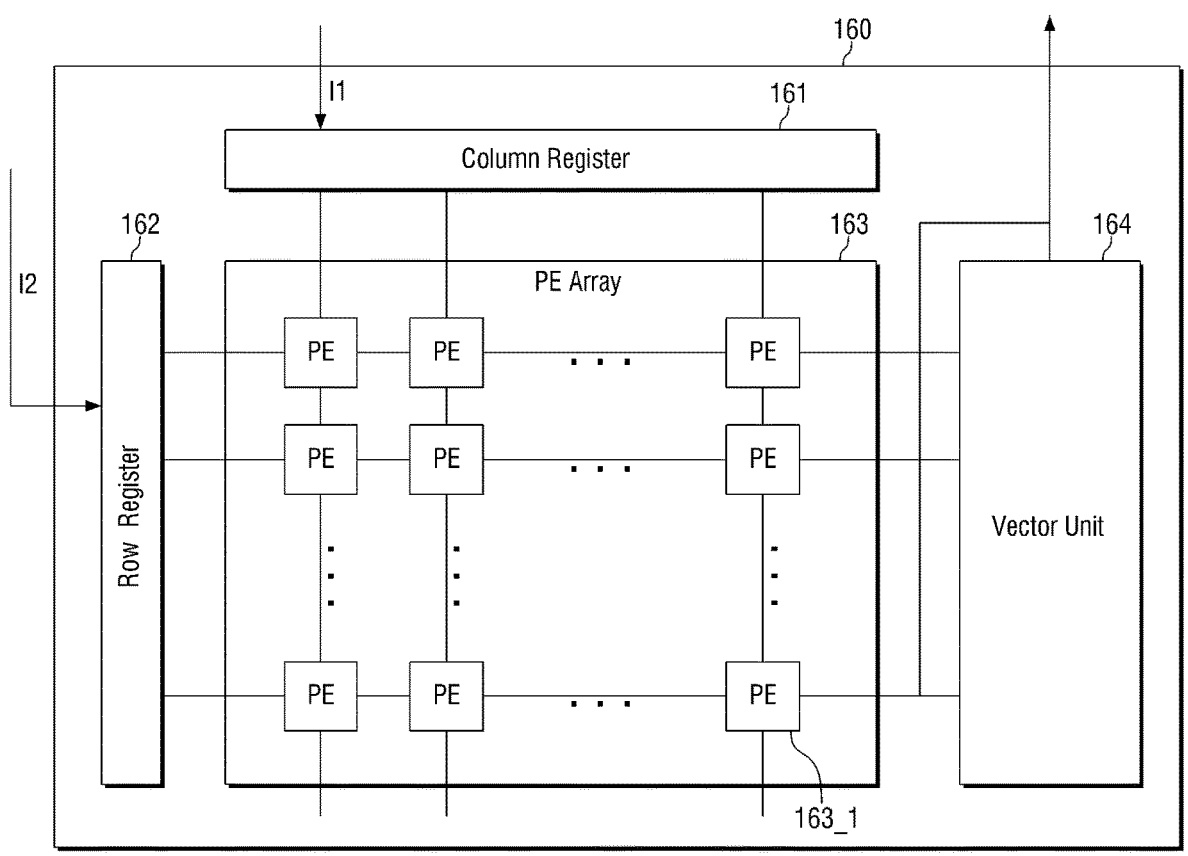
FIG. 17 is a block diagram showing the processing unit of FIG. 15.

FIG. 17 is a block diagram showing the processing unit of FIG. 15 in detail.

Referring to FIG. 15 and FIG. 17, the processing unit 160 may include a PE array 163, a vector unit 164, a column register 161, and a row register 162.

The PE array 163 may receive the input activation Act_In and the weight and perform multiplication on them. In some embodiments, each of the input activation Act_In and the weight may be in the form of matrices and calculated via convolution. Through this, the PE array 163 may generate an output activation Act_Out. However, the embodiment is not limited thereto. The PE array 163 may generate any types of outputs other than the output activation Act_Out as well.

The PE array 163 may include at least one processing element PE. The processing elements PE may be aligned with each other so that each of the processing elements PE may perform multiplication on one input activation Act_In and one weight.

The PE array 163 may sum values for each multiplication to generate a subtotal. This subtotal may be utilized as an output activation Act_Out. The PE array 163 performs two-dimensional matrix multiplication, and thus, may be referred to as a 2D matrix compute unit.

The vector unit 164 may mainly perform one-dimensional calculations. The vector unit 164, together with the PE array 163, may perform deep learning calculations. Through this, the processing unit 160 may be specialized for necessary calculations. In some embodiments, each of the at least one neural core 100 has calculation modules that perform a large amount of two-dimensional matrix multiplications and one-dimensional calculations, and thus, can efficiently perform deep learning tasks.

The column register 161 may receive a first input I1. The column register 161 may receive the first input I1, and distribute them to each column of the processing elements PE.

The row register 162 may receive a second input I2. The row register 162 may receive the second input I2, and distribute them to each row of the processing elements PE.

The first input I1 may be an input activation Act_In or a weight. The second input I2 may be a value other than the first input I1 between the input activation Act_In or the weight. Alternatively, the first input I1 and the second input I2 may be values other than the input activation Act_In and the weight.

Figure 18:
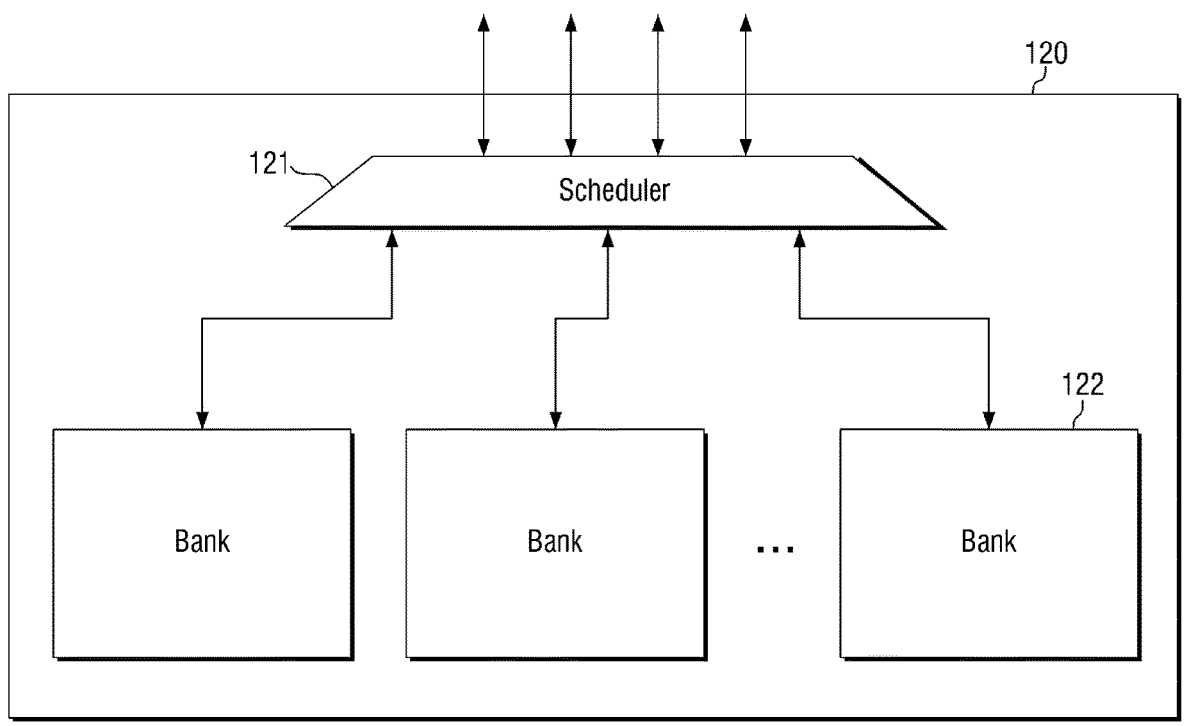
FIG. 18 is a block diagram showing the L0 memory of FIG. 15 in detail.

FIG. 18 is a block diagram showing a L0 memory in accordance with FIG. 15 in further detail.

Referring to FIG. 18, the L0 memory 120 may include a scheduler 121 and one or more local memory banks 122.

When data is stored in the L0 memory 120, the scheduler 121 may receive data from the load engine 113a. In some embodiments, the local memory bank 122 may be allocated for the data in a round-robin manner. Accordingly, data may be stored in any one of the local memory banks 122.

In contrast to this, when data is loaded from the L0 memory 120, the scheduler 121 may receive the data from the local memory bank 122 and transmit the data to the store engine 113b. The store engine 113b may store the data in the outside through the local interconnection 600. In some embodiments, the scheduler 121 may be named a scheduler 121 circuit, but for the sake of convenience, the terms are unified as a scheduler 121. In some embodiments, the scheduler 121 may be implemented as a circuit or circuitry.

Figure 19:
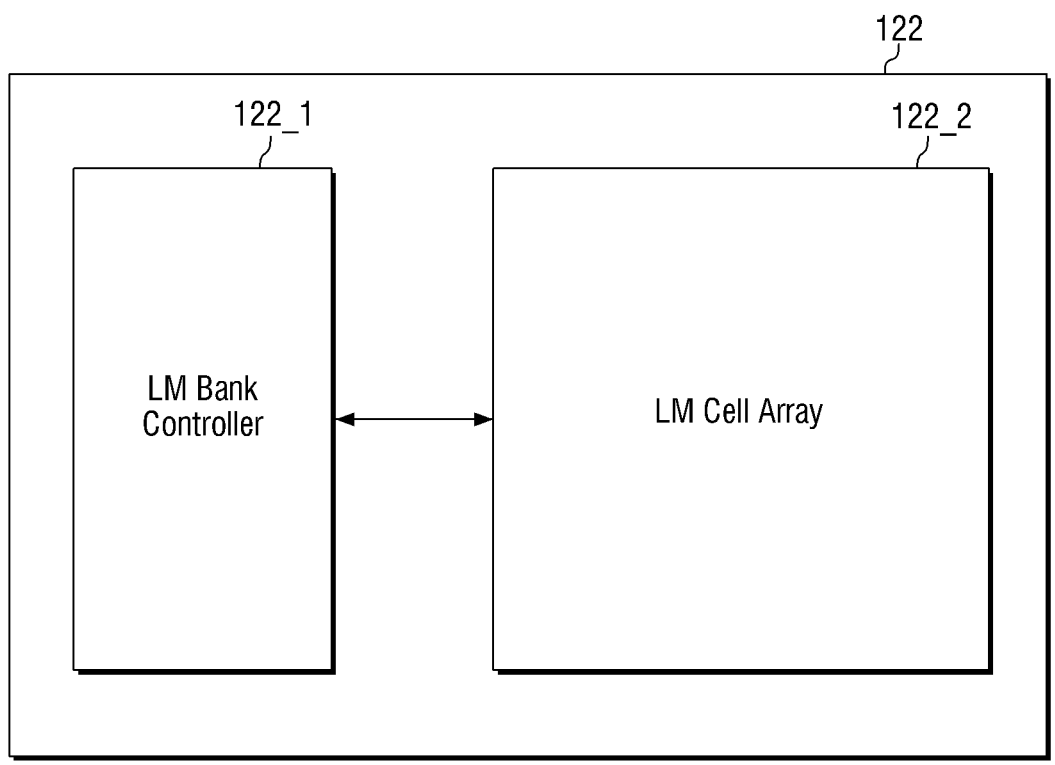
FIG. 19 is a block diagram showing the local memory bank of FIG. 18.

FIG. 19 is a block diagram showing a local memory bank in accordance with FIG. 18 in further detail.

Referring to FIG. 19, the local memory bank 122 may include a local memory bank controller 122_1 and a local memory bank cell array 122_2.

The local memory bank controller 122_1 may manage read and write operations via the addresses of data stored in the local memory bank 122. In some embodiments, the local memory bank controller 122_1 may manage the input/output of data as a whole.

The local memory bank cell array 122_2 may be of a structure in which cells in which data is directly stored are arranged in rows and columns. The local memory bank cell array 122_2 may be controlled by the local memory bank controller 122_1.

Figure 20:
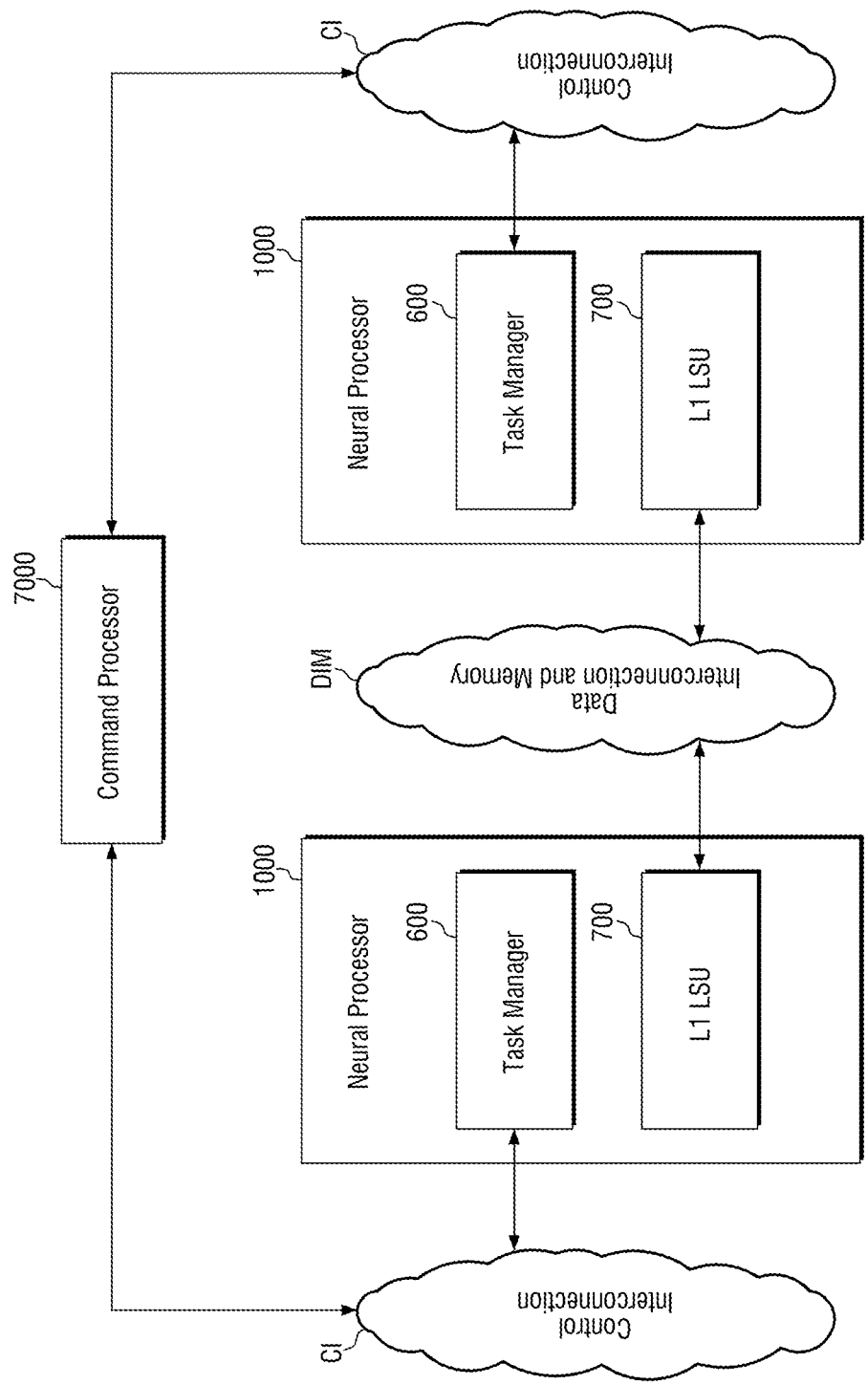
FIG. 20 is a block diagram showing the flow of data and control signals of the neural processing device of FIG. 1.
Figure 21:
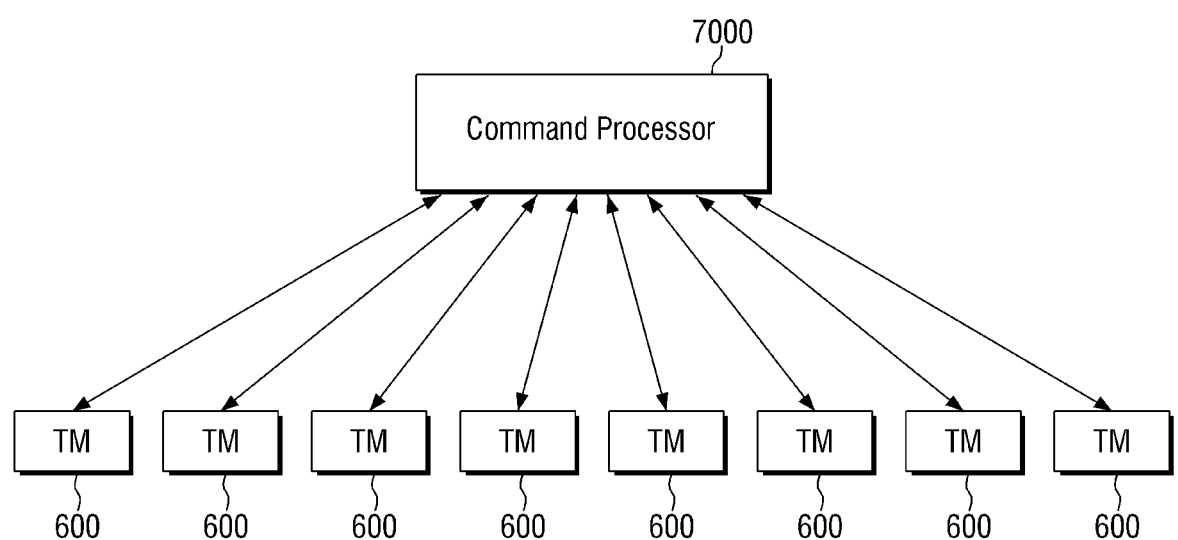
FIG. 21 is a block diagram showing the relationship between the command processor and the task manager of FIG. 20.

FIG. 20 is a block diagram showing the flow of data and control signals of the neural processing device of FIG. 1, and FIG. 21 is a block diagram showing the relationship between the command processor and the task manager of FIG. 20.

Referring to FIGS. 20 and 21, the neural processor 1000 may include at least one neural core 100. Each neural processor 1000 may include a task manager 300 and an L1 LSU 700 therein, respectively. The task managers 300 may exchange control signals and their responses with a command processor 7000 via a control interconnection CI.

In contrast, the L1 LSU 700 may exchange data via a data interconnection and memory DIM. The data interconnection and memory DIM may include an interconnection for transmitting data and a memory in which data is shared. Specifically, the data interconnection and memory DIM may include a local interconnection 600 and a data channel 6100. Further, the data interconnection and memory DIM may include an L1 shared memory 400, a shared memory 2000, and a volatile memory 32. However, the present embodiment is not limited thereto.

The task manager 300 may be controlled by the command processor 7000. In some embodiments, the command processor 7000 may communicate tasks to the task manager 300 via control signals, and the task manager 300 may communicate task completion reports to the command processor 7000. At least one task manager 300 may be included in the neural processor 1000. In some embodiments, if the neural processors 1000 are plural, the number of task managers 300 may get larger. Such a plurality of task managers 300 may all be controlled by the command processor 7000.

Figure 22:
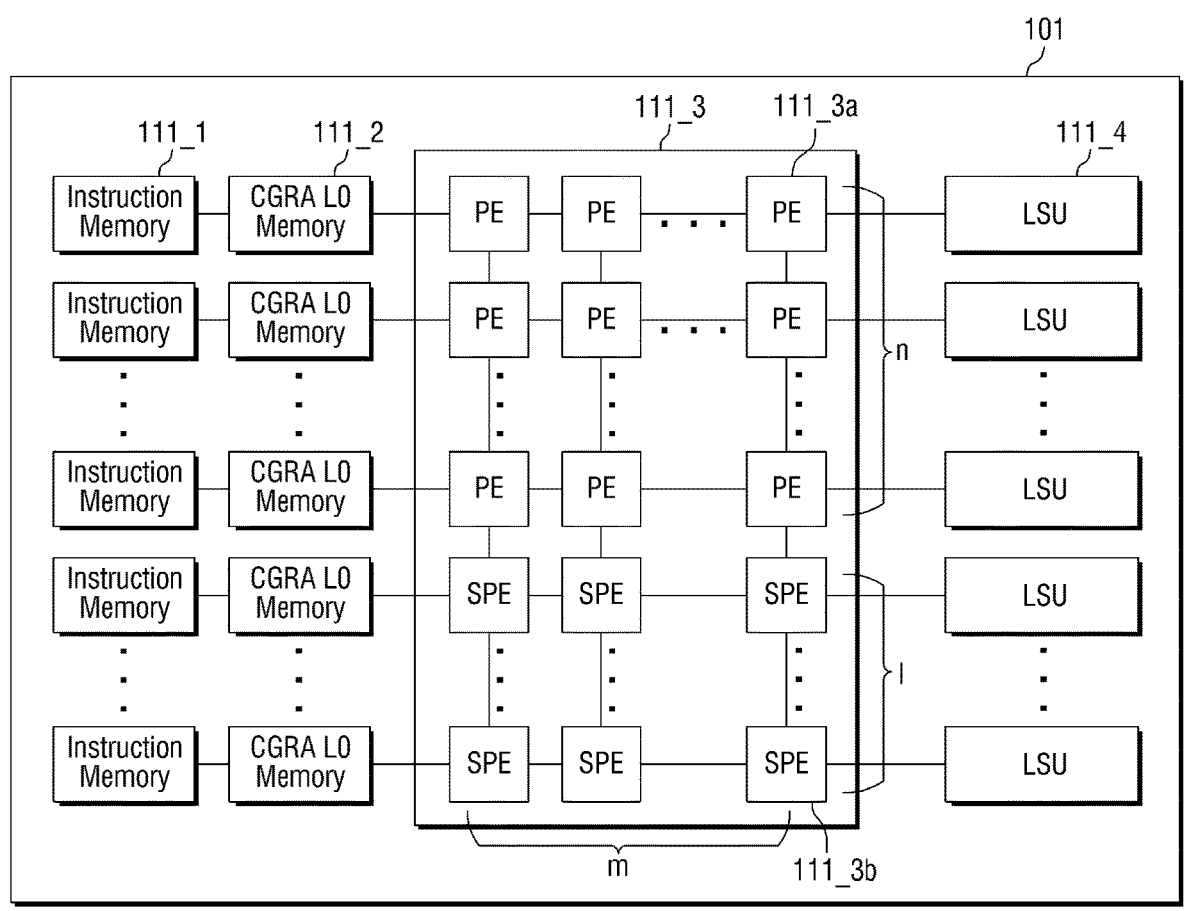
FIG. 22 is a block diagram showing the structure of the neural processing device of FIG. 1 in detail.

FIG. 22 is a block diagram showing a structure of a neural processing device in accordance with some embodiments.

Referring to FIG. 22, the neural core 101 may be of a CGRA structure, unlike the neural core 100. The neural core 101 may include an instruction memory 111_1, a CGRA L0 memory 111_2, a PE array 111_3, and a load/store unit (LSU) 111_4.

The instruction memory 111_1 may receive and store instructions. The instruction memory 111_1 may sequentially store instructions internally, and provide the stored instructions to the PE array 111_3. In some embodiments, the instructions may include instructing the operation of the processing element 111_3a included in each PE array 111_3.

The CGRA L0 memory 111_2 is a memory located inside the neural core 101, and may receive all the input data required for the tasks by the neural core 101 from the outside and temporarily store them. Further, the CGRA L0 memory 111_2 may temporarily store the output data calculated by the neural core 101 in order to transmit them to the outside. The CGRA L0 memory 111_2 may serve as a cache memory of the neural core 101.

The CGRA L0 memory 111_2 may send and receive data to and from the PE array 111_3. The CGRA L0 memory 111_2 may be a memory corresponding to L0 (level 0) that is lower than L1. In some embodiments, the CGRA L0 memory 111_2 may be a private memory of the neural core 101 that is not shared. The CGRA L0 memory 111_2 may transmit data such as activations or weights, programs, and the like to the PE array 111_3.

The PE array 111_3 may be a module that performs calculations. The PE array 111_3 may perform not only one-dimensional calculations but also two-dimensional or higher matrix/tensor calculations. The PE array 111_3 may include a plurality of processing elements 111_3a and particular processing elements 111_3b therein.

The processing elements 111_3a and the particular processing elements 111_3b may be arranged in rows and columns. The processing elements 111_3a and the particular processing elements 111_3b may be arranged in m columns. Further, the processing elements 111_3a may be arranged in n rows, and the particular processing elements 111_3b may be arranged in 1 rows. Accordingly, the processing elements 111_3a and the particular processing elements 111_3b may be arranged in (n+1) rows and m columns.

The LSU 111_4 may receive at least one of data, a control signal, or a synchronization signal from the outside via the local interconnection 600. The LSU 111_4 may transmit at least one of the received data, control signal, or synchronization signal to the CGRA L0 memory 111_2. Similarly, the LSU 111_4 may transmit at least one of the data, control signal, or synchronization signal to the outside via the local interconnection 600.

The neural core 101 may have a CGRA (Coarse Grained Reconfigurable Architecture) structure. Accordingly, in the neural core 101, the respective processing elements 111_3a and particular processing elements 111_3b of the PE array 111_3 may be connected to at least one of the CGRA L0 memory 111_2, the instruction memory 111_1, or the LSU 111_4, respectively. In some embodiments, the processing elements 111_3a and the particular processing elements 111_3b do not have to be connected to all of the CGRA L0 memory 111_2, the instruction memory 111_1, and the LSU 111_4, but may be connected to some of them.

Further, the processing elements 111_3a and the particular processing elements 111_3b may be different types of processing elements from each other. Accordingly, out of the CGRA L0 memory 111_2, the instruction memory 111_1, and the LSU 111_4, the elements connected to the processing elements 111_3a and the elements connected to the particular processing elements 111_3b may be different from each other.

The neural core 101 according to the disclosure having a CGRA structure enables high-level parallel calculations, and since direct data exchange between the processing elements 111_3a and the particular processing elements 111_3b is possible, the power consumption may be low. In some embodiments, by including two or more types of processing elements 111_3a, optimization according to various calculation tasks may also be possible.

For example, if the processing elements 111_3a are processing elements that perform two-dimensional calculations, the particular processing elements 111_3b may be processing elements that perform one-dimensional calculations. However, the embodiment is not limited thereto.

Figure 23:
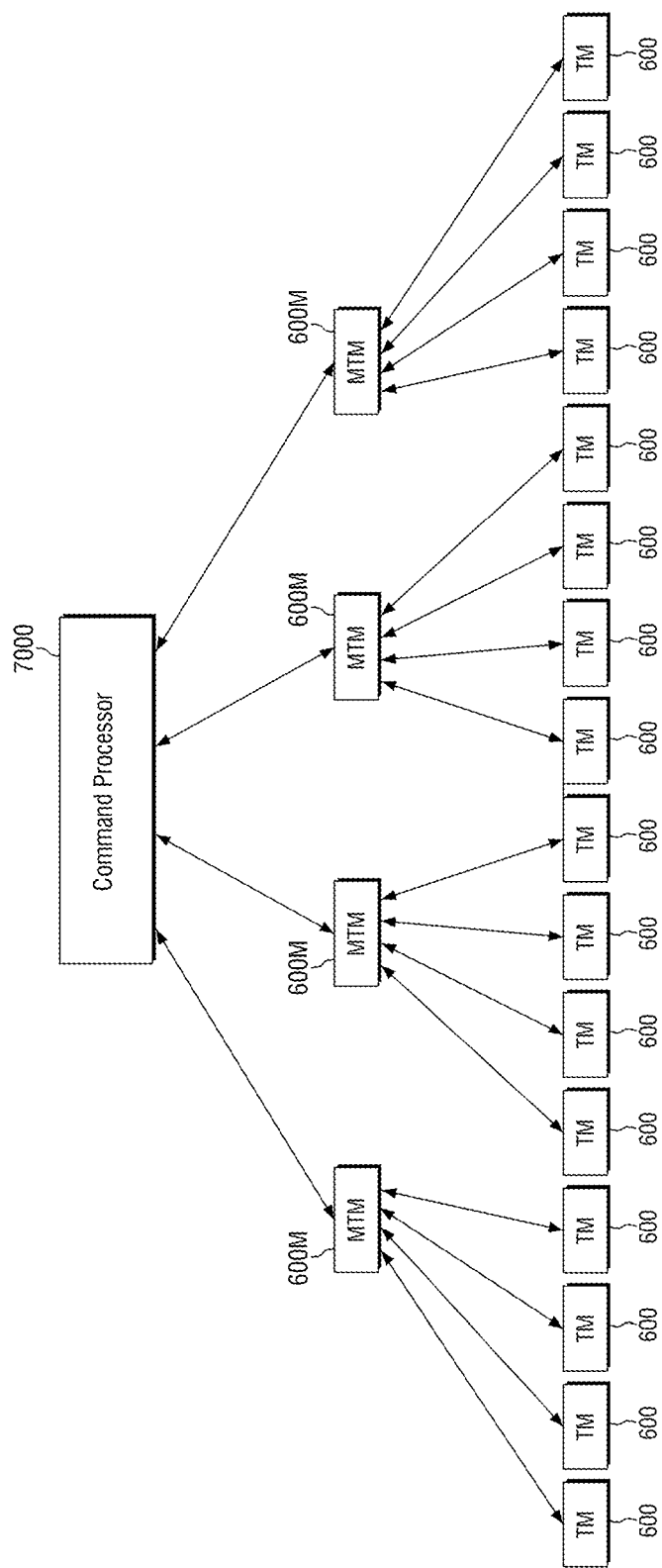
FIG. 23 is a diagram showing a hierarchical structure of a command processor and a task manager of a neural processing device in accordance with some embodiments.
Figure 24:
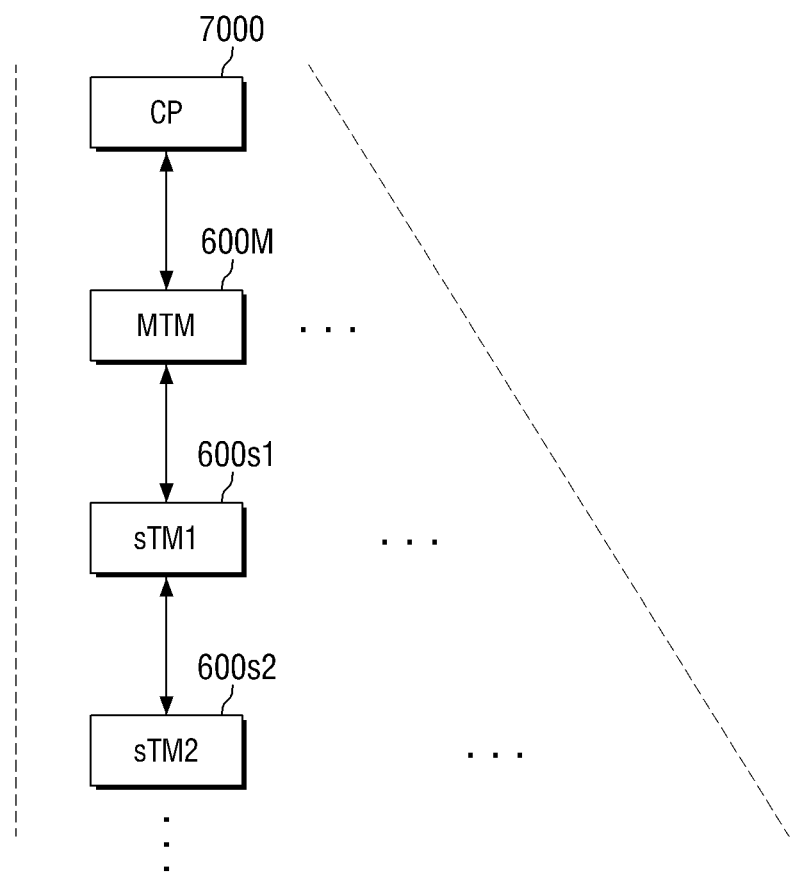
FIG. 24 is a diagram showing a hierarchical structure of a command processor and task managers of a neural processing device in accordance with some embodiments.

FIG. 23 is a diagram showing a hierarchical structure of a command processor and a task manager of a neural processing device in accordance with some embodiments, and FIG. 24 is a diagram showing a hierarchical structure of a command processor and task managers of a neural processing device in accordance with some embodiments.

Referring to FIGS. 23 and 24, if the number of task managers 300 increases, it may be difficult for the command processor 7000 to manage all of the task managers 300. Accordingly, the neural processing device 1 may have a hierarchical structure in which a master task manager 600M manages the plurality of task managers 300 and the command processor 7000 manages the master task manager 600M.

In some embodiments, referring to FIG. 24, levels below the master task manager 600M may also be subdivided into a plurality. For example, a first sub-task manager 600s1 and a second sub-task manager 600s2 may form each layer. In some embodiments, one first sub-task manager 600s1 may manage at least one second sub-task manager 600s2, and one master task manager 600M may manage at least one first sub-task manager 600s1. Additionally, several layers may be added below the second sub-task manager 600s2 as well.

In some embodiments, although three levels of the task manager 300, the master task manager 600M, and the command processor 7000 are shown in FIGS. 23 and 24, the number of levels may be four or more. In some embodiments, the depth of the hierarchical structure may vary as desired depending on the number of task managers 300.

Figure 25:
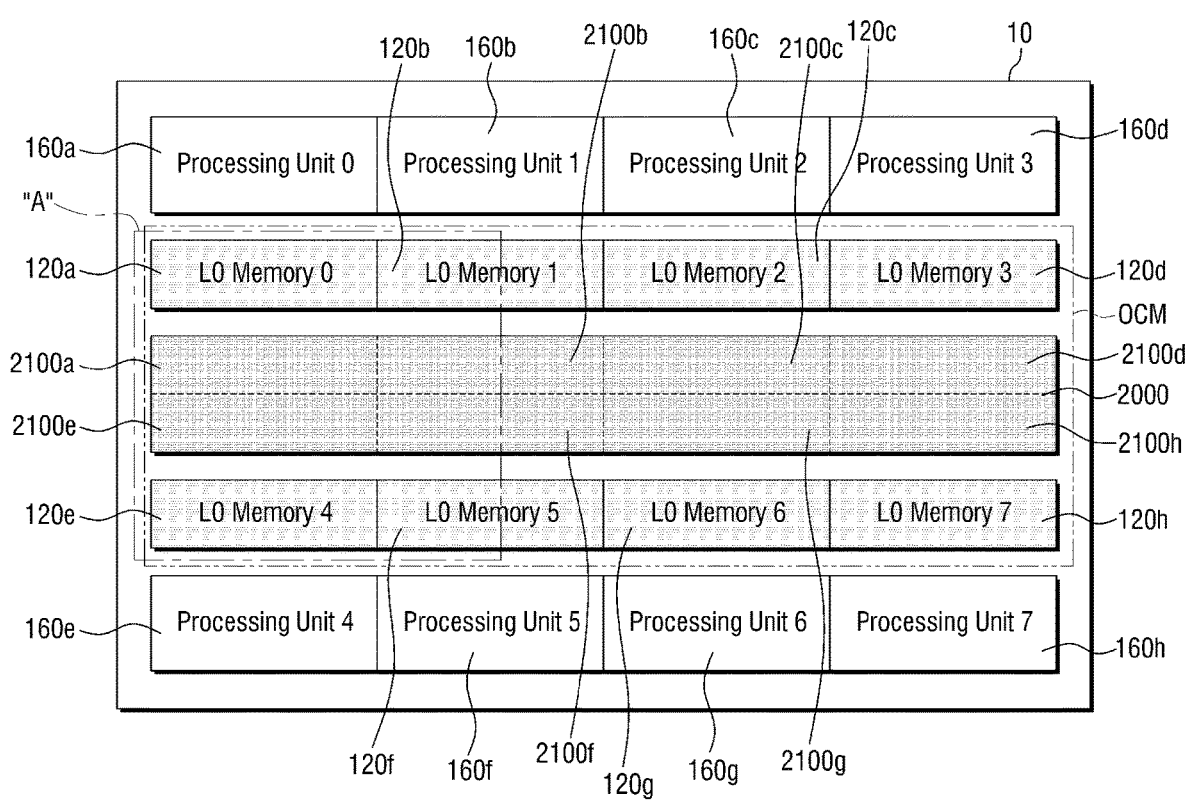
FIG. 25 is a block diagram showing the memory reconstruction of the neural processing system in accordance with some embodiments.

FIG. 25 is a block diagram showing memory reconfiguration of a neural processing system in accordance with some embodiments.

Referring to FIG. 25, the neural core SoC 10 may include first to eighth processing units 160a to 160h and an on-chip memory OCM. Although FIG. 25 illustrates eight processing units as an example, this is merely illustrative, and the number of processing units may vary as desired.

The on-chip memory OCM may include first to eighth L0 memories 120a to 120h and a shared memory 2000.

The first to eighth L0 memories 120a to 120h may be used as private memories for the first to eighth processing units 160a to 160h, respectively. In some embodiments, the first to eighth processing units 160a to 160h and the first to eighth L0 memories 120a to 120h may correspond to each other 1:1.

The shared memory 2000 may include first to eighth memory units 2100a to 2100h. The first to eighth memory units 2100a to 2100h may correspond to the first to eighth processing units 160a to 160h and the first to eighth L0 memories 120a to 120h, respectively. In some embodiments, the number of memory units may be eight, which is the same as the number of processing units and L0 memories.

The shared memory 2000 may operate in one of two kinds of on-chip memory types. In some embodiments, the shared memory 2000 may operate in one of a L0 memory type or a global memory type. In some embodiments, the shared memory 2000 may implement two types of logical memories with one piece of hardware.

If the shared memory 2000 is implemented in the L0 memory type, the shared memory 2000 may operate as a private memory for each of the first to eighth processing units 160a to 160h, just like the first to eighth L0 memories 120a to 120h. The L0 memory can operate at a relatively higher clock speed compared with the global memory, and the shared memory 2000 may also use a relatively higher clock speed when operating in the L0 memory type.

If the shared memory 2000 is implemented in the global memory type, the shared memory 2000 may operate as a common memory used by the first processing unit 160a and the second processing unit 160b together. In some embodiments, the shared memory 2000 may be shared not only by the first to eighth processing units 160a to 160h but also by the first to eighth L0 memories 120a to 120h.

The global memory may generally use a lower clock compared with the L0 memory, but is not limited thereto. When the shared memory 2000 operates in the global memory type, the first to eighth processing units 160a to 160h may share the shared memory 2000. In some embodiments, the shared memory 2000 may be connected to the volatile memory 32 of FIG. 2 via the global interconnection 6000 and may also operate as a buffer for the volatile memory 32.

At least part of the shared memory 2000 may operate in the L0 memory type, and the rest may operate in the global memory type. In some embodiments, the entire shared memory 2000 may operate in the L0 memory type, or the entire shared memory 2000 may operate in the global memory type. Alternatively, part of the shared memory 2000 may operate in the L0 memory type, and the rest may operate in the global memory type.

Figure 26:
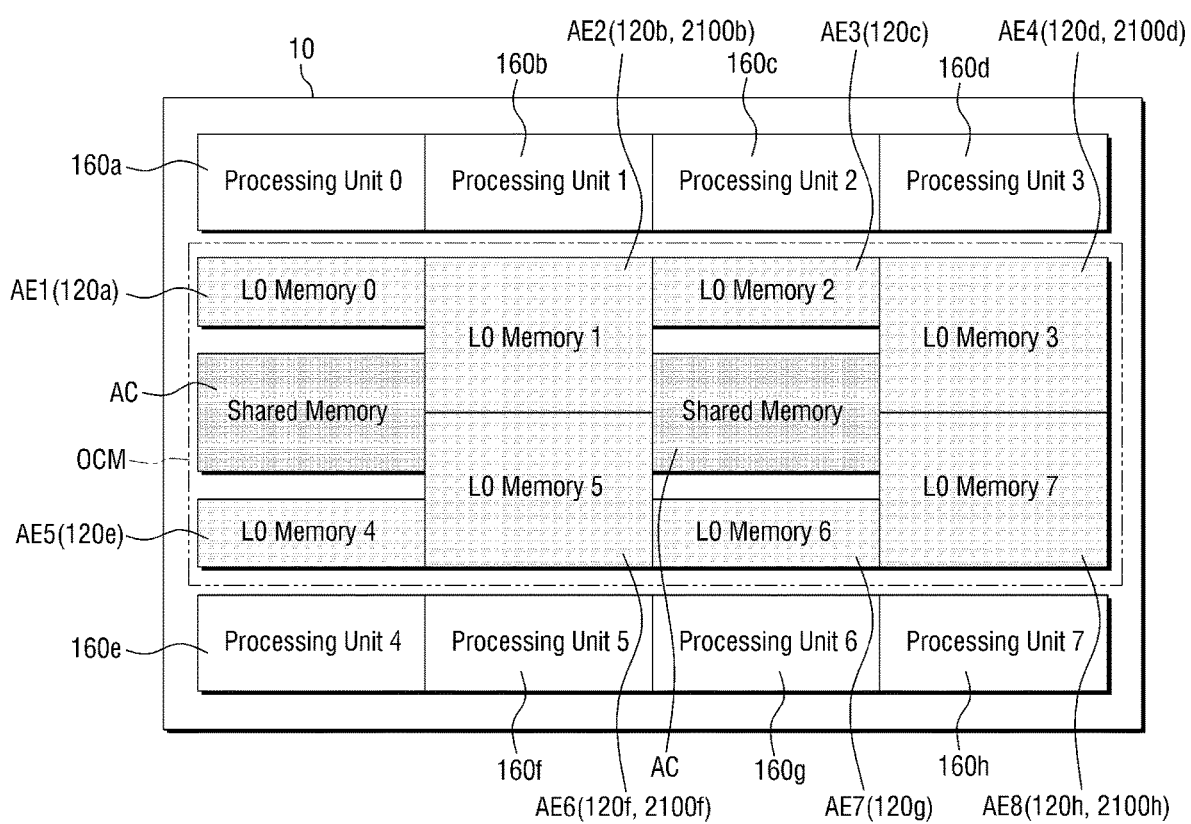
FIG. 26 is a block diagram showing an example of the memory reconstruction of the neural processing system in accordance with some embodiments.

FIG. 26 is a block diagram showing an example of memory reconstruction of a neural processing system in accordance with some embodiments.

With reference to FIGS. 25 and 26, first, third, fifth, and seventh dedicated areas AE1, AE3, AE5, and AE7 for each of the first, third, fifth, and seventh processing units 160a, 160c, 160e, and 160g may include only the first, third, fifth, and seventh L0 memories 120a, 120c, 120e, and 120g, respectively. Further, second, fourth, sixth, and eighth dedicated areas AE2, AE4, AE6, and AE8 for each of the second, fourth, sixth, and eighth processing units 160b, 160d, 160f, and 160h may include second, fourth, sixth, and eighth L0 memories 120b, 120d, 120f, and 120h, respectively. In some embodiments, the second, fourth, sixth, and eighth dedicated areas AE2, AE4, AE6, and AE8 may include the second, fourth, sixth, and eighth memory units 2100b, 2100d, 2100f, and 2100h. The first, third, fifth, and seventh memory units 2100a, 2100c, 2100e, and 2100g of the shared memory 2000 may be used as a common area AC.

The common area AC may be a memory shared by the first to eighth processing units 160a to 160h. The second dedicated area AE2 may include a second L0 memory 120b and a second memory unit 2100b. The second dedicated area AE2 may be an area in which the second L0 memory 120b and the second memory unit 210b that are separated hardware-wise operate in the same manner and operate logically as one L0 memory. The fourth, sixth, and eighth dedicated areas AE4, AE6, and AE8 may also operate in the same manner as the second dedicated area AE2.

The shared memory 2000 in accordance with the embodiment may convert an area corresponding to each processing unit into a logical L0 memory and a logical global memory of an optimized ratio and may use them. The shared memory 2000 may perform the adjustment of this ratio at runtime.

In some embodiments, each processing unit may perform the same task in some cases, but may perform different tasks in other cases as well. In some embodiments, the amount of the L0 memory and the amount of the global memory required for the tasks carried out by each processing unit are inevitably different each time. Accordingly, if the composition ratio of the L0 memory and the shared memory is fixedly set as in the conventional on-chip memory, there may occur inefficiency due to the calculation tasks assigned to each processing unit.

Therefore, the shared memory 2000 of the neural processing device in accordance with the embodiment may set an optimal ratio of the L0 memory and the global memory according to calculation tasks during the runtime, and may enhance the efficiency and speed of calculation.

Figure 27:
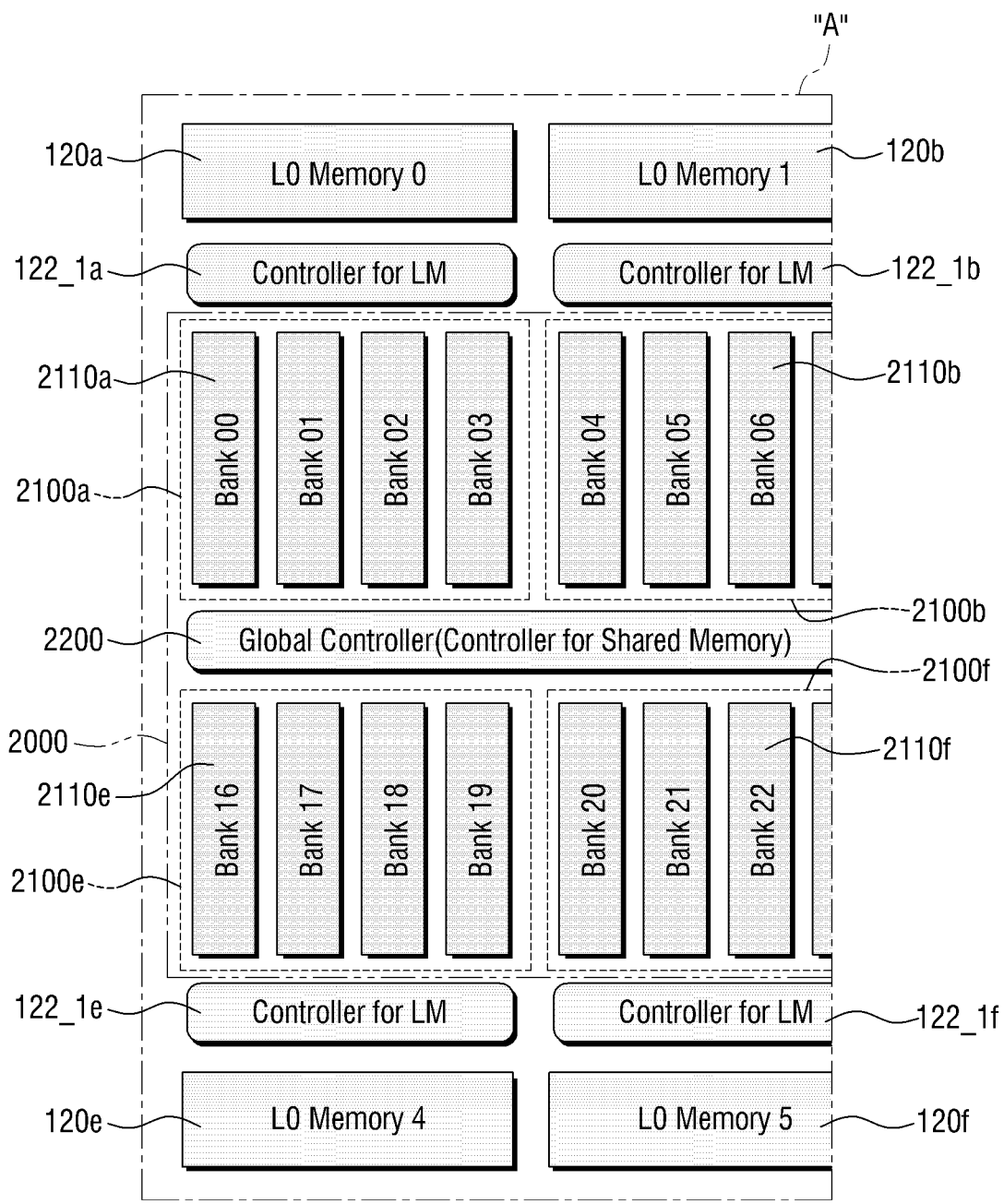
FIG. 27 is an enlarged block diagram of a portion A of FIG. 25.

FIG. 27 is an enlarged block diagram showing a portion A in accordance with FIG. 25.

With reference to FIGS. 25 and 27, the shared memory 2000 may include a first L0 memory controller 122_1a, a second L0 memory controller 122_1b, a fifth L0 memory controller 122_1e, a sixth L0 memory controller 122_1f, the first to eighth memory units 2100a to 2100h, and a global controller 2200. Other L0 memory controllers not shown may also be included in the embodiment, but the description thereof will be omitted for convenience.

In some embodiments, the first L0 memory controller 122_1a, the second L0 memory controller 122_1b, the fifth L0 memory controller 122_1e, the sixth L0 memory controller 122_1f and the global controller 2200 may be named a first L0 memory controller 122_1a circuit, a second L0 memory controller 122_1b circuit, a fifth L0 memory controller 122_1e circuit, a sixth L0 memory controller 122_1f circuit and a global controller 2200 circuit, but for the sake of convenience, the terms are unified as a first L0 memory controller 122_1a, a second L0 memory controller 122_1b, a fifth L0 memory controller 122_1e, a sixth L0 memory controller 122_1f and a global controller 2200. In some embodiments, the first L0 memory controller 122_1a, the second L0 memory controller 122_1b, the fifth L0 memory controller 122_1e, the sixth L0 memory controller 122_1f and the global controller 2200 may be implemented as a circuit or circuitry.

The first L0 memory controller 122_1a may control the first L0 memory 120a. In some embodiments, the first L0 memory controller 122_1a may control the first memory unit 2100a. Specifically, when the first memory unit 2100a is implemented in a logical L0 memory type, the control by the first L0 memory controller 122_1a may be performed on the first memory unit 2100a.

The second L0 memory controller 122_1b may control the second L0 memory 120b. Further, the second L0 memory controller 122_1b may control the second memory unit 2100b. In some embodiments, when the second memory unit 2100b is implemented in the logical L0 memory type, the control by the first L0 memory controller 122_1a may be performed on the second memory unit 2100b.

The fifth L0 memory controller 122_1e may control the fifth L0 memory 120e. Further, the fifth L0 memory controller 122_1e may control the fifth memory unit 2100e. In some embodiments, when the fifth memory unit 2100e is implemented in the logical L0 memory type, the control by the fifth L0 memory controller 122_1e may be performed on the fifth memory unit 2100e.

The sixth L0 memory controller 122_1f may control the sixth L0 memory 120f. Further, the sixth L0 memory controller 122_1f may control the sixth memory unit 2100f. In some embodiments, when the sixth memory unit 2100f is implemented in the logical L0 memory type, the control by the sixth L0 memory controller 122_1f may be performed on the sixth memory unit 2100f.

The global controller 2200 may control all of the first to eighth memory units 2100a to 2100h. Specifically, the global controller 2200 may control the first memory unit 2100a to the eighth memory unit 2100h when the first to eighth memory units 2100a to 2100h each operate logically in the global memory type (i.e., when they do not operate logically in the L0 memory type).

In some embodiments, the first to eighth memory units 2100a to 2100h may be controlled by the first to eighth L0 memory controllers 122_1a to 122_1h, respectively, or may be controlled by the global controller 2200, depending on what type of memory they are logically implemented.

If the L0 memory controllers including the first, second, fifth, and sixth L0 memory controllers 122_1a, 122_1b, 122_1e, and 122_1f control the first to eighth memory units 2100a to 2100h, respectively, the first to eighth L0 memory controllers 122_1a to 122_1h control the first to eighth memory units 2100a to 2100h in the same manner as the first to eighth L0 memories 120a to 120h, and thus, can control them as the private memory of the first to eighth processing units 160a to 160h. Accordingly, the first to eighth memory units 2100a to 2100h may operate at clock frequencies corresponding to the clock frequencies of the first to eighth processing units 160a to 160h.

The L0 memory controllers including the first L0 memory controller 122_1a, the second L0 memory controller 122_1b, the fifth L0 memory controller 122_1e, and the sixth L0 memory controller 122_1f may each include the LSU 110.

If the global controller 2200 controls at least one of the first to eighth memory units 2100a to 2100h, respectively, then the global controller 2200 may control the first to eighth memory units 2100a to 2100h as the global memory of the first to eighth processing units 160a to 160h, respectively. Accordingly, at least one of the first to eighth memory units 2100a to 2100h may operate at a clock frequency independent of the clock frequencies of the first to eighth processing units 160a to 160h, respectively. In some embodiments, if the global controller 2200 controls the i-th memory unit among the first to eighth memory units 2100a to 2100h, the global controller 2200 may control the i-th memory unit as the global memory of the i-th processing unit, and the i-th memory unit may operate at a clock frequency independent of the clock frequency of the i-th processing unit. However, the embodiment is not limited thereto. The global controller 2200 may connect the first to eighth memory units 2100a to 2100h to the global interconnection 6000 as shown and described in accordance with FIG. 3. The first to eighth memory units 2100a to 2100h may exchange data with an off-chip memory 30 as shown and described in accordance with FIG. 2 via the control of the global controller 2200 or may respectively exchange data with the first to eighth L0 memories 120a to 120h.

Each of the first to eighth memory units 2100a to 2100h may include at least one memory bank. The first memory unit 2100a may include at least one first memory bank 2110a. The first memory banks 2110a may be one or more areas obtained by dividing the first memory unit 2100a into certain sizes. The first memory banks 2110a may all be memory devices of the same size. However, the embodiment is not limited thereto. FIG. 16 shows that four memory banks are included in one memory unit.

Similarly, the second, fifth, and sixth memory units 2100b, 2100e, and 2100f may include at least one second, fifth, and sixth memory banks 2110b, 2110e, and 2110f, respectively.

In the following, the description will be made based on the first memory banks 2110a and the fifth memory banks 2110e, which may be the same as other memory banks including the second and sixth memory banks 2110b and 2110f.

The first memory banks 2110a may each operate logically in the L0 memory type or operate logically in the global memory type. In some embodiments, the first memory banks 2110a may operate independently of the other memory banks in the first memory unit 2100a. However, the embodiment is not limited thereto.

If each memory bank operates independently, the first memory unit 2100a may include a first area operating in the same manner as the first L0 memory 120a and a second area operating in a different manner from the first L0 memory 120a. In some embodiments, the first area and the second area do not necessarily coexist, but any one area may take up the entire first memory unit 2100a.

Likewise, the second memory unit 2100b may include a third area operating in the same manner as the second L0 memory 120b and a fourth area operating in a different manner from the second L0 memory 120b. In some embodiments, the third area and the fourth area do not necessarily coexist, and any one area may take up the entire first memory unit 2100a.

In some embodiments, the ratio of the first area to the second area may be different from the ratio of the third area to the fourth area. However, the embodiment is not limited thereto. Therefore, the ratio of the first area to the second area may be the same as the ratio of the third area to the fourth area. In some embodiments, the memory composition ratio in each memory unit may vary as desired.

In general, in the case of the conventional system-on-chip, the on-chip memory except for high-speed L0 memory was often composed of high-density, low-power SRAM. This is because SRAM has high efficiency in terms of chip area and power consumption relative to required capacity. However, with the conventional on-chip memory, the processing speed slowed down significantly as was inevitable in the case where tasks that require more data quickly than the predetermined capacity of the L0 memory, and, even when the need for the global memory is not great, there is no way to utilize the remaining global memory, resulting in inefficiency.

On the other hand, the shared memory 2000 in accordance with some embodiments may be controlled selectively by any one of the two controllers depending on the case. In the case depicted, the shared memory 2000 may be controlled not only as a whole by a determined one of the two controllers but also independently for each memory unit or each memory bank.

Through this, the shared memory 2000 in accordance with the embodiment can obtain an optimal memory composition ratio according to calculation tasks during the runtime and can perform faster and more efficient calculation tasks. In the case of a processing unit specialized in artificial intelligence, the required sizes of L0 memory and global memory may vary for each particular application. Moreover, even for the same application, the required sizes of L0 memory and global memory may vary for each layer when a deep learning network is used. In the shared memory 2000, in accordance with the embodiment, the composition ratio of the memory can be changed during runtime even when calculation steps change according to each layer, making fast and efficient deep learning tasks possible.

Figure 28:
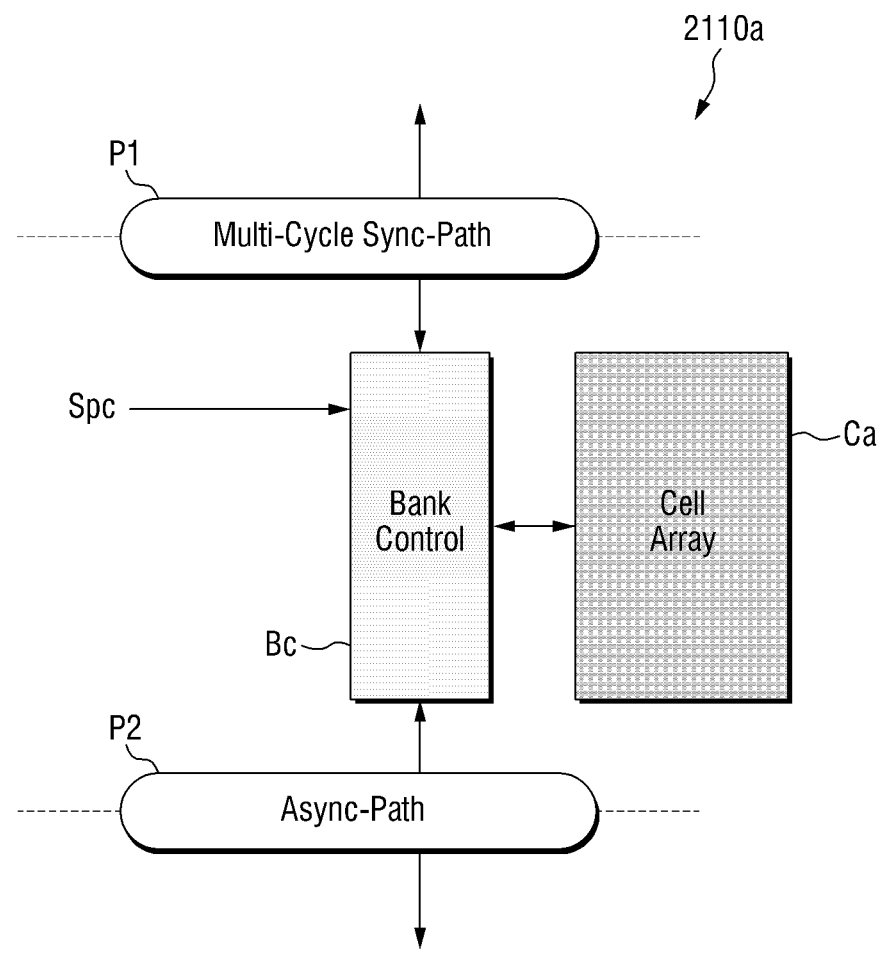
FIG. 28 is a diagram showing the first memory bank of FIG. 27 in detail.

FIG. 28 is a diagram showing a first memory bank in accordance with FIG. 27 in further detail. Although FIG. 28 illustrates a first memory bank 2110a, other memory banks may have the same structure as the first memory bank 2110a.

Referring to FIG. 28, the first memory bank 2110a may include a cell array Ca, a bank controller Bc, a first path unit P1, and a second path unit P2.

In some embodiments, the bank controller Bc, the first path unit P1, and the second path unit P2 may be named a bank controller Bc circuit, a first path unit P1 circuit, a second path unit P2 circuit, but for the sake of convenience, the terms are unified as a first L0 memory controller 122_1a, a second L0 memory controller 122_1b, a bank controller Bc, a first path unit P1, a second path unit P2. In some embodiments, the bank controller Bc, the first path unit P1, and the second path unit P2 may be implemented as a circuit or circuitry.

The cell array Ca may include a plurality of memory devices (cells) therein. In the cell array Ca, the plurality of memory devices may be arranged in a lattice structure. The cell array Ca may be, for example, a SRAM (static random-access memory) cell array.

The bank controller Bc may control the cell array Ca. The bank controller Bc may determine whether the cell array Ca operates in the L0 memory type or in the global memory type, and may control the cell array Ca according to the determined memory type.

Specifically, the bank controller Bc may determine whether to transmit and receive data in the direction of the first path unit P1 or to transmit and receive data in the direction of the second path unit P2 during runtime. The bank controller Bc may determine a data transmission and reception direction according to a path control signal Spc.

The path control signal Spc may be generated by a pre-designed device driver or compiler. The path control signal Spc may be generated according to the characteristics of calculation tasks. Alternatively, the path control signal Spc may be generated by an input received from a user. In some embodiments, the user may directly apply an input to the path control signal Spc in order to select optimal memory composition ratio.

The bank controller Bc may determine a path along which the data stored in the cell array Ca are transmitted and received via the path control signal Spc. The exchange interface of data may be changed as the bank controller Bc determines the path along which the data are transmitted and received. In some embodiments, a first interface may be used when the bank controller Bc exchanges data with the first path unit P1, and a second interface may be used when the bank controller Bc exchanges data with the second path unit P2. In some embodiments, the first interface and the second interface may be different from each other.

Address systems in which data are stored may vary as well. In some embodiments, if a particular interface is selected, then read and write operations may be performed in an address system corresponding thereto.

The bank controller Bc may operate at a particular clock frequency. For example, if the cell array Ca is an SRAM cell array, the bank controller Bc may operate at the operating clock frequency of a general SRAM.

The first path unit P1 may be connected to the bank controller Bc. The first path unit P1 may directly exchange the data of the cell array Ca with the first processing unit 160a. In some embodiments, "directly" may mean being exchanged with each other without going through the global interconnection 6000. In some embodiments, the first processing unit 160a may exchange data directly with the first L0 memory 120a, and the first processing unit 160a may exchange data via the first path unit P1 when the shared memory 2000 is implemented logically in the L0 memory type. The first path unit P1 may include L0 memory controllers including the first L0 memory controller 122_1a and the second L0 memory controller 122_1b, as shown in FIG. 27.

The first path unit P1 may form a multi-cycle sync-path. In some embodiments, the operating clock frequency of the first path unit P1 may be the same as the operating clock frequency of the first processing unit 160a. The first L0 memory 120a may quickly exchange data at the same clock frequency as the operating clock frequency of the first processing unit 160a in order to quickly exchange data at the same speed as the operation of the first processing unit 160a. Likewise, the first path unit P1 may also operate at the same clock frequency as the operating clock frequency of the first processing unit 160a.

In some embodiments, the operating clock frequency of the first path unit P1 may be multiples of the operating clock frequency of the bank controller Bc. In some embodiments, a clock domain crossing (CDC) operation for synchronizing the clocks between the bank controller Bc and the first path unit P1 is not required separately. Thus, a delay of data transmission may not occur. Accordingly, faster and more efficient data exchange can be possible.

In the embodiment shown in FIG. 28, an operating clock frequency of the first path unit P1 may be 1.5 GHz, as an example. This may be twice the frequency of 750 MHz of the bank controller Bc. However, the embodiment is not limited thereto, and any operating clock frequency of the first path unit P1 may be possible as long as the first path unit P1 operates at integer multiples of the clock frequency of the bank controller Bc.

The second path unit P2 may be connected to the bank controller Bc. The second path unit P2 may exchange the data of the cell array Ca with the first processing unit 160a not directly but via the global interconnection 6000. In some embodiments, the first processing unit 160a may exchange data with the cell array Ca via the global interconnection 6000 and the second path unit P2. In some embodiments, the cell array Ca may exchange data not only with the first processing unit 160a but also with other processing units.

In some embodiments, the second path unit P2 may be a data exchange path between the cell array Ca and all the processing units when the first memory bank 2110a is implemented logically in the global memory type. The second path unit P2 may include the global controller 2200 of FIG. 27.

The second path unit P2 may form an asynchronous path or Async-Path. The operating clock frequency of the second path unit P2 may be the same as the operating clock frequency of the global interconnection 6000. Likewise, the second path unit P2 may also operate at the same clock frequency as the operating clock frequency of the global interconnection 6000.

In the case of the embodiment as shown in FIG. 27, the operating clock frequency of the second path unit P2 may not be synchronized with the operating clock frequency of the bank controller Bc. In some embodiments, the clock domain crossing (CDC) operation for synchronizing the clocks between the bank controller Bc and the second path unit P2 may be required. If the operating clock frequency of the bank controller Bc and the operating clock frequency of the second path unit P2 are not synchronized with each other, the degree of freedom in the design of the clock domain may be relatively high. Therefore, the difficulty of hardware design is decreased, thereby making it possible to more easily derive the desired hardware operation.

The bank controller Bc may use different address systems in the case of exchanging data via the first path unit P1 and in the case of exchanging data via the second path unit P2. In some embodiments, the bank controller Bc may use a first address system if exchanging data via the first path unit P1 and a second address system if exchanging data via the second path unit P2. In some embodiments, the first address system and the second address system may be different from each other.

A bank controller Bc is not necessarily required for each memory bank. In some embodiments, a bank controller Bc may not be used to schedule, but instead serves to transfer signals, and thus, is not a required component for each memory bank having two ports. Therefore, one bank controller Bc can be operably coupled to control multiple memory banks. The multiple memory banks may operate independently even if they are controlled by the bank controller Bc. However, the embodiment is not limited thereto.

As a matter of course, the bank controller Bc may exist for each memory bank. In some embodiments, the bank controller Bc may control each memory bank individually.

Referring to FIG. 27 and FIG. 28, if the first memory unit 2100a exchanges data via the first path unit P1, the first address system may be used. If the first memory unit 2100a exchanges data via the second path unit P2, the second address system may be used. Similarly, if the second memory unit 2100b exchanges data via the first path unit P1, a third address system may be used. If the second memory unit 2100b exchanges data via the second path unit P2, the second address system may be used. In some embodiments, the first address system and the third address system may be the same as each other. However, the embodiment is not limited thereto.

The first address system and the third address system may each be used exclusively for the first processing unit 160*a* and the second processing unit 160*b*, respectively. The second address system may be commonly applied to the first processing unit 160*a* and the second processing unit 160*b*.

In FIG. 28, the operating clock frequency of the second path unit P2 may operate at 1 GHz, as an example. This may be a frequency that is not synchronized with the operating clock frequency of 750 MHz of the bank controller Bc. In some embodiments, the operating clock frequency of the second path unit P2 may be freely set without being dependent on the operating clock frequency of the bank controller Bc at all.

A generic global memory has used slow SRAM (e.g., 750 MHz) and a global interconnection (e.g., 1 GHz) faster than that, inevitably resulting in delays due to the CDC operation. On the other hand, the shared memory 2000 in accordance with some embodiments has room to use the first path unit P1 in addition to the second path unit P2, thereby making it possible to avoid delays resulting from the CDC operation.

Furthermore, in the generic global memory, a plurality of processing units use one global interconnection 6000, and thus, when an amount of data transfer occurs at the same time, the decrease in the overall processing speed is likely to occur. On the other hand, the shared memory 2000 in accordance with some embodiments has room to use the first path unit P1 in addition to the second path unit P2, thereby making it possible to achieve the effect of properly distributing the data throughput that could be concentrated on the global controller 2200 as well.

Figure 29:
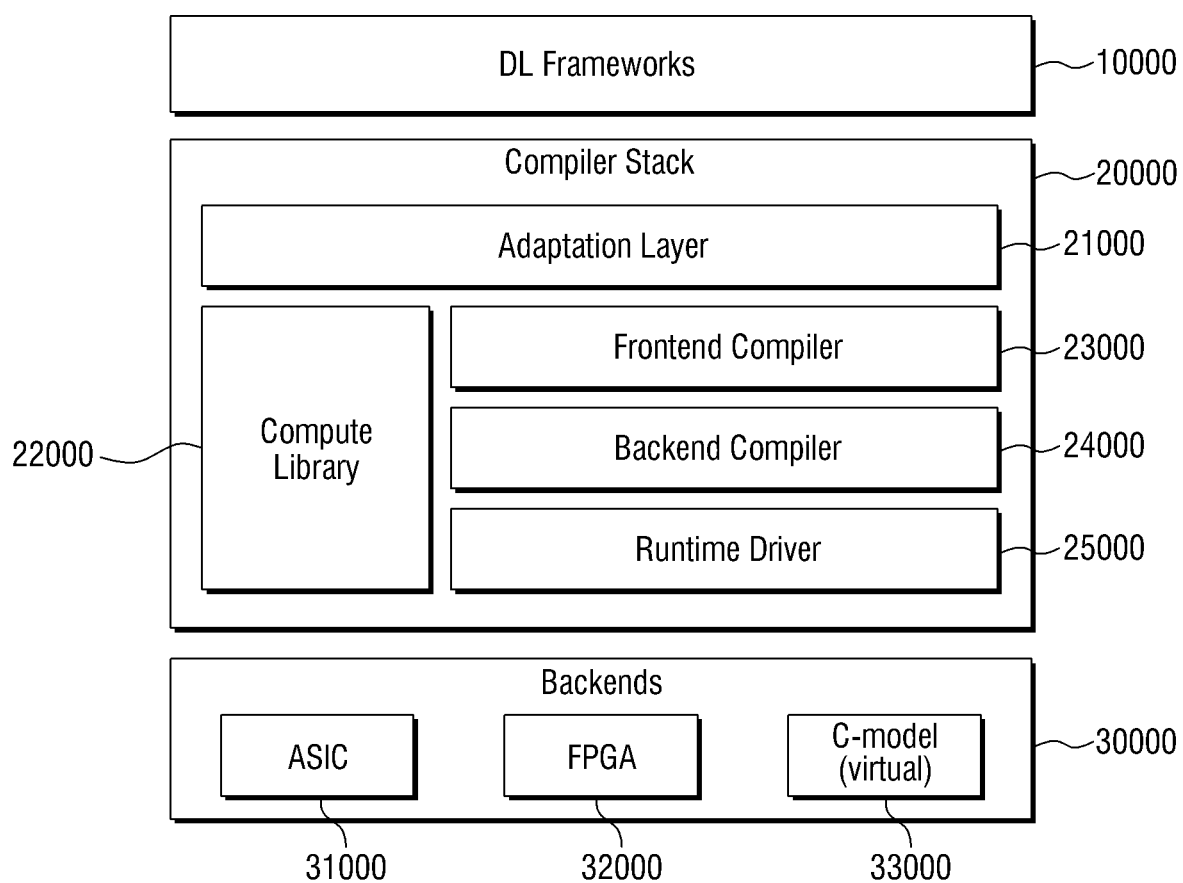
FIG. 29 is a block diagram showing a software hierarchy of a neural processing device in accordance with some embodiments.

FIG. 29 is a block diagram showing a software hierarchy of a neural processing device in accordance with some embodiments.

Referring to FIG. 29, the software hierarchy of the neural processing device in accordance with some embodiments may include a DL framework 10000, a compiler stack 20000, and a back-end module 30000.

The DL framework 10000 may mean a framework for a deep learning model network used by a user. For example, a neural network that has finished training may be generated using a program such as TensorFlow or PyTorch.

The compiler stack 20000 may include an adaptation layer 21000, a compute library 22000, a front-end compiler 23000, a back-end compiler 24000, and a runtime driver 25000.

The adaptation layer 21000 may be a layer in contact with the DL framework 10000. The adaptation layer 21000 may quantize a neural network model of a user generated by the DL framework 10000 and modify graphs. In some embodiments, the adaptation layer 21000 may convert a type of model into a required type.

The front-end compiler 23000 may convert various neural network models and graphs transferred from the adaptation layer 21000 into a constant intermediate representation IR. The converted IR may be a preset representation that is easy to handle later by the back-end compiler 24000.

The optimization that can be done in advance in the graph level may be performed on such an IR of the front-end compiler 23000. In some embodiments, the front-end compiler 23000 may finally generate the IR through the task of converting it into a layout optimized for hardware.

The back-end compiler 24000 optimizes the IR converted by the front-end compiler 23000 and converts it into a binary file, enabling it to be used by the runtime driver. The back-end compiler 24000 may generate an optimized code by dividing a job at a scale that fits the details of hardware.

The compute library 22000 may store template operations designed in a form suitable for hardware among various operations. The compute library 22000 provides the back-end compiler 24000 with multiple template operations required by hardware, allowing the optimized code to be generated.

The runtime driver 25000 may continuously perform monitoring during driving, thereby making it possible to drive the neural network device in accordance with some embodiments. Specifically, it may be responsible for the execution of an interface of the neural network device.

The back-end module 30000 may include an ASIC (application-specific integrated circuit) 31000, an FPGA (field-programmable gate array) 32000, and a C-model 33000. The ASIC 31000 may refer to a hardware chip determined according to a predetermined design method. The FPGA 32000 may be a programmable hardware chip. The C-model 33000 may refer to a model implemented by simulating hardware on software.

The back-end module 30000 may perform various tasks and derive results by using the binary code generated through the compiler stack 20000.

Figure 30:
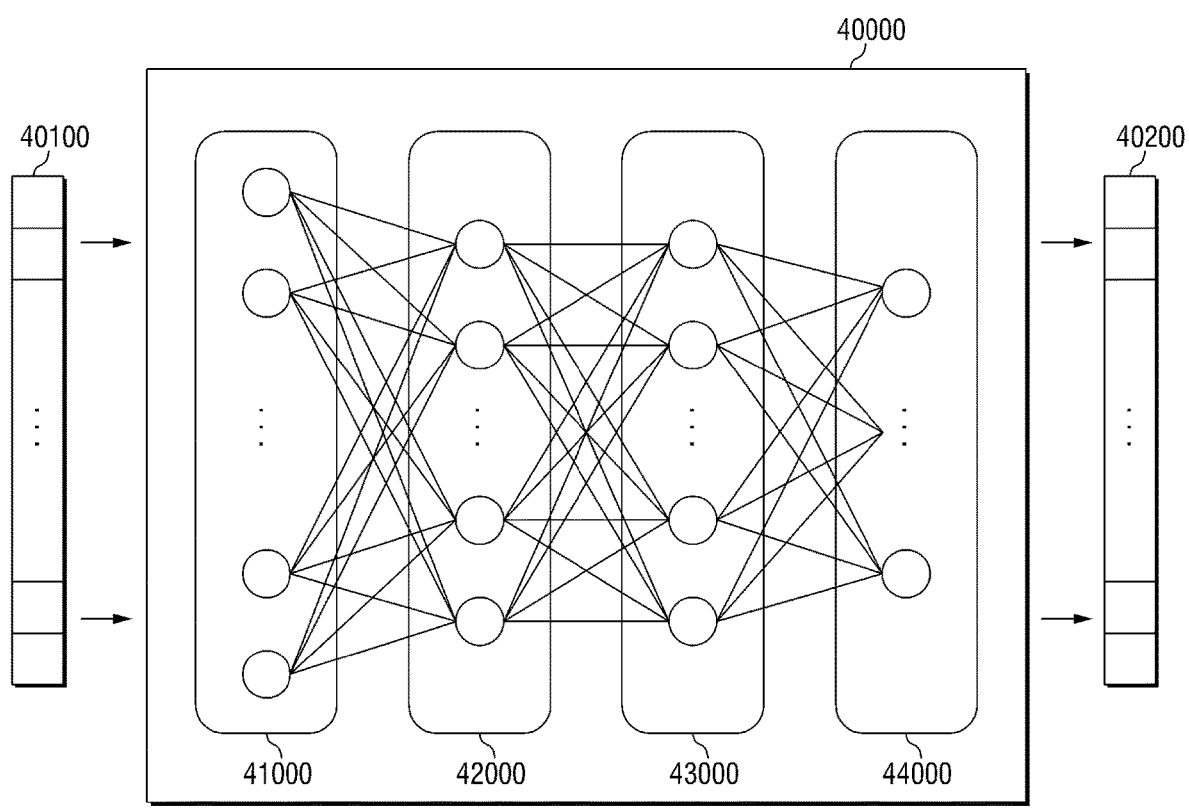
FIG. 30 is a conceptual diagram showing deep learning calculations performed by a neural processing device in accordance with some embodiments.

FIG. 30 is a conceptual diagram showing deep learning calculations performed by a neural processing device in accordance with some embodiments.

Referring to FIG. 30, an artificial neural network model 40000 is one example of a machine learning model and is a statistical learning algorithm implemented based on the structure of a biological neural network or is a structure for executing the algorithm, in machine learning technology and cognitive science.

The artificial neural network model 40000 may represent a machine learning model having an ability to solve problems by learning to reduce the error between an accurate output corresponding to a particular input and an inferred output by repeatedly adjusting the weight of the synapse by nodes. Nodes are artificial neurons that have formed a network by combining synapses, as in a biological neural network. For example, the artificial neural network model 40000 may include any probabilistic model, neural network model, etc., used in artificial intelligence learning methods such as machine learning and deep learning.

A neural processing device in accordance with some embodiments may implement the form of such an artificial neural network model 40000 and perform calculations. For example, the artificial neural network model 40000 may receive an input image and may output information on at least a part of an object included in the input image.

The artificial neural network model 40000 may be implemented by a multilayer perceptron (MLP) including multilayer nodes and connections between them. An artificial neural network model 40000 in accordance with the embodiment may be implemented using one of various artificial neural network model structures including the MLP. As shown in FIG. 29, the artificial neural network model 40000 includes an input layer 41000 that receives input signals or data 40100 from the outside, an output layer 44000 that outputs output signals or data 40200 corresponding to the input data, and n (where n is a positive integer) hidden layers 42000 to 43000 that are located between the input layer 41000 and the output layer 44000 and that receive a signal from the input layer 41000, extract characteristics, and forward them to the output layer 44000. Here, the output layer 44000 receives signals from the hidden layers 42000 to 43000 and outputs them to the outside.

The learning methods of the artificial neural network model 40000 include a supervised learning method for training to be optimized to solve a problem by the input of supervisory signals (correct answers), and an unsupervised learning method that does not require supervisory signals.

The neural processing device may directly generate training data, through simulations, for training the artificial neural network model 40000. In this way, by matching a plurality of input variables and a plurality of output variables corresponding thereto with the input layer 41000 and the output layer 44000 of the artificial neural network model 40000, respectively, and adjusting the synaptic values between the nodes included in the input layer 41000, the hidden layers 42000 to 43000, and the output layer 44000, training may be made to enable a correct output corresponding to a particular input to be extracted. Through such a training phase, it is possible to identify the characteristics hidden in the input variables of the artificial neural network model 40000, and to adjust synaptic values (or weights) between the nodes of the artificial neural network model 40000 so that an error between an output variable calculated based on an input variable and a target output is reduced.

Figure 31:
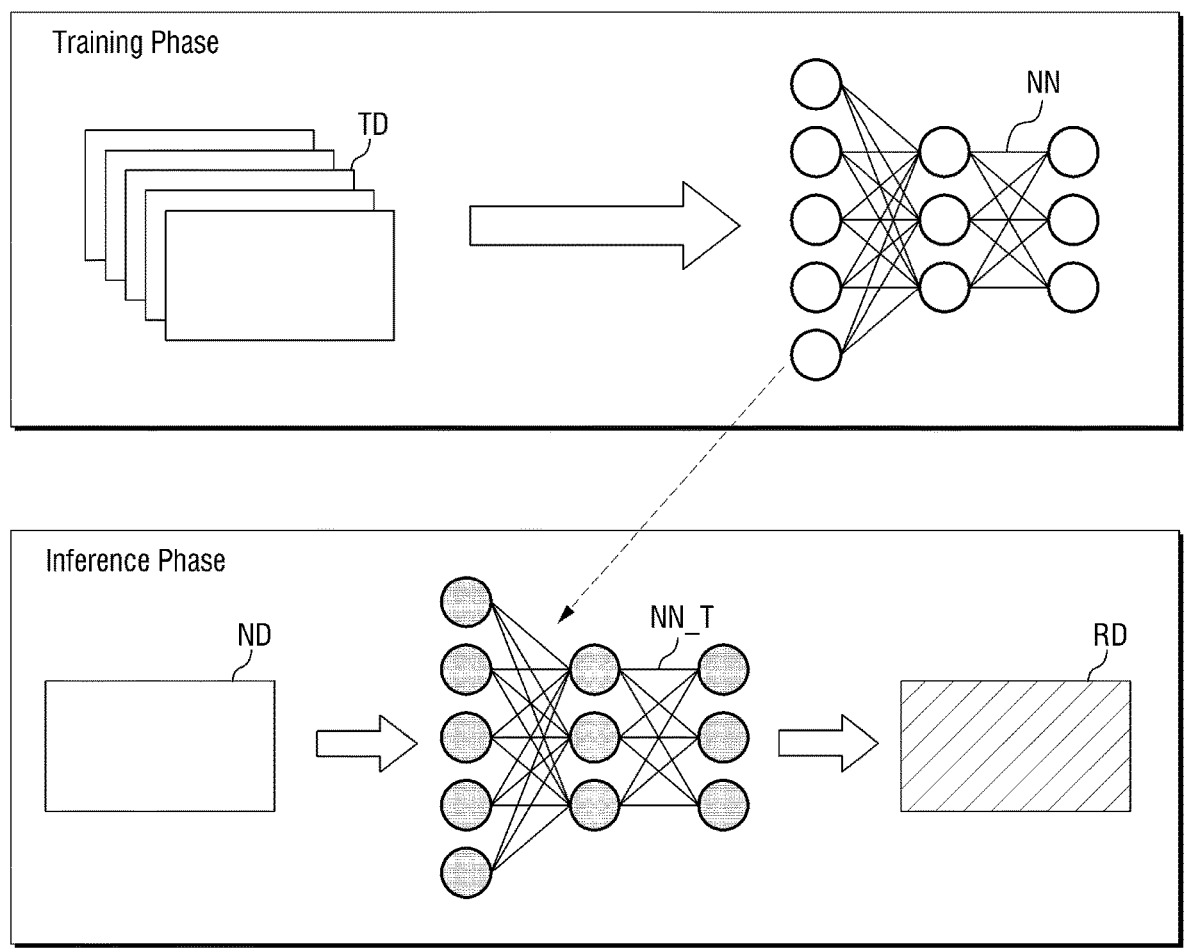
FIG. 31 is a conceptual diagram showing training and inference operations of a neural network of a neural processing device in accordance with some embodiments.

FIG. 31 is a conceptual diagram showing training and inference operations of a neural network of a neural processing device in accordance with some embodiments.

Referring to FIG. 31, the training phase may be subjected to a process in which a large number of pieces of training data TD are passed forward to the artificial neural network model NN and are passed backward again. Through this, the weights and biases of each node of the artificial neural network model NN are tuned, and training may be performed so that more and more accurate results can be derived. Through the training phase, the artificial neural network model NN may be converted into a trained neural network model NN_T.

In the inference phase, new data ND may be inputted into the trained neural network model NN_T again. The trained neural network model NN_T may derive result data RD through the weights and biases that have already been used in the training, with the new data ND as input. For such result data RD, what training data TD were used in training and how many pieces of training data TD were used in the training phase may be important.

Figure 32:
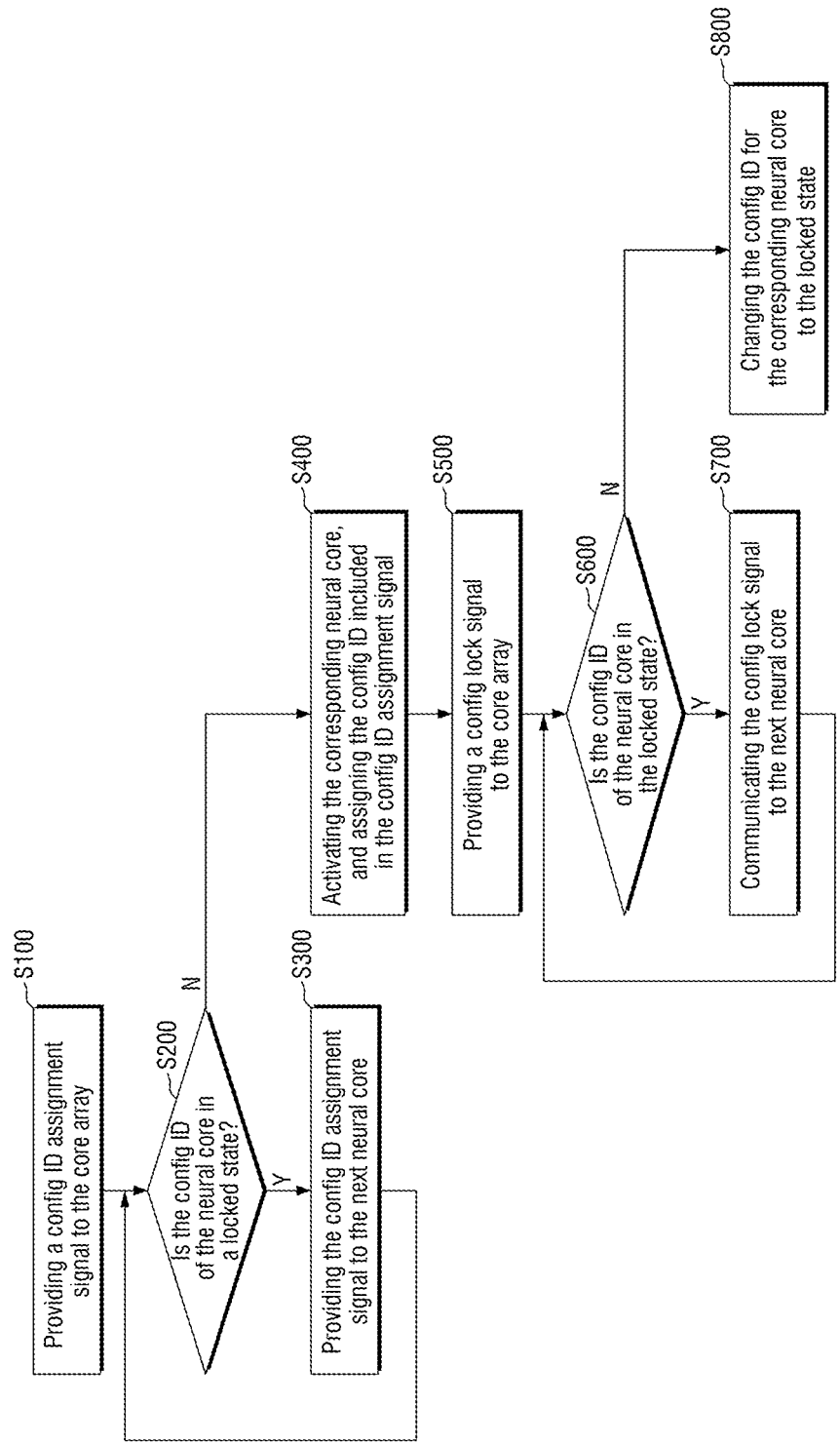
FIG. 32 is a flowchart showing a method for assigning config IDs in accordance with some embodiments.

FIG. 32 is a flowchart showing a method for assigning config IDs in accordance with some embodiments.

Referring to FIGS. 6, 7, and 32, the ID config manager 500 may provide a config ID assignment signal to the core array CoA at S100. For example, the ID config manager 500 may provide a first config ID assignment signal ID_AS_1 to a first neural core 100_1 of the core array CoA.

The neural core 100 may check whether the config ID of the corresponding neural core 100 is in a locked state at S200. In some embodiments, the neural core 100 may check whether the config ID of the corresponding neural core 100 is in the locked state by referring to the config lock information of the config register C_R of the corresponding neural core 100. For example, the first neural core 100_1 may check whether the first config ID of the first neural core 100_1 is in the locked state by referring to the config lock information included in the first config register C_R1.

If the config ID of the neural core 100 is in the locked state (S200, Y), the neural core 100 may provide the config ID assignment signal to the next neural core 100 at S300. On the other hand, if the config ID of the neural core 100 is in an unlocked state (S200, N), the neural core 100 may activate the ID configuration of the corresponding neural core 100 by using an activation signal included in the config ID assignment signal, and assign a config ID included in the config ID assignment signal as the config ID of the corresponding neural core 100 at 5400. For example, if the config lock information included in the first config register C_R1 is in the locked state, the first neural core 100_1 may provide the first config ID assignment signal ID_AS_1 to the second neural core 100_2. On the other hand, if the config lock information included in the first config register C_R1 is in the unlocked state, the first neural core 100_1 may activate the ID configuration of the first neural core 100_1 by using the activation signal included in the first config ID assignment signal ID_AS_1, and determine the config ID included in the first config ID assignment signal as the first config ID of the first neural core 100_1.

Next, the ID config manager 500 may provide a config lock signal to the core array CoA at 5500. For example, the ID config manager 500 may provide the first config lock signal CFG_LCK_1 to the first neural core 100_1.

The neural core 100 may check whether the config ID of the corresponding neural core 100 is in the locked state at S600. In some embodiments, the neural core 100 may check whether the config ID is in the locked state by referring to the config lock information of the config register C_R included in the corresponding neural core 100. For example, the first neural core 100_1 may check whether the first config ID of the first neural core 100_1 is in the locked state by referring to the config lock information included in the first config register C_R1.

If the config ID of the neural core 100 is in the locked state (S600, Y), the neural core 100 may provide the config lock signal to the next neural core 100 at 5700. On the other hand, if the config ID of the neural core 100 is in the unlocked state (S600, N), the neural core 100 may change the config ID of the corresponding neural core 100 to the locked state by using the config lock signal at S800. For example, if the config lock information included in the first config register C_R1 is in the locked state, the first neural core 100_1 may provide the first config lock signal CFG_LCK_1 to the second neural core 100_2. On the other hand, if the config lock information included in the first config register C_R1 is in the unlocked state, the first neural core 100_1 may change the first config ID of the first neural core 100_1 to the locked state by using the first config lock signal.

Next, by repeating steps S100 to S800, the process of assigning config IDs to the plurality of neural cores 100 is sequentially completed.

In some embodiments, blocks, units, modules, and components as describe above may be implemented as a circuit or circuitry. Blocks, units, modules, and components which perform processing may be referred to as a processor, a processing circuit, a processor circuit, or a processing circuitry. Blocks, units, modules, and components which store data may be referred to as a memory, a memory circuit, or a memory circuitry.

Hereinafter, various aspects will be described.

In some aspects, a processing device comprising processing circuitry, comprises: a plurality of processors; a memory operably coupled to the plurality of processors; a first data line connecting a plurality of units including the memory and the plurality of processors in series in a forward direction; and a configuration line connecting the plurality of processors in series. Each processor of the plurality of processors comprises a configuration register storing a configuration indication. The processing circuitry is configured to cause: providing, to the configuration line, a plurality of configuration indication set signals to set configuration indications in configuration registers of the plurality of processors. A respective one processor of the plurality of processors is configured to cause: in response to receiving a configuration indication set signal, setting a configuration indication of the configuration indication set signal in a configuration register of the respective one processor; and performing data processing according to the configuration indication set in the configuration register of the respective one processor. A data path between the plurality of units is configured on the first data line according to the configuration indications set in configuration registers of the plurality of processors. Data is transferred via the configured data path on the first data line.

In some aspects, each processor of the plurality of processors further comprises a lock status register storing a lock status. The respective one processor of the plurality of processors is further configured to cause: in response to receiving the configuration indication set signal, setting a configuration indication of the configuration indication set signal in the configuration register of the respective one processor when the lock status in the lock status register of the respective one processor is an unlocked state.

In some aspects, the respective one processor of the plurality of processors is further configured to cause: in response to successfully setting the configuration indication in the configuration register of the respective one processor, changing the lock status of the respective one processor to a locked state.

In some aspects, the respective one processor of the plurality of processors is further configured to cause: in response to receiving the configuration indication set signal, passing the configuration indication set signal to a next processor of the respective one processor when the lock status in the lock status register of the respective one processor is a locked state.

In some aspects, the processing circuitry is further configured to cause: providing a reset signal to reset configuration indications of the plurality of processors to the configuration line.

In some aspects, the respective one processor of the plurality of processors is further configured to cause: in response to receiving the reset signal, changing the lock status of the respective one processor to an unlocked state; and in response to receiving the reset signal, passing the reset signal to a next processor of the respective one processor.

In some aspects, the configuration indication set in the configuration register of the respective one processor indicates whether the respective one processor is an end unit in the plurality of processors. the respective one processor of the plurality of processors is further configured to cause: in response to successfully setting the configuration indication in the configuration register of the respective one processor, providing a configuration completion signal indicating whether configuration indication setting was successful to a previous unit of the respective one processor, when the configuration indication indicates that the respective one processor is the end unit.

In some aspects, the respective one processor of the plurality of processors is further configured to cause: in response to receiving a configuration completion signal from a next processor of the respective one processor indicating that configuration indication setting was successful and in response to successfully setting the configuration indication in the configuration register of the respective one processor, providing a configuration completion signal indicating that configuration indication setting was successful to a previous unit of the respective one processor; in response to receiving a configuration completion signal from a next processor of the respective one processor indicating that configuration indication setting was successful and in response to failing to set the configuration indication in the configuration register of the respective one processor, providing a configuration completion signal indicating that configuration indication setting failed to a previous unit of the respective one processor; in response to receiving a configuration completion signal from a next processor of the respective one processor indicating that configuration indication setting failed and in response to successfully setting the configuration indication in the configuration register of the respective one processor, providing a configuration completion signal indicating that configuration indication setting failed to a previous unit of the respective one processor; and in response to receiving a configuration completion signal from a next processor of the respective one processor indicating that configuration indication setting failed and in response to failing to set the configuration indication in the configuration register of the respective one processor, providing a configuration completion signal indicating that configuration indication setting failed to a previous unit of the respective one processor.

In some aspects, the configuration indication set in the configuration register of the respective one processor further indicates whether the respective one processor is a start unit in the the plurality of processors.

In some aspects, the configuration indication set in the configuration register of the respective one processor indicates whether data from a previous unit of the respective one processor in the forward direction is used in the respective one processor, and whether data from a previous unit of the respective one processor in the forward direction is passed to a next unit of the respective one processor in the forward direction.

In some aspects, the configuration indication set in the configuration register of the respective one processor further indicates whether data stored in a memory within the respective one processor is transferred to a next unit of the respective one processor in the forward direction.

In some aspects, the processing device further comprises: a second data line connecting a plurality of units including the memory and the plurality of processors in series in a backward direction. The data path between the plurality of units is configured on the first data line and the second data line according to the configuration indications set in configuration registers of the plurality of processors, and data is transferred via the configured data path on the first data line the second data line.

In some aspects, the configuration indication set in the configuration register of the respective one processor further indicates whether data from a previous unit of the respective one processor in the backward direction is used in the respective one processor, and whether data from a previous unit of the respective one processor in the backward direction is passed to a next unit of the respective one processor in the backward direction.

In some aspects, the configuration indication set in the configuration register of the respective one processor further indicates whether data stored in a memory within the respective one processor is transferred to a next unit of the respective one processor in the backward direction.

In some aspects, a method is performed by a processing device comprising processing circuitry. the processing circuitry comprises a plurality of processors, a memory operably coupled to the plurality of processors, a first data line connecting a plurality of units including the memory and the plurality of processors in series in a forward direction, and a configuration line connecting the plurality of processors in series, wherein each processor of the plurality of processors comprises a configuration register storing a configuration indication. The method comprises: providing, by the processing circuitry, to the configuration line, a plurality of configuration indication set signals to set configuration indications in configuration registers of the plurality of processors; receiving, by a respective one processor of the plurality of processors, a configuration indication set signal; setting, by a respective one processor, a configuration indication of the received configuration indication set signal in a configuration register of the respective one processor; and performing, by a respective one processor, data processing according to the configuration indication set in the configuration register of the respective one processor. A data path between the plurality of units is configured on the first data line according to the configuration indications set in configuration registers of the plurality of processors. Data is transferred via the configured data path on the first data line.

In some aspects, each processor of the plurality of processors further comprises a lock status register storing a lock status. The method further comprises: setting, by a respective one processor, a configuration indication of the received configuration indication set signal in the configuration register of the respective one processor when the lock status in the lock status register of the respective one processor is an unlocked state.

In some aspects, the method further comprises: changing the lock status of the respective one processor to a locked state, in response to successfully setting the configuration indication in the configuration register of the respective one processor.

In some aspects, the method further comprises: passing the received configuration indication set signal to a next processor of the respective one processor when the lock status in the lock status register of the respective one processor is a locked state.

In some aspects, the configuration indication set in the configuration register of the respective one processor indicates whether data from a previous unit of the respective one processor in the forward direction is used in the respective one processor, and whether data from a previous unit of the respective one processor in the forward direction is passed to a next unit of the respective one processor in the forward direction.

In some aspects, the processing circuitry further comprises a second data line connecting a plurality of units including the memory and the plurality of processors in series in a backward direction, the data path between the plurality of units is configured on the first data line and the second data line according to the configuration indications set in configuration registers of the plurality of processors, and data is transferred via the configured data path on the first data line the second data line. The configuration indication set in the configuration register of the respective one processor further indicates whether data from a previous unit of the respective one processor in the backward direction is used in the respective one processor, and whether data from a previous unit of the respective one processor in the backward direction is passed to a next unit of the respective one processor in the backward direction.

While the inventive concept has been particularly shown and described with reference to exemplary embodiments thereof, it will be understood by those of ordinary skill in the art that various changes in form and details may be made therein without departing from the spirit and scope of the inventive concept as defined by the following claims. It is therefore desired that the embodiments be considered in all respects as illustrative and not restrictive, reference being made to the appended claims rather than the foregoing description to indicate the scope of the disclosure.

What is claimed is:

1. A processing device comprising processing circuitry, comprising:
   a plurality of processors;
   a memory operably coupled to the plurality of processors;
   a first data line connecting a plurality of units including the memory and the plurality of processors in series in a forward direction; and
   a configuration line connecting the plurality of processors in series,
   wherein each processor of the plurality of processors comprises a configuration register storing a configuration indication,
   wherein the processing circuitry is configured to cause:
   providing, to the configuration line, a plurality of configuration indication set signals to set configuration indications in configuration registers of the plurality of processors,
   wherein a respective one processor of the plurality of processors is configured to cause:
   in response to receiving a configuration indication set signal, setting a configuration indication of the configuration indication set signal in a configuration register of the respective one processor; and
   performing data processing according to the configuration indication set in the configuration register of the respective one processor,
   wherein a data path between the plurality of units is configured on the first data line according to the configuration indications set in configuration registers of the plurality of processors,
   wherein data is transferred via the configured data path on the first data line,
   wherein the configuration indication set in the configuration register of the respective one processor indicates whether the respective one processor is an end unit in the plurality of processors,
   wherein the respective one processor of the plurality of processors is further configured to cause:
   in response to successfully setting the configuration indication in the configuration register of the respective one processor, providing a configuration completion signal indicating whether configuration indication setting was successful to a previous unit of the respective one processor, when the configuration indication indicates that the respective one processor is the end unit.

2. The processing device of claim 1,
   wherein each processor of the plurality of processors further comprises a lock status register storing a lock status,
   wherein the respective one processor of the plurality of processors is further configured to cause:
   in response to receiving the configuration indication set signal, setting a configuration indication of the configuration indication set signal in the configuration register of the respective one processor when the lock status in the lock status register of the respective one processor is an unlocked state.

3. The processing device of claim 2,
   wherein the respective one processor of the plurality of processors is further configured to cause:
   in response to successfully setting the configuration indication in the configuration register of the respective one processor, changing the lock status of the respective one processor to a locked state.

4. The processing device of claim 3, wherein the respective one processor of the plurality of processors is further configured to cause:
in response to receiving the configuration indication set signal, passing the configuration indication set signal to a next processor of the respective one processor when the lock status in the lock status register of the respective one processor is a locked state.

5. The processing device of claim 4, wherein the processing circuitry is further configured to cause:
providing a reset signal to reset configuration indications of the plurality of processors to the configuration line.

6. The processing device of claim 5, wherein the respective one processor of the plurality of processors is further configured to cause:
in response to receiving the reset signal, changing the lock status of the respective one processor to an unlocked state; and
in response to receiving the reset signal, passing the reset signal to a next processor of the respective one processor.

7. The processing device of claim 1, wherein the respective one processor of the plurality of processors is further configured to cause:
in response to receiving a configuration completion signal from a next processor of the respective one processor indicating that configuration indication setting was successful and in response to successfully setting the configuration indication in the configuration register of the respective one processor, providing a configuration completion signal indicating that configuration indication setting was successful to a previous unit of the respective one processor;
in response to receiving a configuration completion signal from a next processor of the respective one processor indicating that configuration indication setting was successful and in response to failing to set the configuration indication in the configuration register of the respective one processor, providing a configuration completion signal indicating that configuration indication setting failed to a previous unit of the respective one processor;
in response to receiving a configuration completion signal from a next processor of the respective one processor indicating that configuration indication setting failed and in response to successfully setting the configuration indication in the configuration register of the respective one processor, providing a configuration completion signal indicating that configuration indication setting failed to a previous unit of the respective one processor; and
in response to receiving a configuration completion signal from a next processor of the respective one processor indicating that configuration indication setting failed and in response to failing to set the configuration indication in the configuration register of the respective one processor, providing a configuration completion signal indicating that configuration indication setting failed to a previous unit of the respective one processor.

8. The processing device of claim 1, wherein the configuration indication set in the configuration register of the respective one processor further indicates whether the respective one processor is a start unit in the plurality of processors.

9. The processing device of claim 1, wherein the configuration indication set in the configuration register of the respective one processor further indicates whether data from a previous unit of the respective one processor in the forward direction is used in the respective one processor, and whether data from a previous unit of the respective one processor in the forward direction is passed to a next unit of the respective one processor in the forward direction.

10. The processing device of claim 9, wherein the configuration indication set in the configuration register of the respective one processor further indicates whether data stored in a memory within the respective one processor is transferred to a next unit of the respective one processor in the forward direction.

11. The processing device of claim 9, further comprising:
a second data line connecting a plurality of units including the memory and the plurality of processors in series in a backward direction, and
wherein the data path between the plurality of units is configured on the first data line and the second data line according to the configuration indications set in configuration registers of the plurality of processors, and
wherein data is transferred via the configured data path on the first data line and the second data line.

12. The processing device of claim 11, wherein the configuration indication set in the configuration register of the respective one processor further indicates whether data from a previous unit of the respective one processor in the backward direction is used in the respective one processor, and whether data from a previous unit of the respective one processor in the backward direction is passed to a next unit of the respective one processor in the backward direction.

13. The processing device of claim 12, wherein the configuration indication set in the configuration register of the respective one processor further indicates whether data stored in a memory within the respective one processor is transferred to a next unit of the respective one processor in the backward direction.

14. A method performed by a processing device comprising processing circuitry,
wherein the processing circuitry comprises a plurality of processors, a memory operably coupled to the plurality of processors, a first data line connecting a plurality of units including the memory and the plurality of processors in series in a forward direction, and a configuration line connecting the plurality of processors in series, wherein each processor of the plurality of processors comprises a configuration register storing a configuration indication,
the method comprising:
providing, by the processing circuitry, to the configuration line, a plurality of configuration indication set signals to set configuration indications in configuration registers of the plurality of processors;
receiving, by a respective one processor of the plurality of processors, a configuration indication set signal;
setting, by a respective one processor, a configuration indication of the received configuration indication set signal in a configuration register of the respective one processor; and
performing, by a respective one processor, data processing according to the configuration indication set in the configuration register of the respective one processor, wherein a data path between the plurality of units is configured on the first data line according to the configuration indications set in configuration registers of the plurality of processors, wherein data is transferred via the configured data path on the first data line, wherein the configuration indication set in the configuration register of the respective one processor indicates whether the respective one processor is an end unit in the plurality of processors, the method further comprising:

providing a configuration completion signal indicating whether configuration indication setting was successful to a previous unit of the respective one processor when the configuration indication indicates that the respective one processor is the end unit, in response to successfully setting the configuration indication in the configuration register of the respective one processor.

15. The method of claim 14, wherein each processor of the plurality of processors further comprises a lock status register storing a lock status, the method further comprising:

setting, by a respective one processor, a configuration indication of the received configuration indication set signal in the configuration register of the respective one processor when the lock status in the lock status register of the respective one processor is an unlocked state.

16. The method of claim 15, further comprising:

changing the lock status of the respective one processor to a locked state, in response to successfully setting the configuration indication in the configuration register of the respective one processor.

17. The method of claim 16, further comprising:

passing the received configuration indication set signal to a next processor of the respective one processor when the lock status in the lock status register of the respective one processor is a locked state.

18. The method of claim 14, wherein the configuration indication set in the configuration register of the respective one processor indicates whether data from a previous unit of the respective one processor in the forward direction is used in the respective one processor, and whether data from a previous unit of the respective one processor in the forward direction is passed to a next unit of the respective one processor in the forward direction.

19. The method of claim 18, wherein the processing circuitry further comprises a second data line connecting a plurality of units including the memory and the plurality of processors in series in a backward direction, wherein the data path between the plurality of units is configured on the first data line and the second data line according to the configuration indications set in configuration registers of the plurality of processors, wherein data is transferred via the configured data path on the first data line and the second data line, and wherein the configuration indication set in the configuration register of the respective one processor further indicates whether data from a previous unit of the respective one processor in the backward direction is used in the respective one processor, and whether data from a previous unit of the respective one processor in the backward direction is passed to a next unit of the respective one processor in the backward direction.

* * * * *